(12) United States Patent
Biro et al.

(10) Patent No.: US 11,444,504 B2
(45) Date of Patent: Sep. 13, 2022

(54) STATOR CORE END CAPS

(71) Applicant: Nidec Motor Corporation, St. Louis, MO (US)

(72) Inventors: Joshua M. Biro, St. Charles, MO (US); William D. Moore, Florissant, MO (US)

(73) Assignee: Nidec Motor Corporation, St. Louis, MO (US)

( * ) Notice: Subject to any disclaimer, the term of this patent is extended or adjusted under 35 U.S.C. 154(b) by 355 days.

(21) Appl. No.: 16/773,661

(22) Filed: Jan. 27, 2020

(65) Prior Publication Data

US 2020/0161928 A1 May 21, 2020

Related U.S. Application Data

(63) Continuation of application No. 14/960,138, filed on Dec. 4, 2015, now Pat. No. 10,547,229.

(Continued)

(51) Int. Cl.
*H02K 7/10* (2006.01)
*H02K 5/04* (2006.01)
(Continued)

(52) U.S. Cl.
CPC .......... *H02K 5/04* (2013.01); *B60B 27/0015* (2013.01); *B60B 27/0021* (2013.01); *B60B 27/0026* (2013.01); *F16C 19/10* (2013.01); *F16C 19/30* (2013.01); *F16C 33/366* (2013.01); *F16H 1/06* (2013.01); *F16H 1/20* (2013.01); *F16H 55/0806* (2013.01); *F16H 55/17* (2013.01); *F16H 57/021* (2013.01); *F16H 57/022* (2013.01); *F16H 57/029* (2013.01); *F16H 57/0457* (2013.01); *F16H 57/12* (2013.01); *H02K 1/148* (2013.01); *H02K 3/28* (2013.01); *H02K 3/522* (2013.01); *H02K 5/10* (2013.01); *H02K 5/225* (2013.01); *H02K 7/116* (2013.01); *H02K 7/14* (2013.01); *H02K 11/21* (2016.01); *H02K 11/25* (2016.01); *H02K 21/16* (2013.01); *F16C 19/547* (2013.01); *F16C 2361/61* (2013.01); *F16C 2380/27* (2013.01); *F16H 1/08* (2013.01); *F16H 2057/0221* (2013.01);
(Continued)

(58) Field of Classification Search
CPC .......... H02K 5/04; H02K 11/21; H02K 11/25; H02K 1/148; H02K 3/28; H02K 3/522; H02K 5/225; H02K 7/116; H02K 7/14; H02K 21/16; B60B 27/0015; F16C 19/10; F16C 19/30; F16C 33/366; F16H 1/06; F16H 1/20; F16H 55/0806; F16H 55/17; F16H 57/021; F16H 57/029; F16H 57/0457; F16H 57/12
See application file for complete search history.

(56) References Cited

U.S. PATENT DOCUMENTS

| | | | |
|---|---|---|---|
| 2003/0098630 A1* | 5/2003 | Owada | H02K 3/24 310/194 |
| 2006/0033395 A1* | 2/2006 | Izumi | H02K 3/18 310/194 |

(Continued)

*Primary Examiner* — Zakaria Elahmadi
(74) *Attorney, Agent, or Firm* — Hovey Williams LLP

(57) ABSTRACT

Electric motors are disclosed. The motors are preferably for use in an automated vehicle, although any one or more of a (Continued)

variety of motor uses are suitable. The motors include lift, turntable, and locomotion motors.

18 Claims, 45 Drawing Sheets

Related U.S. Application Data

(60) Provisional application No. 62/088,463, filed on Dec. 5, 2014.

(51) Int. Cl.

| | | |
|---|---|---|
| H02K 21/16 | (2006.01) | |
| H02K 1/14 | (2006.01) | |
| H02K 3/52 | (2006.01) | |
| H02K 5/22 | (2006.01) | |
| H02K 7/14 | (2006.01) | |
| F16H 57/022 | (2012.01) | |
| B60B 27/00 | (2006.01) | |
| H02K 5/10 | (2006.01) | |
| F16H 55/17 | (2006.01) | |
| F16H 57/029 | (2012.01) | |
| F16H 57/04 | (2010.01) | |
| F16C 19/10 | (2006.01) | |
| F16C 19/30 | (2006.01) | |
| F16C 33/36 | (2006.01) | |
| F16H 1/06 | (2006.01) | |
| F16H 1/20 | (2006.01) | |
| F16H 55/08 | (2006.01) | |
| F16H 57/021 | (2012.01) | |
| F16H 57/12 | (2006.01) | |
| H02K 11/21 | (2016.01) | |
| H02K 7/116 | (2006.01) | |
| H02K 11/25 | (2016.01) | |
| H02K 3/28 | (2006.01) | |
| G11B 17/00 | (2006.01) | |
| H02K 1/18 | (2006.01) | |
| H02K 5/18 | (2006.01) | |
| F16H 1/08 | (2006.01) | |
| F16C 19/54 | (2006.01) | |

(52) U.S. Cl.
CPC ........ *F16H 2057/127* (2013.01); *G11B 17/00* (2013.01); *H02K 1/185* (2013.01); *H02K 5/18* (2013.01); *H02K 2203/12* (2013.01)

(56) References Cited

U.S. PATENT DOCUMENTS

| | | | | |
|---|---|---|---|---|
| 2006/0242755 | A1* | 11/2006 | Lohss | A47K 13/10 4/246.1 |
| 2007/0295557 | A1* | 12/2007 | Aldridge | F16H 57/0427 184/13.1 |
| 2008/0238267 | A1* | 10/2008 | Scharrer | H02K 11/22 310/68 B |
| 2013/0192930 | A1* | 8/2013 | Segovia | F16H 57/0464 184/14 |
| 2014/0015349 | A1* | 1/2014 | Chamberlin | H02K 15/10 310/43 |
| 2014/0033862 | A1* | 2/2014 | Tryens | F16H 57/02 74/606 R |
| 2014/0132110 | A1* | 5/2014 | Burton | H02K 1/143 310/216.131 |
| 2014/0145545 | A1* | 5/2014 | Kreidler | H02K 15/095 29/598 |
| 2014/0150582 | A1* | 6/2014 | Wilson | F16H 3/001 74/325 |
| 2014/0196551 | A1* | 7/2014 | Leggott | B60K 25/02 74/15.82 |
| 2014/0217839 | A1* | 8/2014 | Marioni | H02K 5/225 310/52 |
| 2014/0265673 | A1* | 9/2014 | Kreidler | H02K 5/225 310/71 |
| 2014/0292128 | A1* | 10/2014 | Yokoe | H02K 3/525 310/89 |
| 2015/0069864 | A1* | 3/2015 | Nagahama | H02K 29/08 310/50 |
| 2015/0069873 | A1* | 3/2015 | Lam | H02K 1/17 310/154.13 |
| 2016/0201762 | A1* | 7/2016 | Chen | B60K 7/0007 74/325 |

\* cited by examiner

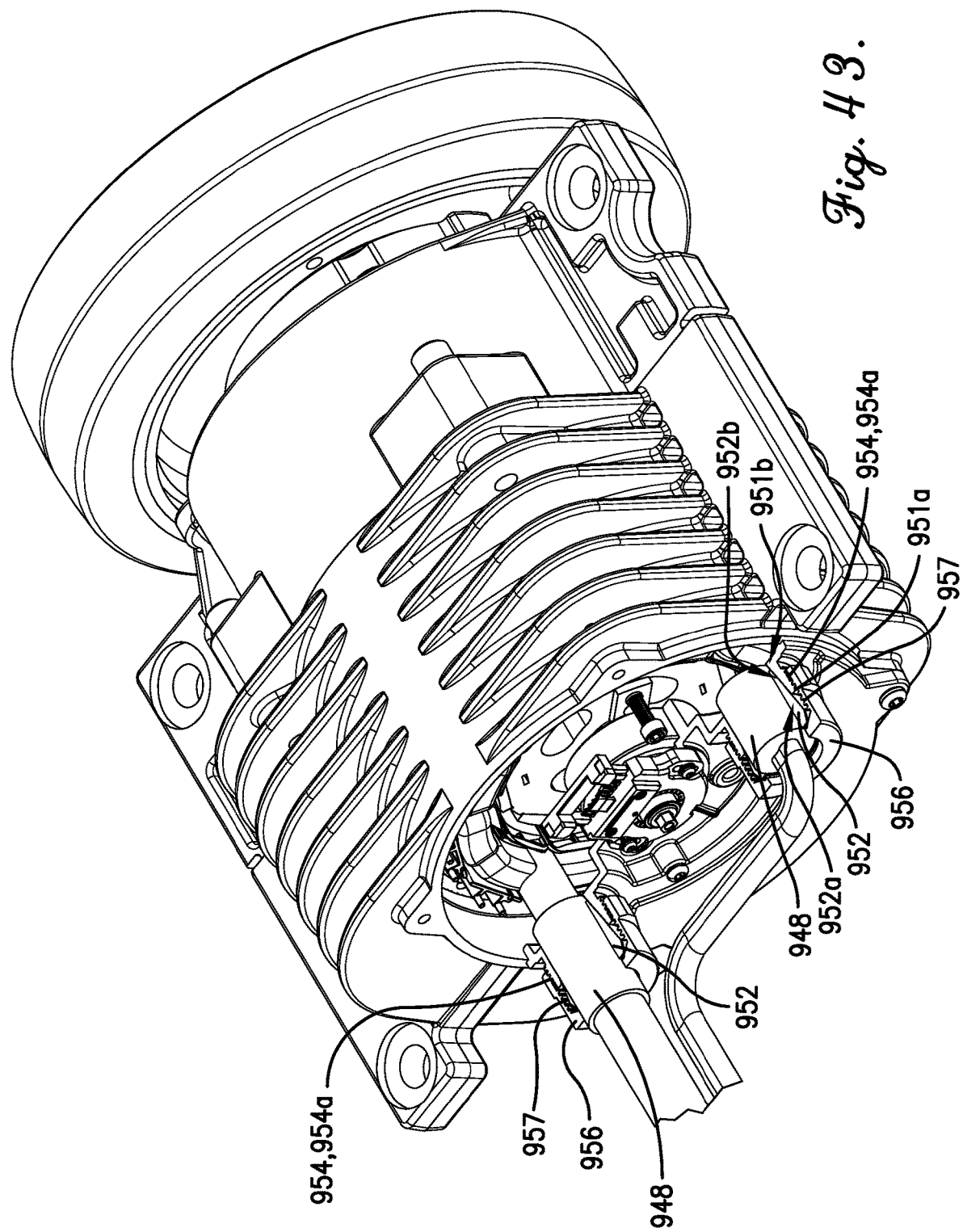

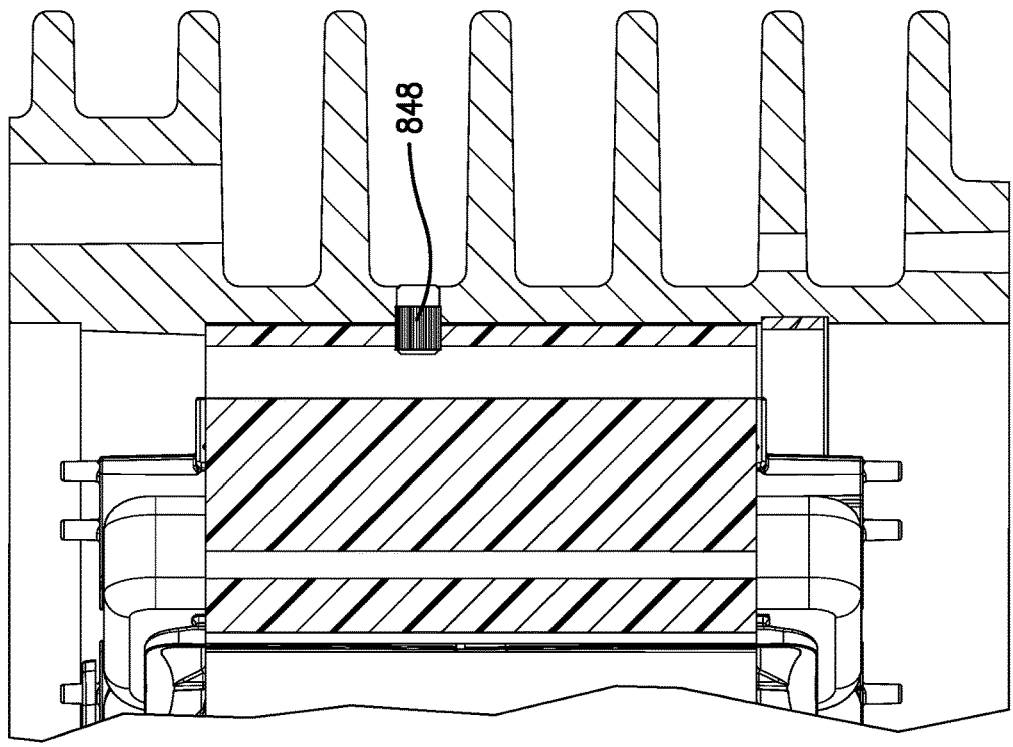
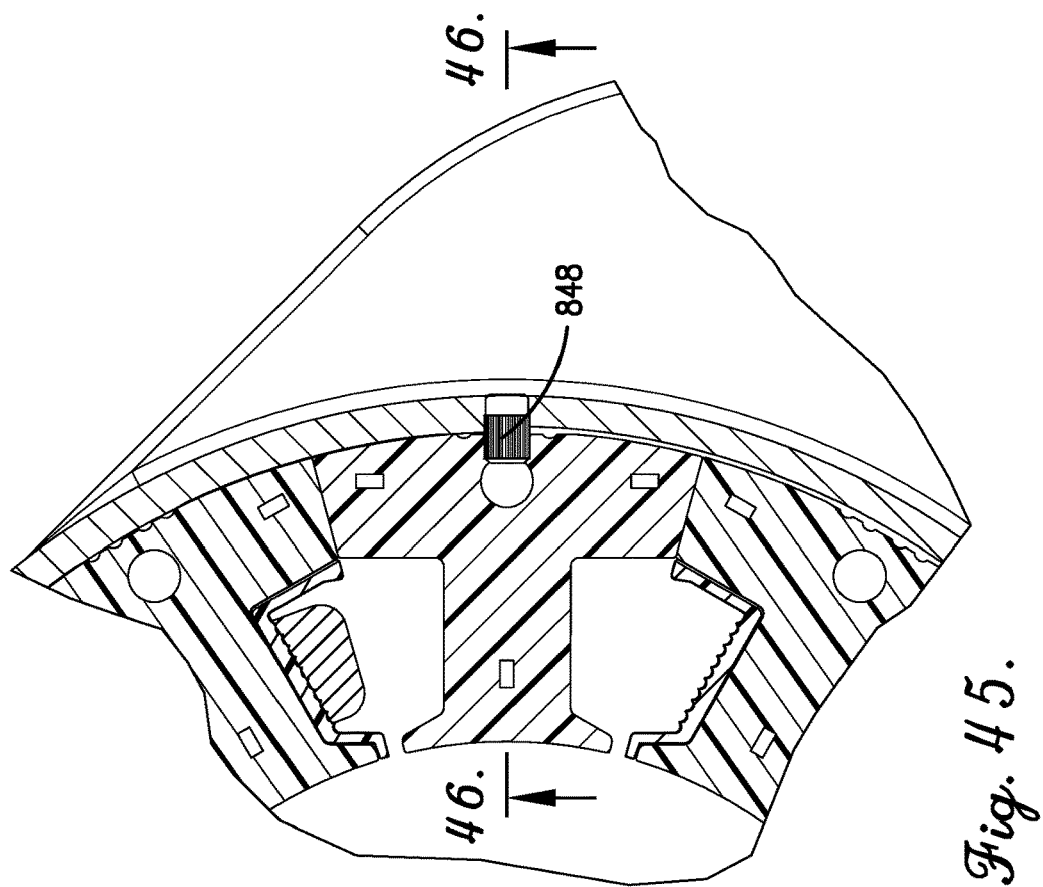

STATOR CORE END CAPS

CROSS-REFERENCE TO RELATED APPLICATIONS

The present application is a continuation of U.S. patent application Ser. No. 14/960,138, filed Dec. 4, 2015, which claims the benefit of and priority from U.S. Provisional Application No. 62/088,463, filed Dec. 5, 2014, the entire disclosure of each of which is hereby incorporated by reference herein.

BACKGROUND OF THE INVENTION

1. Field of the Invention

The present invention relates generally to an electric motor. The motor is preferably for use in an automated vehicle or, more particularly, in a robot for use in a warehousing system. However, any one or more of a variety of motor uses are suitable.

2. Discussion of the Prior Art

Those of ordinary skill in the art will appreciate that electric motors are often used in a variety of applications, including but not limited to vehicles, automated devices, home appliances such as dishwashers and washing machines, exercise equipment, pumps, and more.

SUMMARY

According to one aspect of the present invention, a stator comprises a generally toroidal core presenting axially opposed upper and lower core faces, an electrically insulative upper end cap fitted to the core, and an electrically insulative lower end cap fitted to the core. The upper and lower end caps extend toward each other and between the upper and lower core faces. The upper end cap includes upper interengaging structure. The lower end cap includes lower interengaging structure. The upper and lower interengaging structures engage one another at a juncture, such that the upper and lower end caps cooperatively encompass at least part of the core.

BRIEF DESCRIPTION OF THE DRAWING FIGURES

Preferred embodiments of the invention are described in detail below with regard to the attached drawing figures, wherein.

Figure 1:
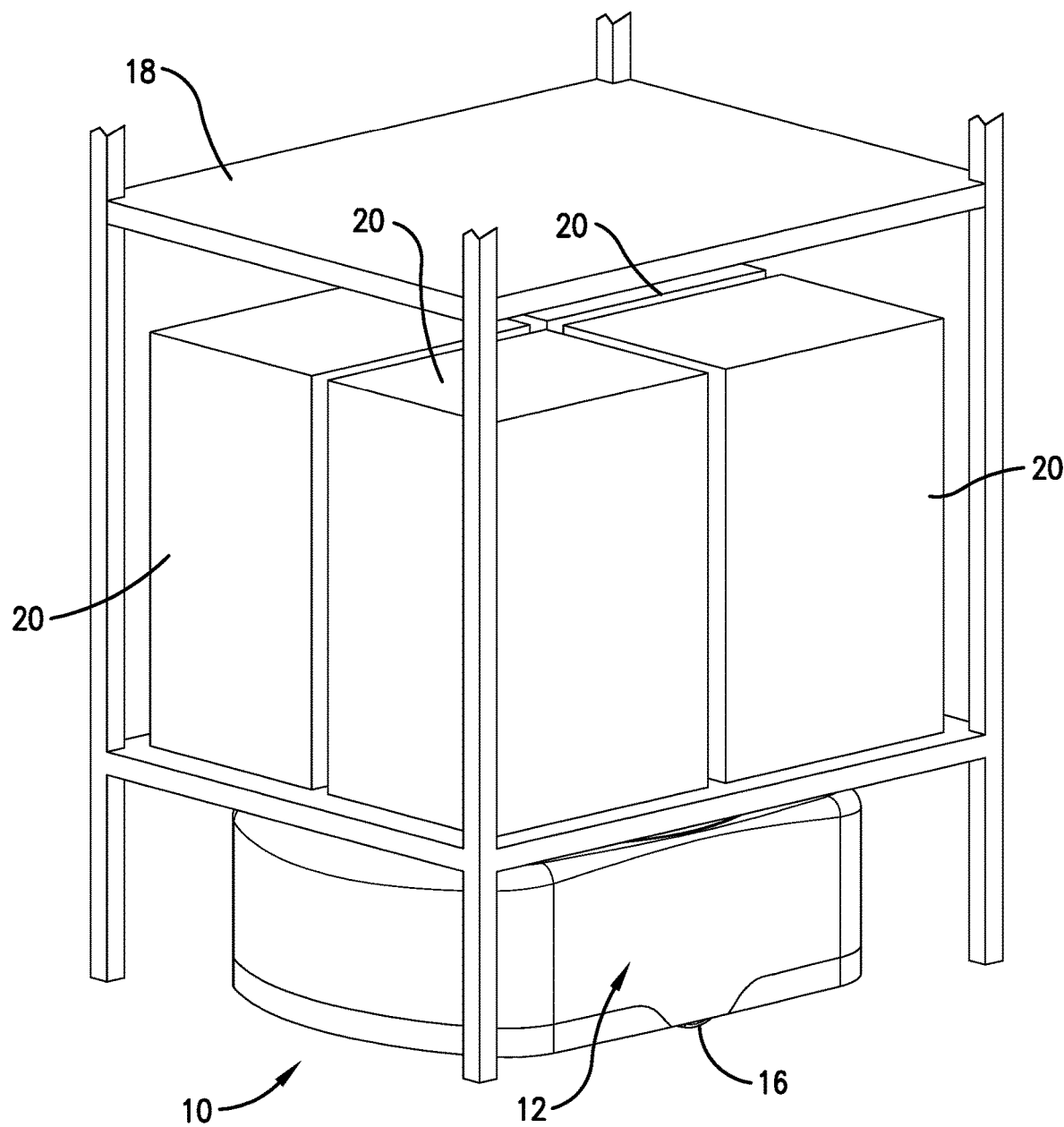
FIG. 1 illustrates a robot, shelving, and goods, wherein the robot is operable to transport the shelving and goods.
Figure 2:
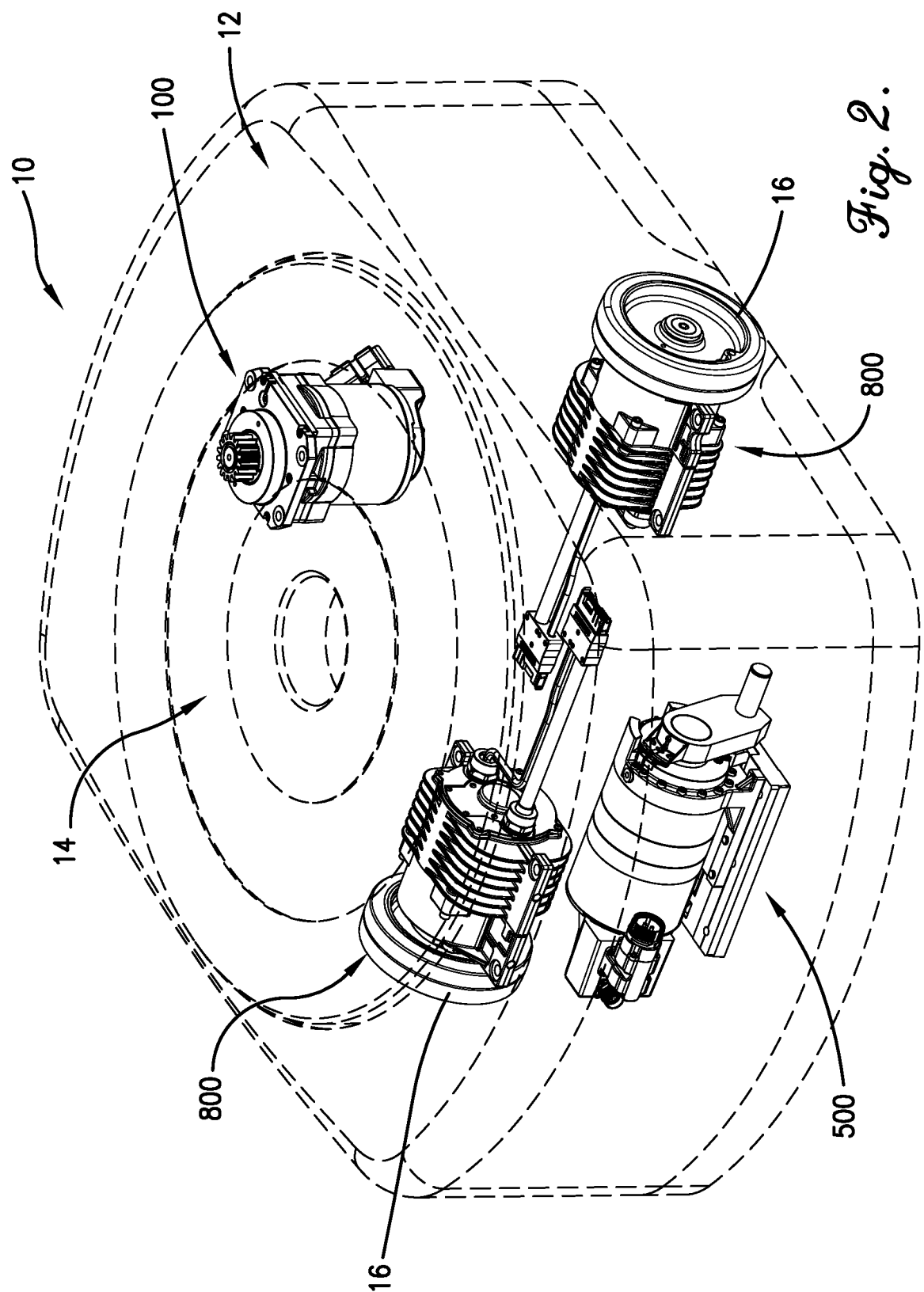
FIG. 2 illustrates the robot of FIG. 1, including the turntable, lift, and locomotion motors provided in the robot in accordance with a preferred embodiment of the present invention.
Figure 3:
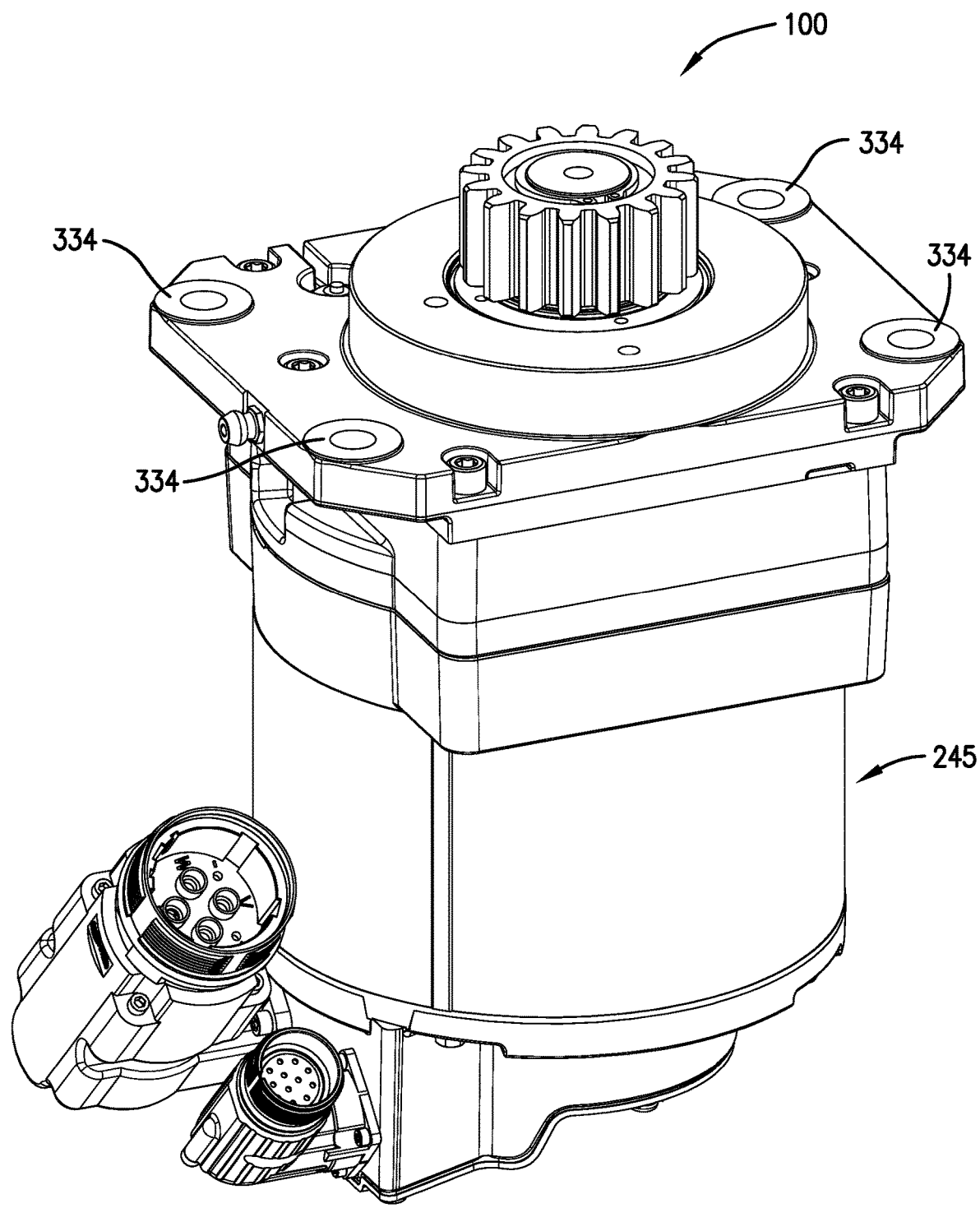
FIG. 3 is a top perspective view of the turntable motor of FIG. 2.
Figure 4:
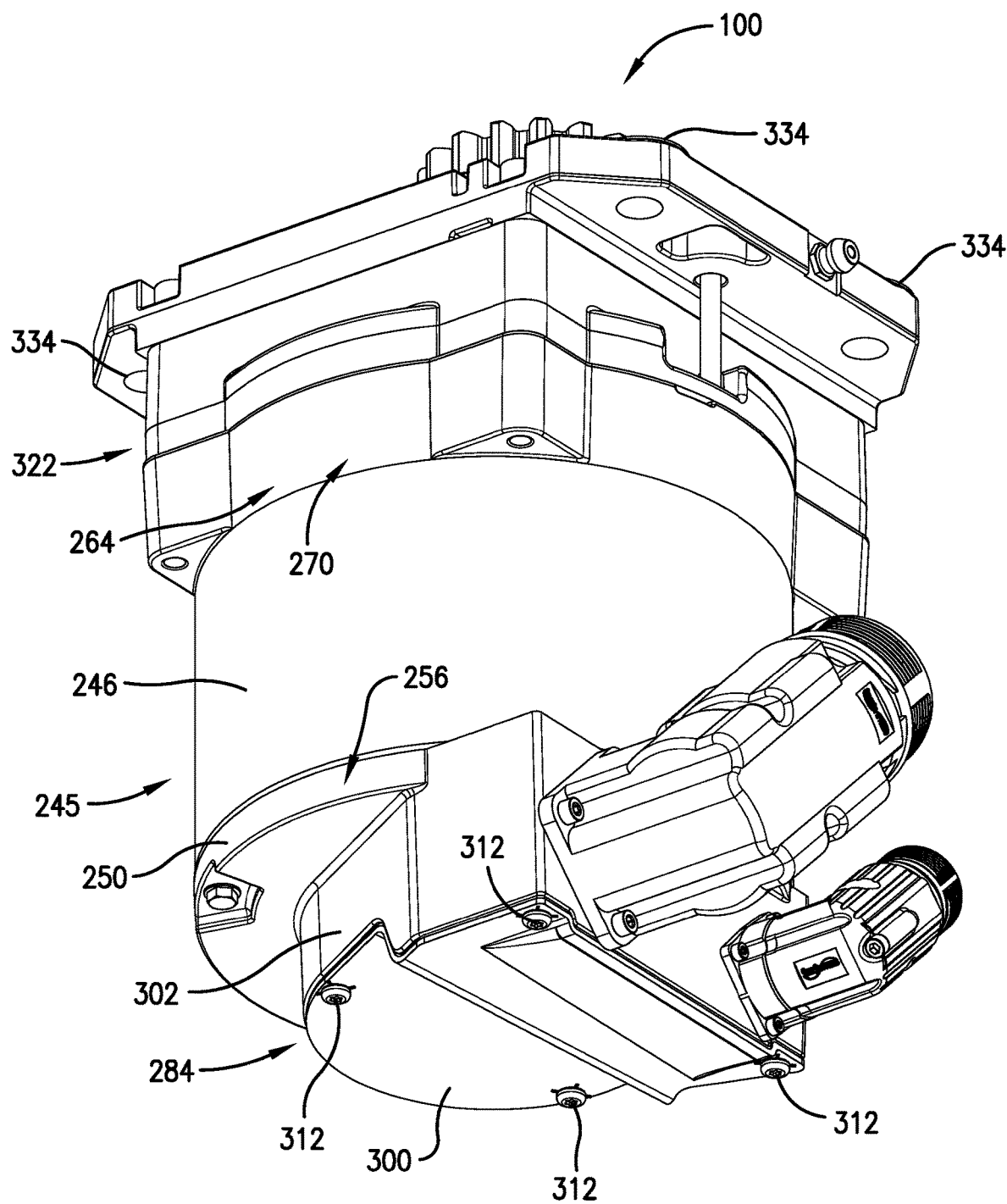
FIG. 4 is a bottom perspective view of the turntable motor of FIGS. 2 and 3.
Figure 5:
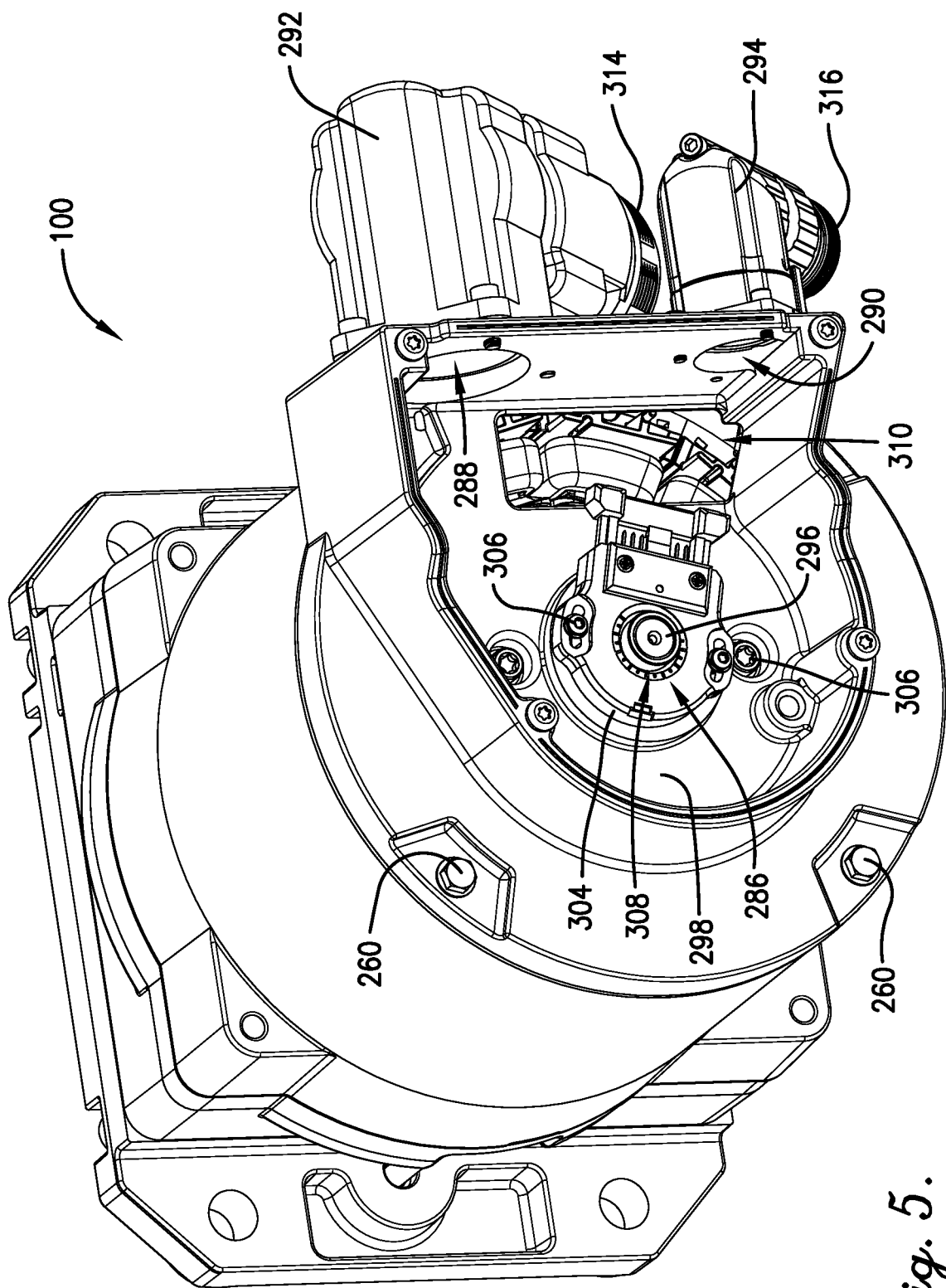
FIG. 5 is a bottom perspective view of the turntable motor of FIGS. 2-4, with the connection box cover removed.
Figure 10:
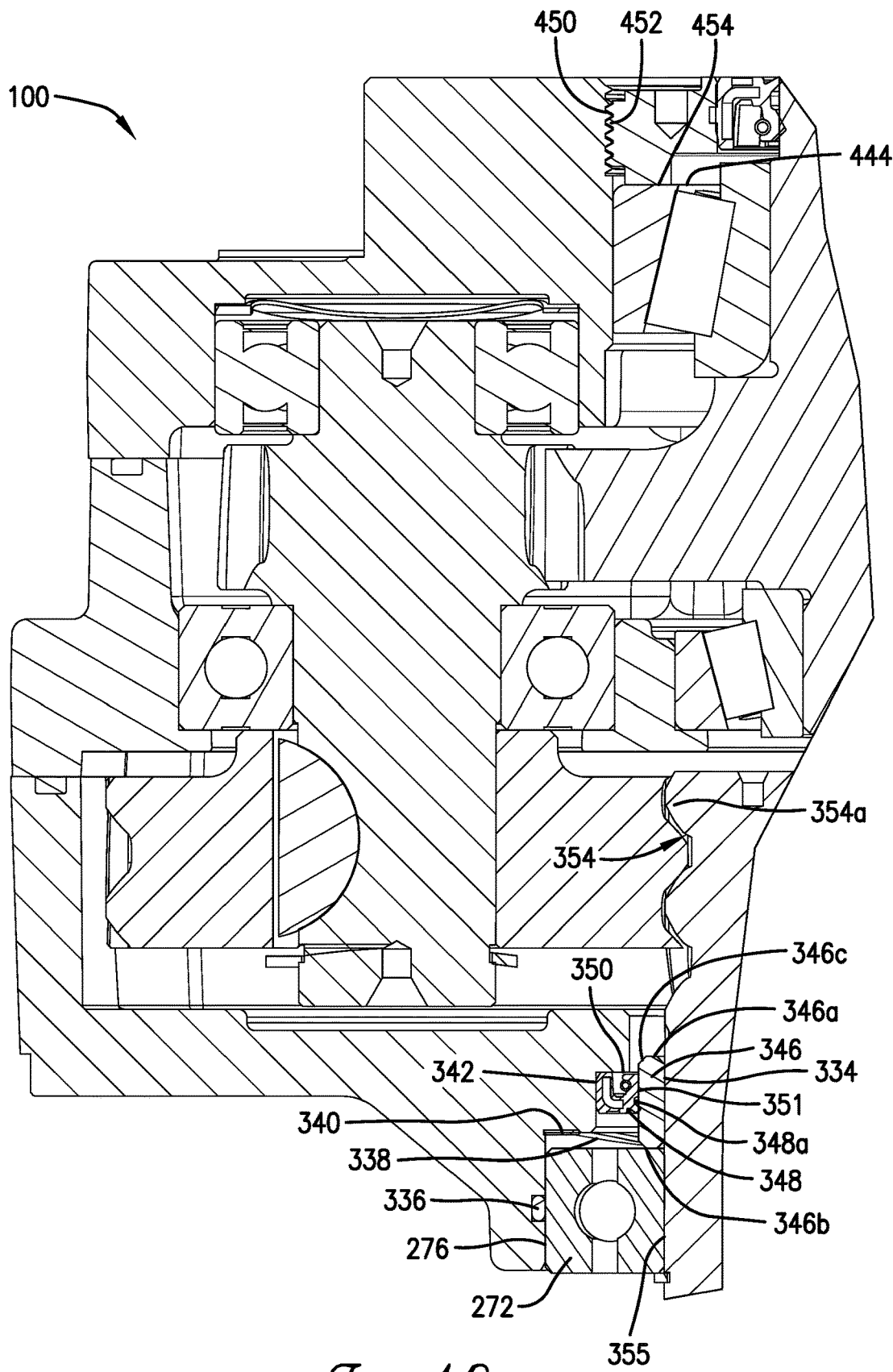
FIG. 10 is an enlarged cross-sectional side view of a portion of the turntable motor of FIGS. 2-9, particularly illustrating the gear assembly, the oil sealing system, and the sealing sleeve.
Figure 10A:
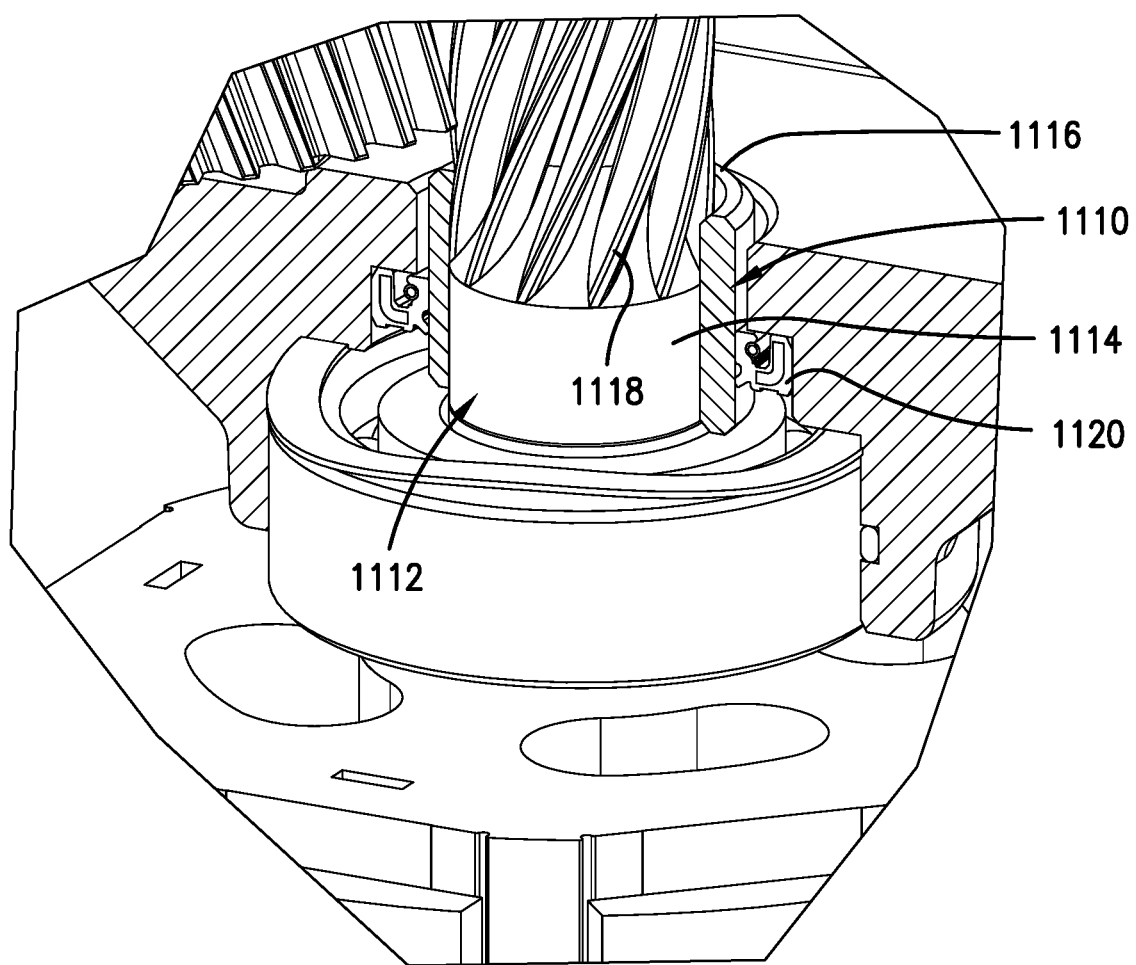
Figure 11:
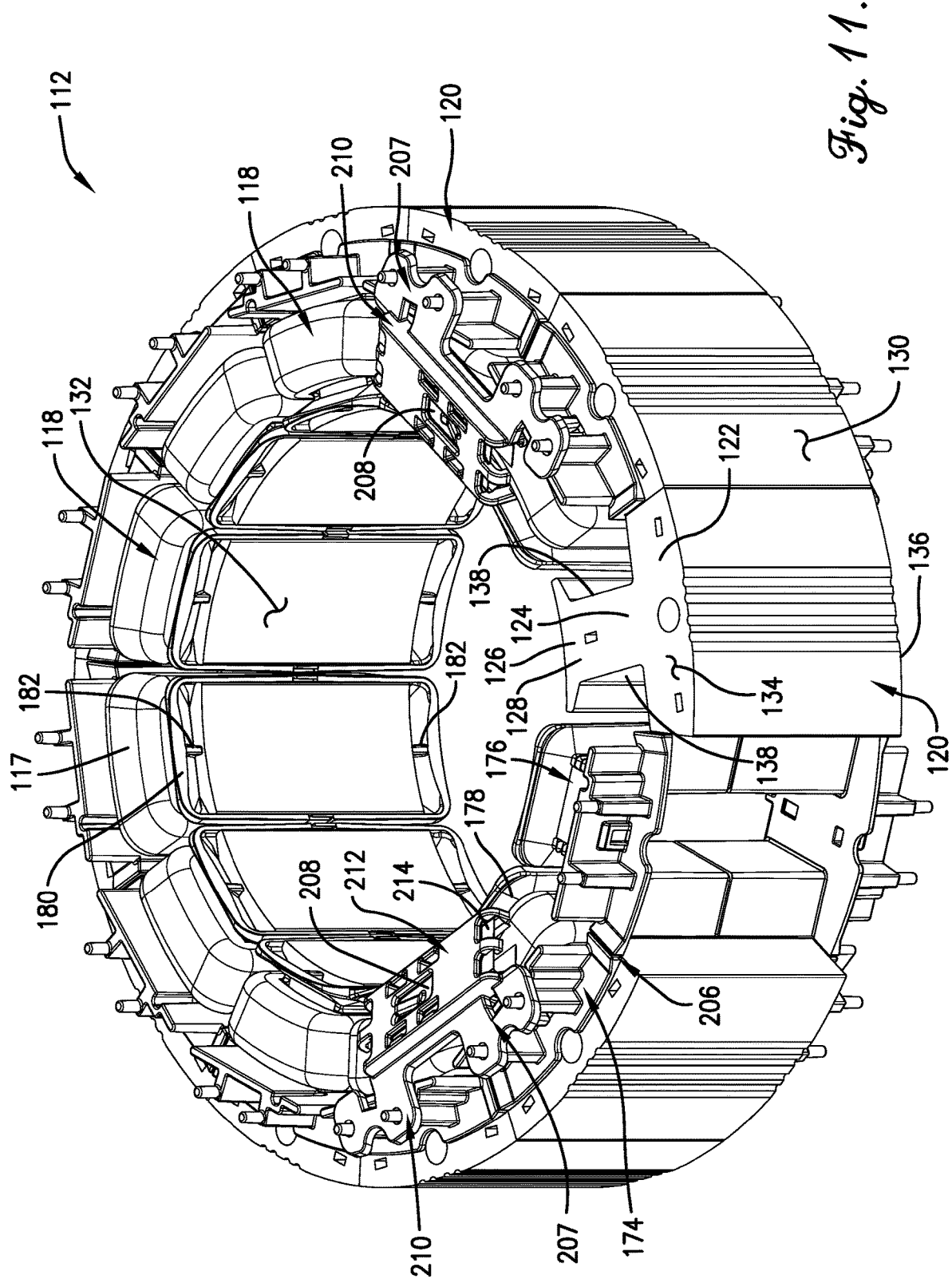
Figure 12:
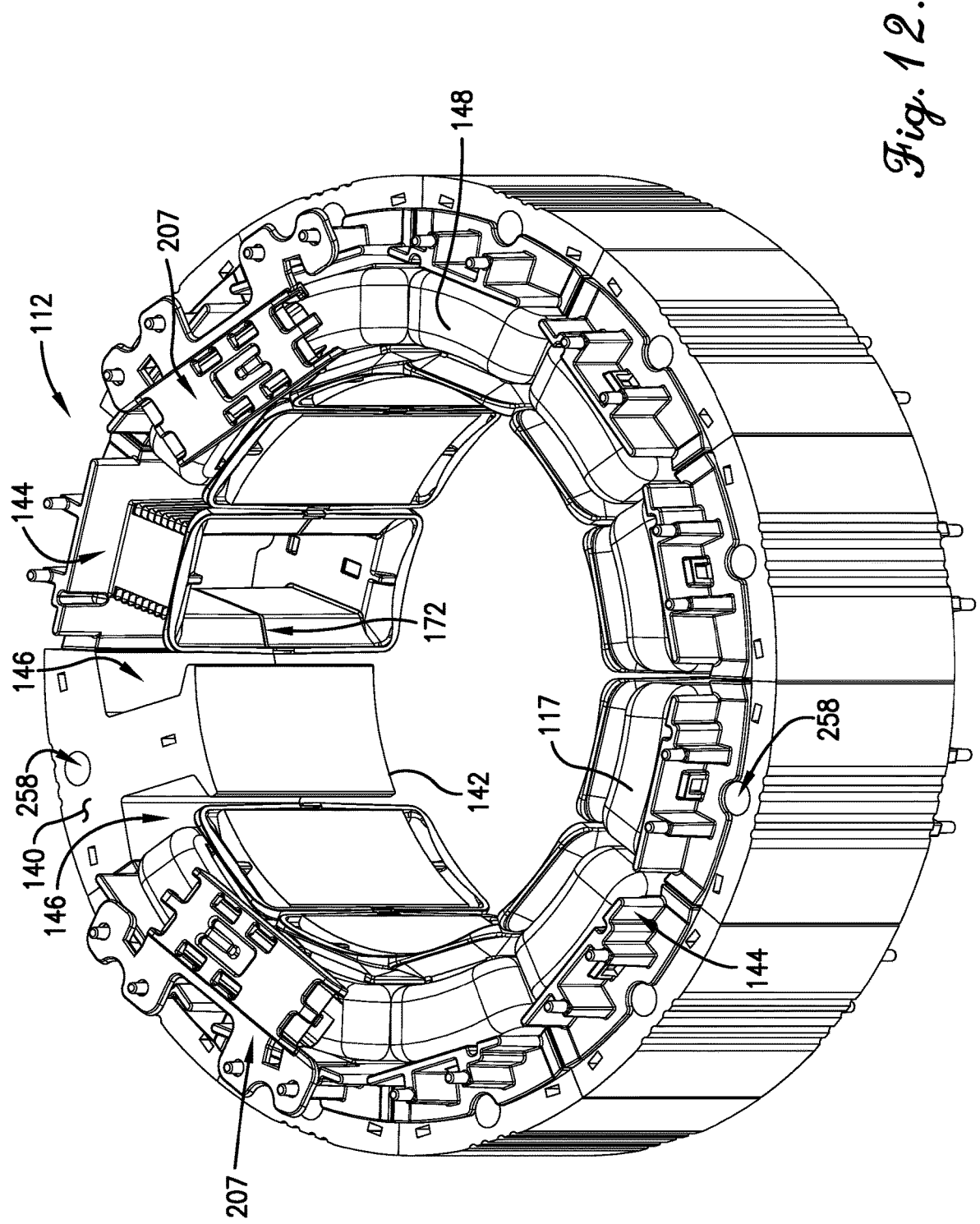
Figure 14:
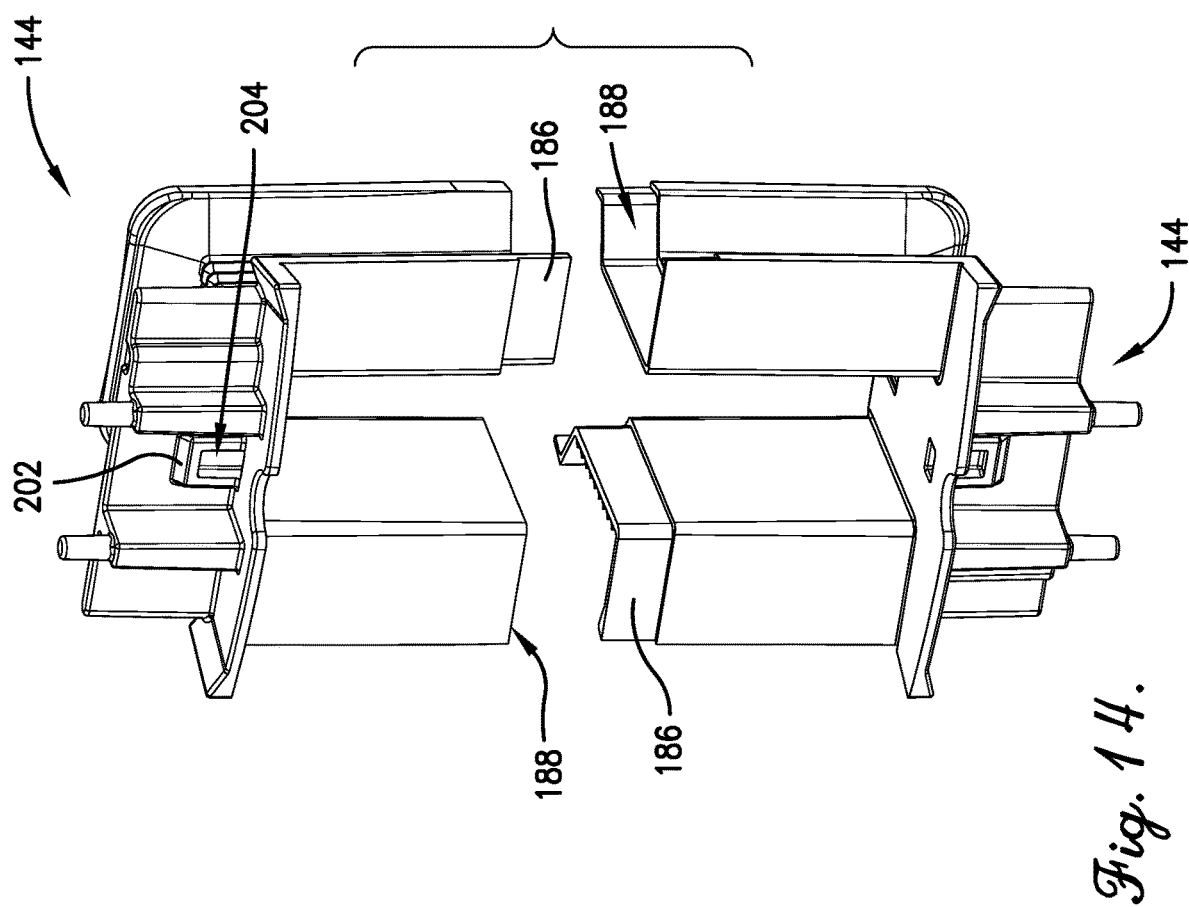
Figure 13:
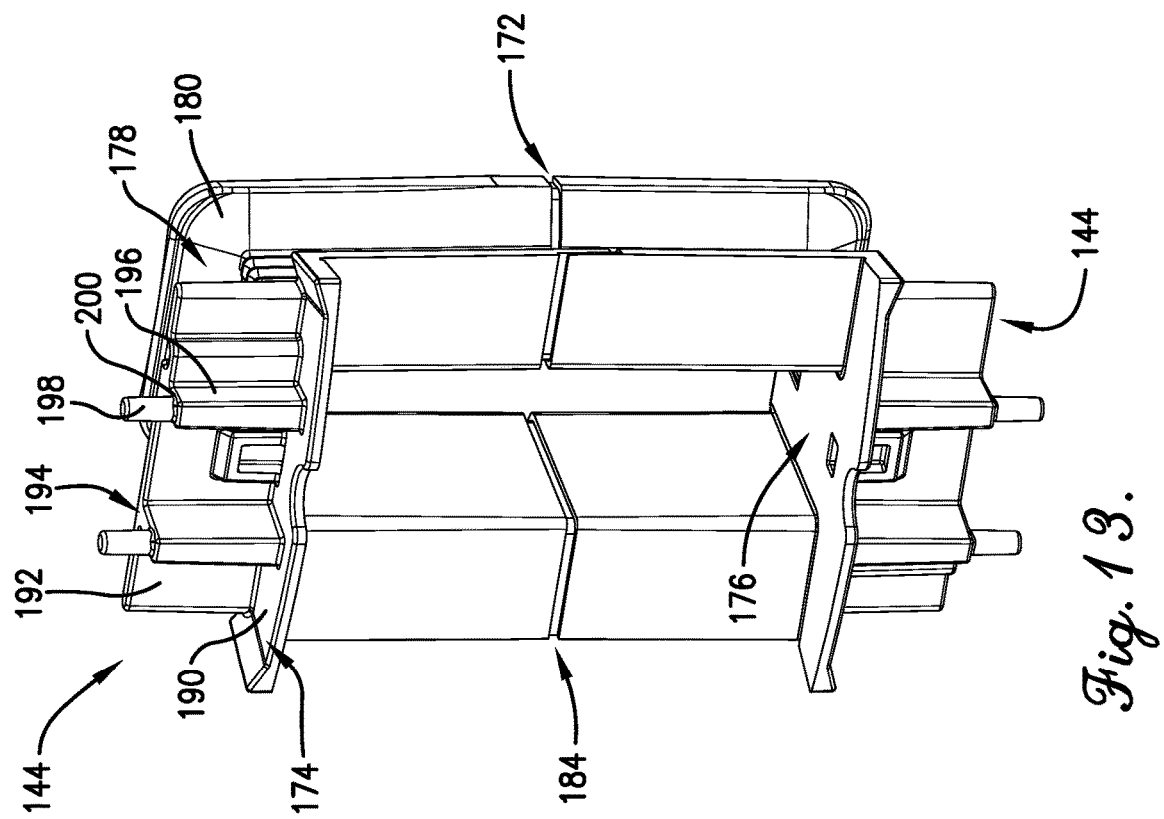
Figure 15:
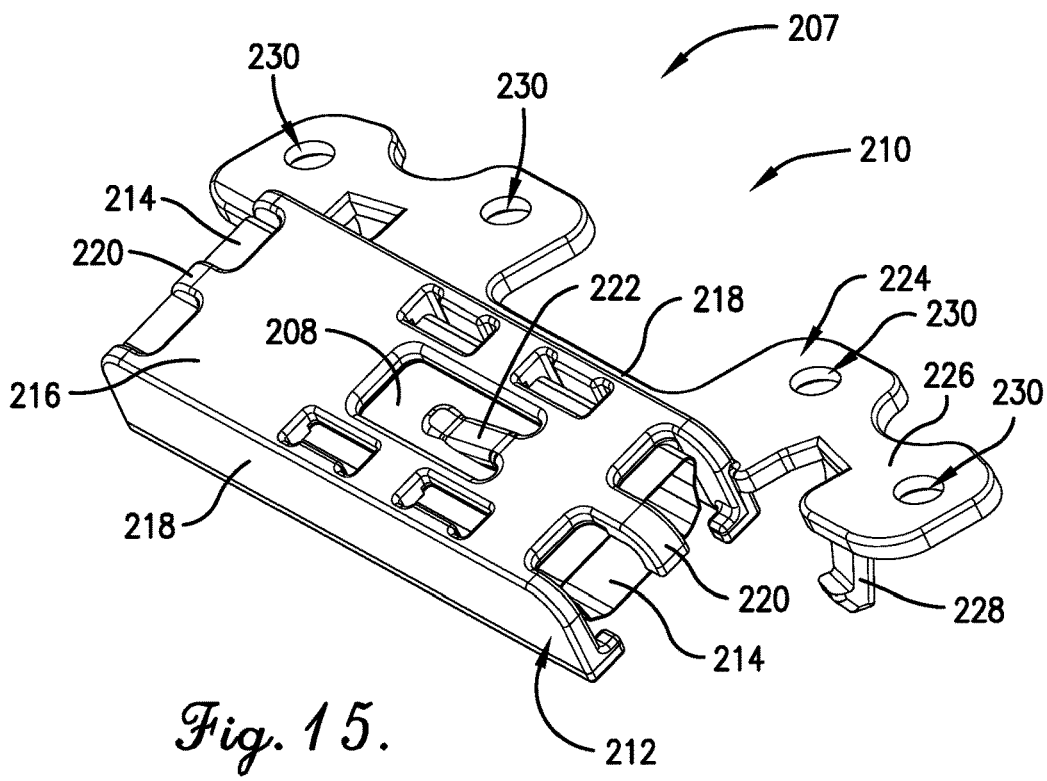
Figure 16:
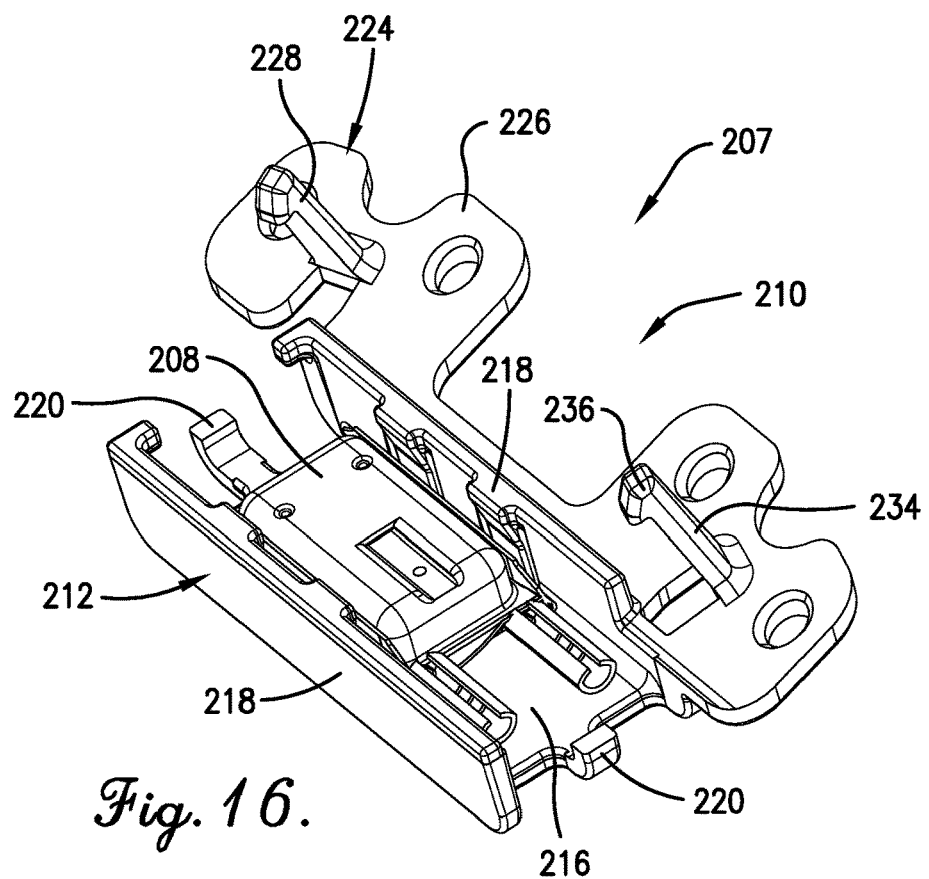
Figure 17:
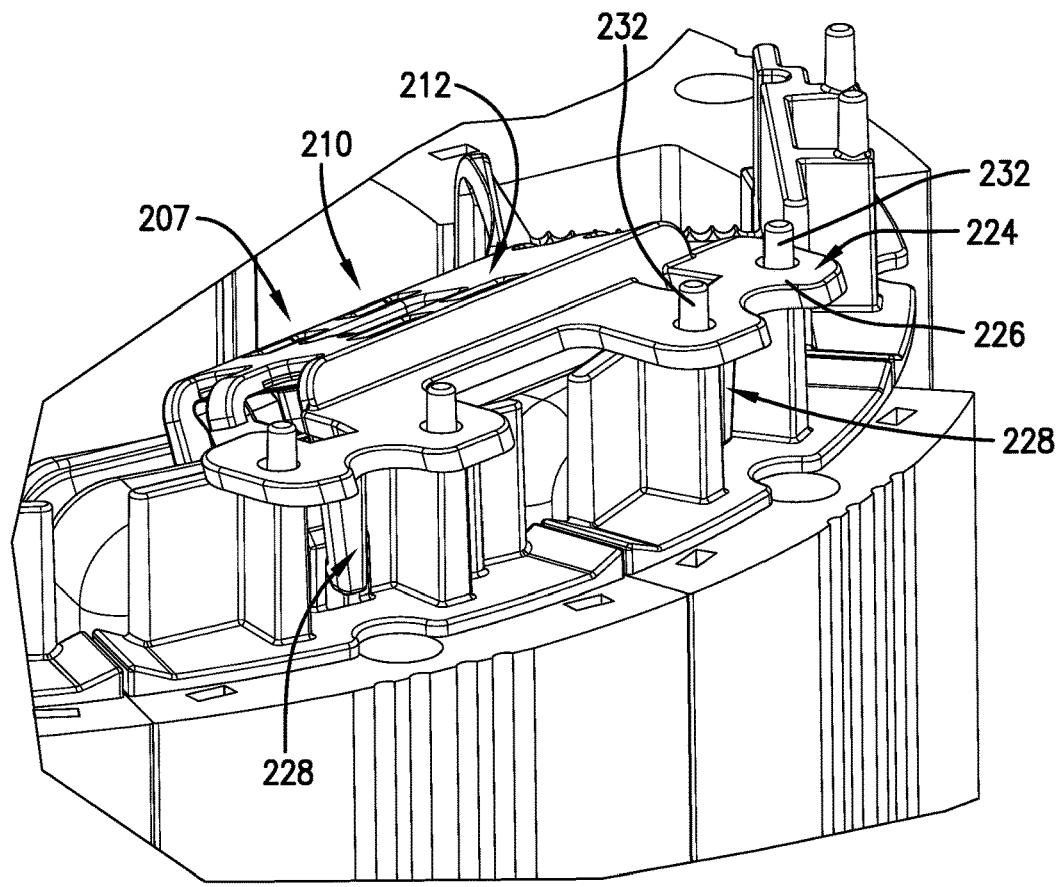
Figure 18:
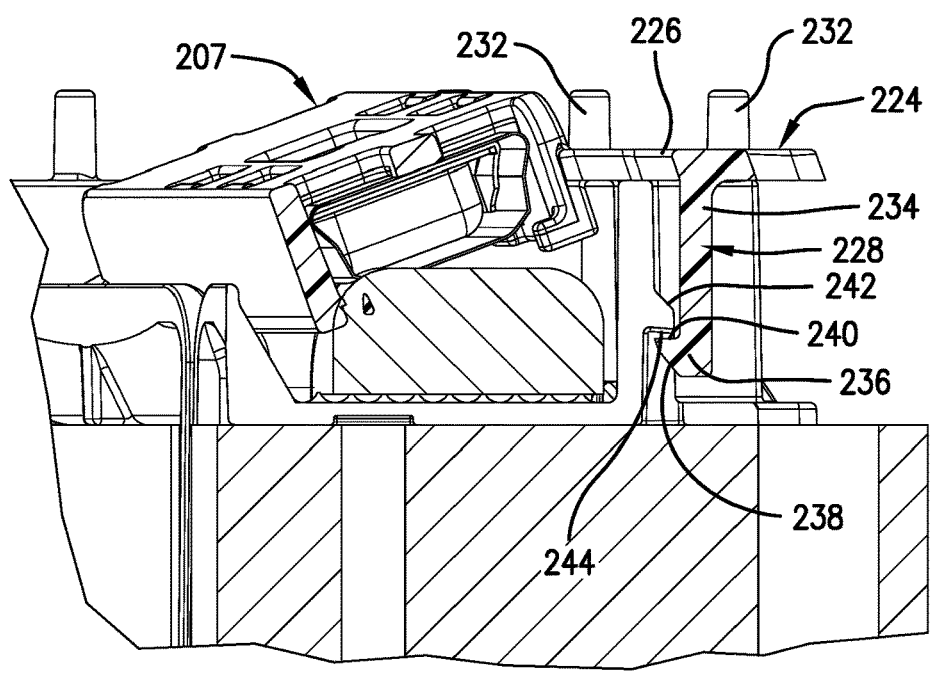
Figure 19:
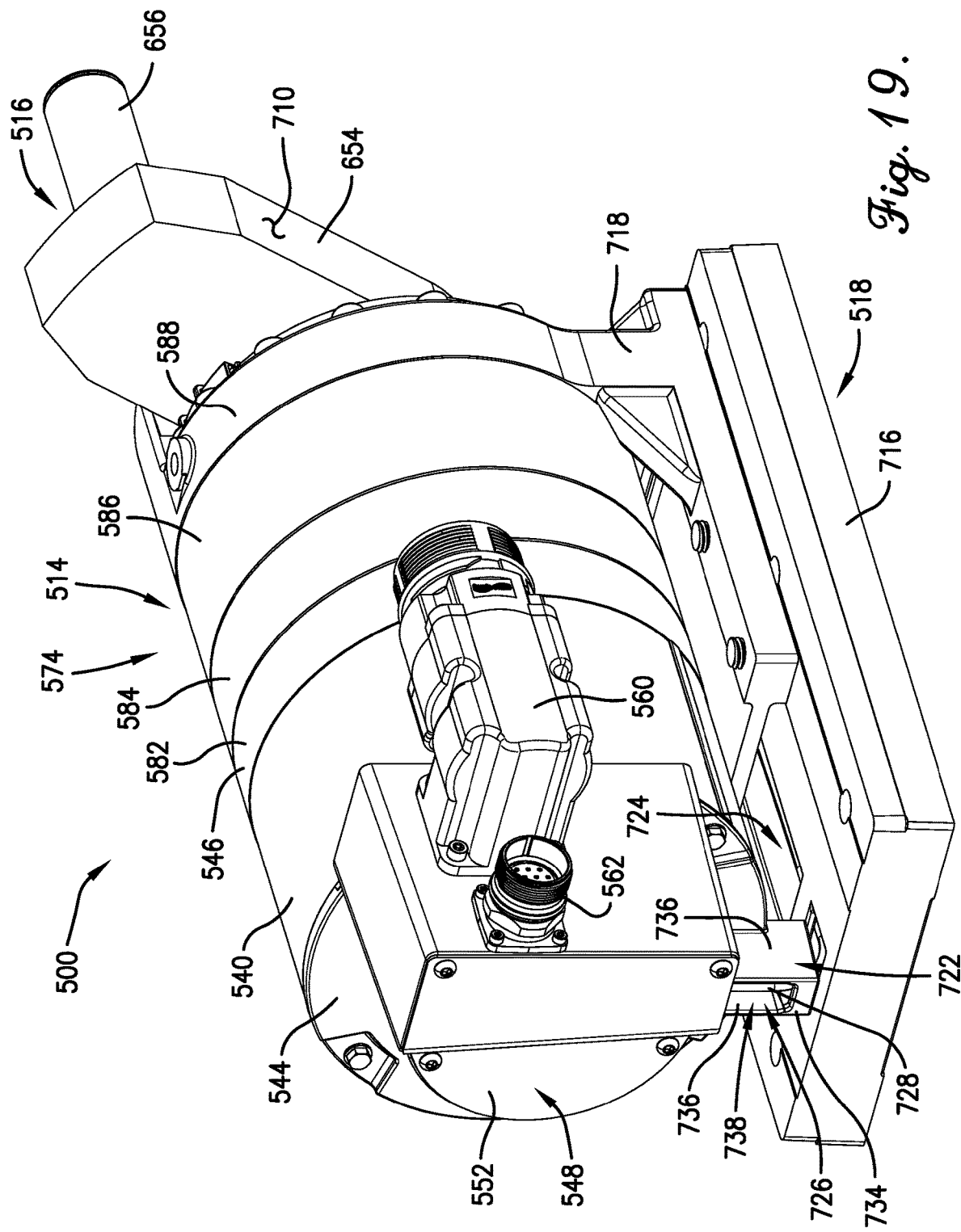
Figure 20:
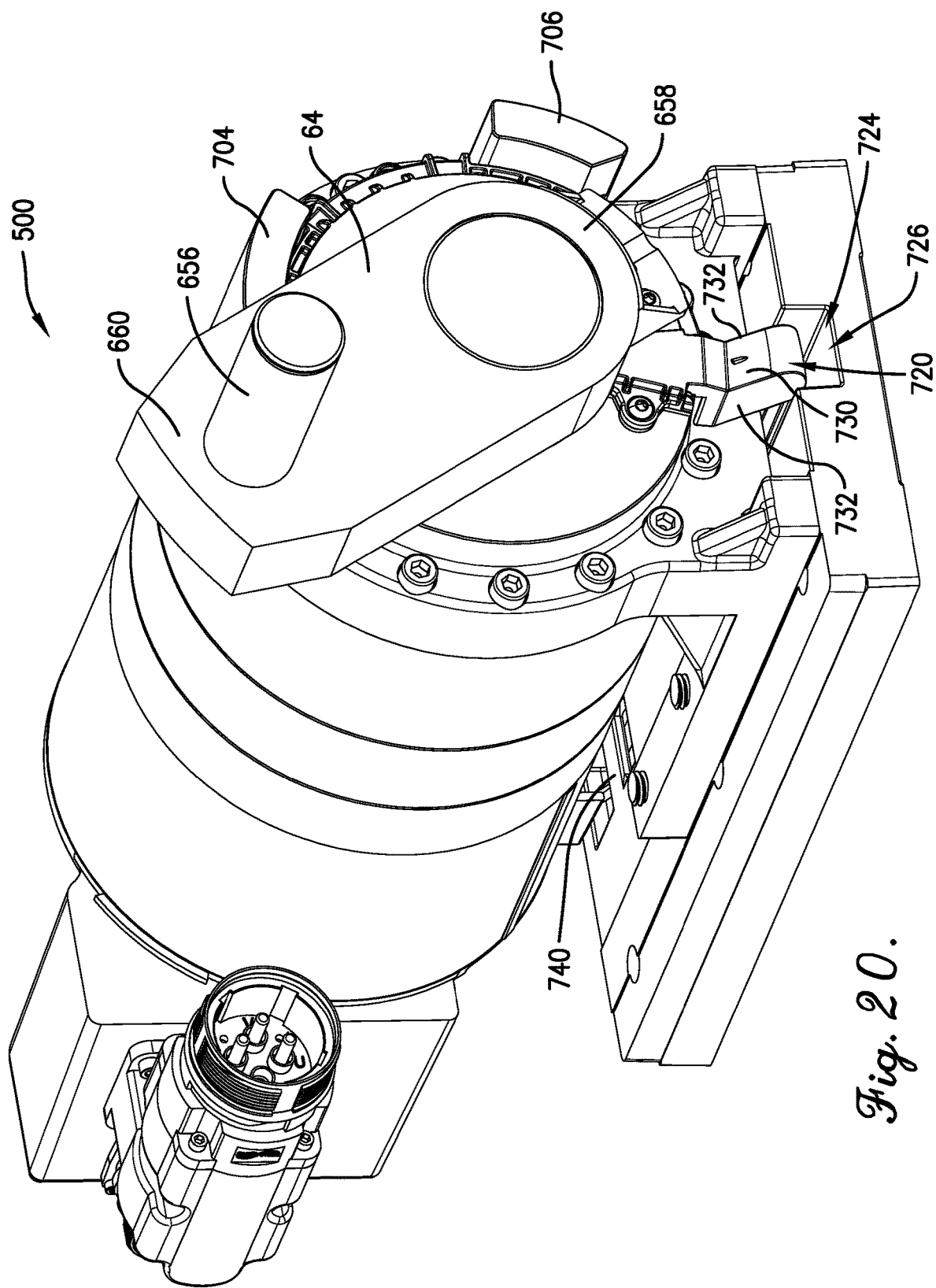
Figure 21:
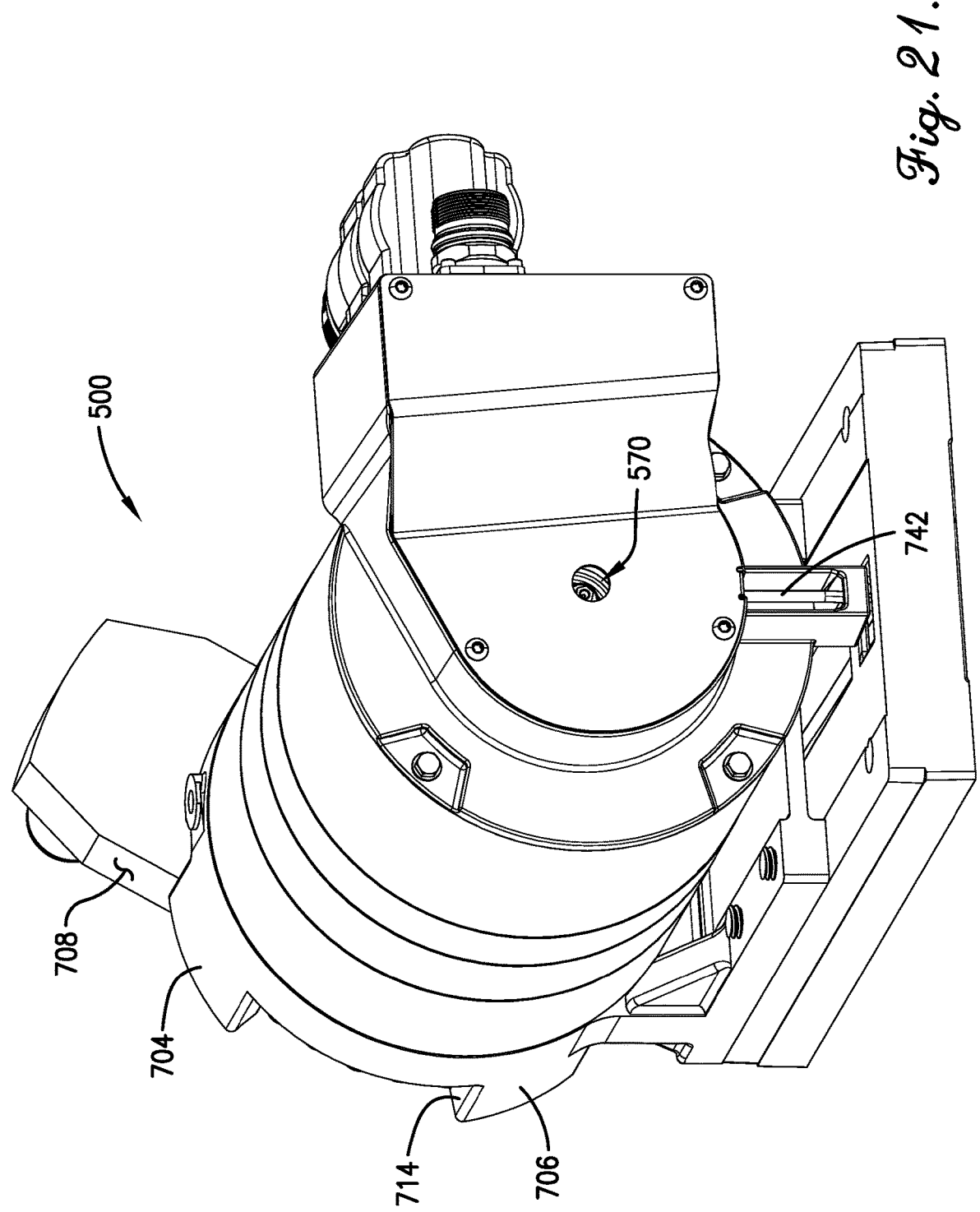
Figure 22:
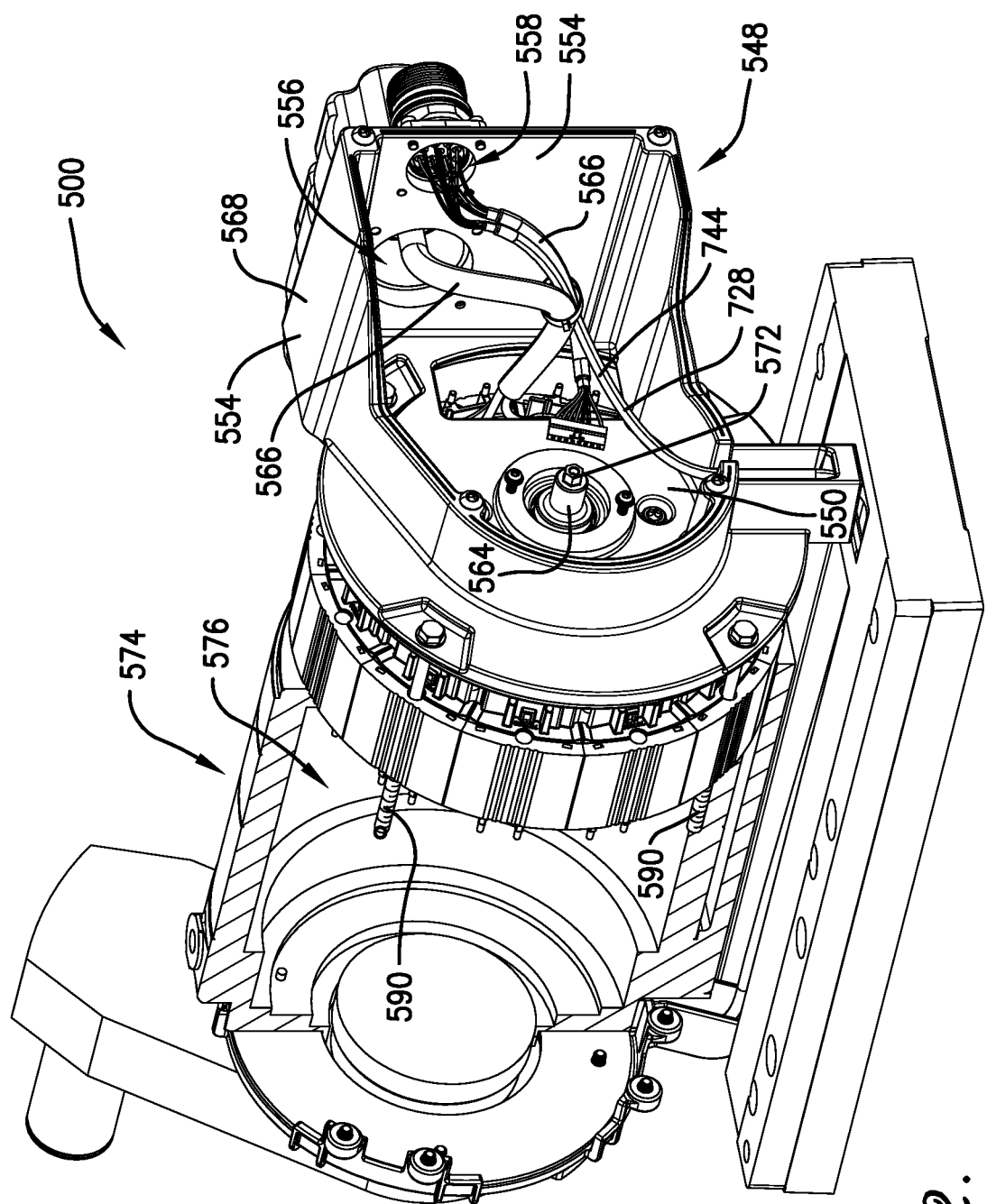
Figure 23:
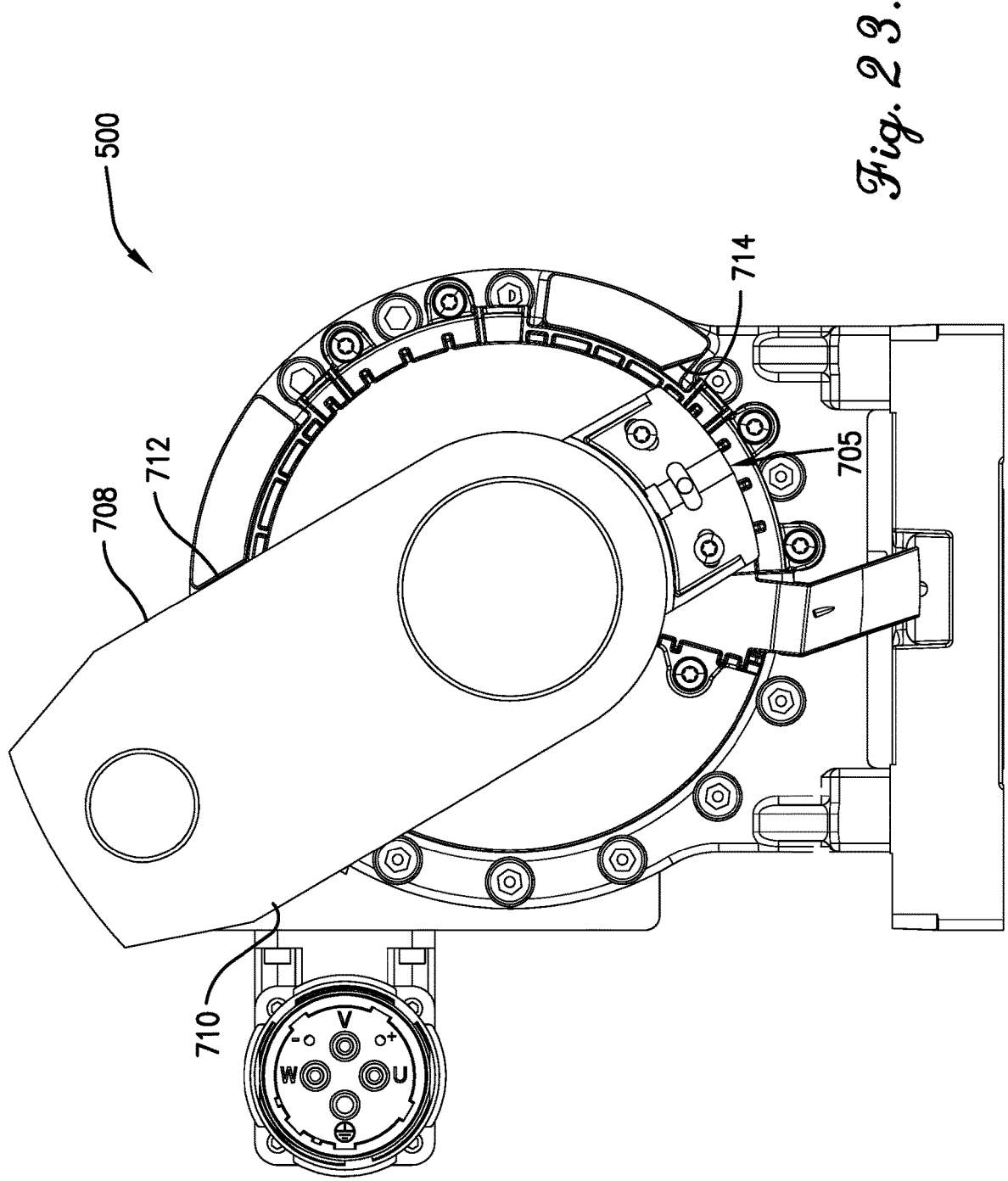
Figure 24:
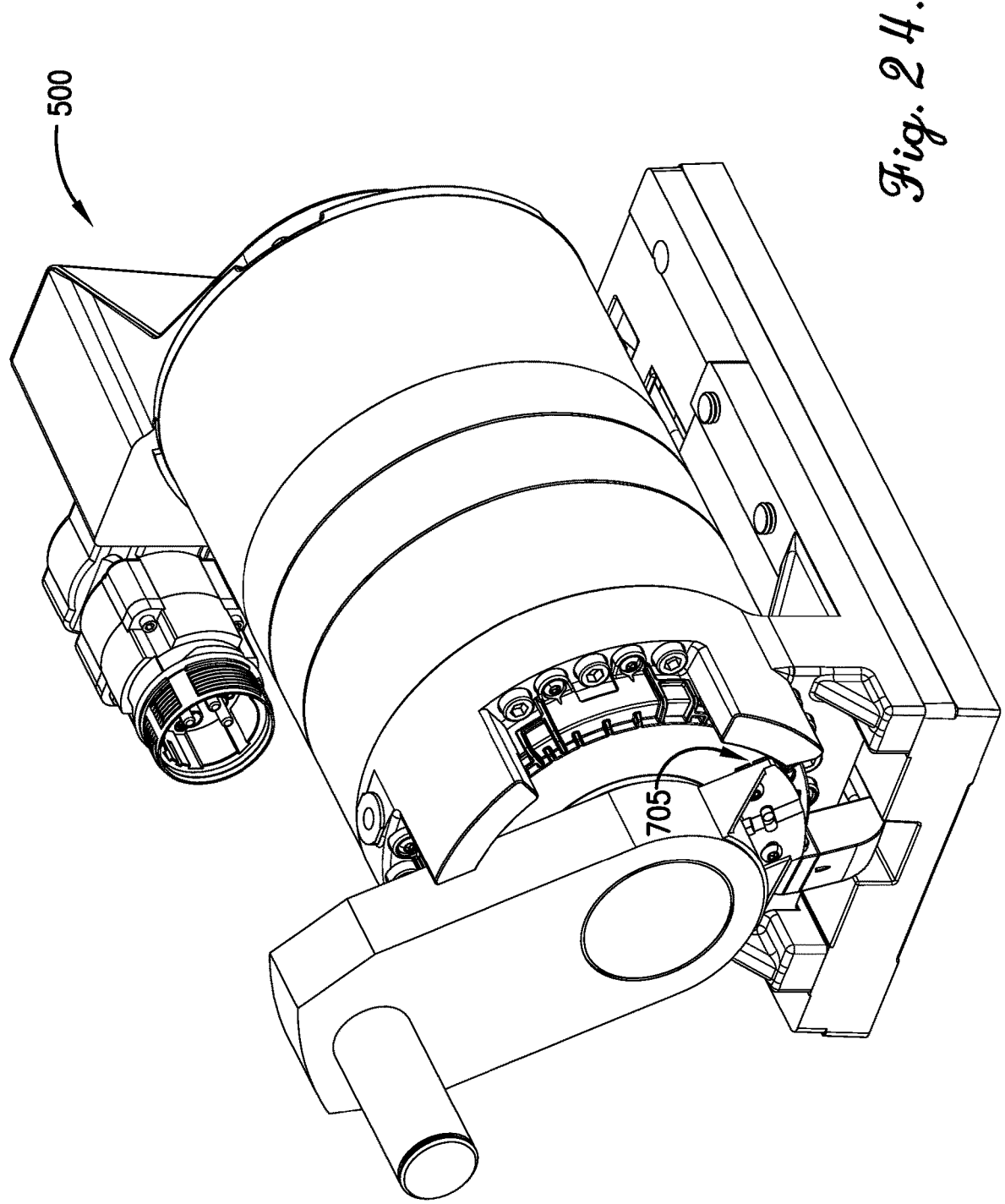
Figure 25:
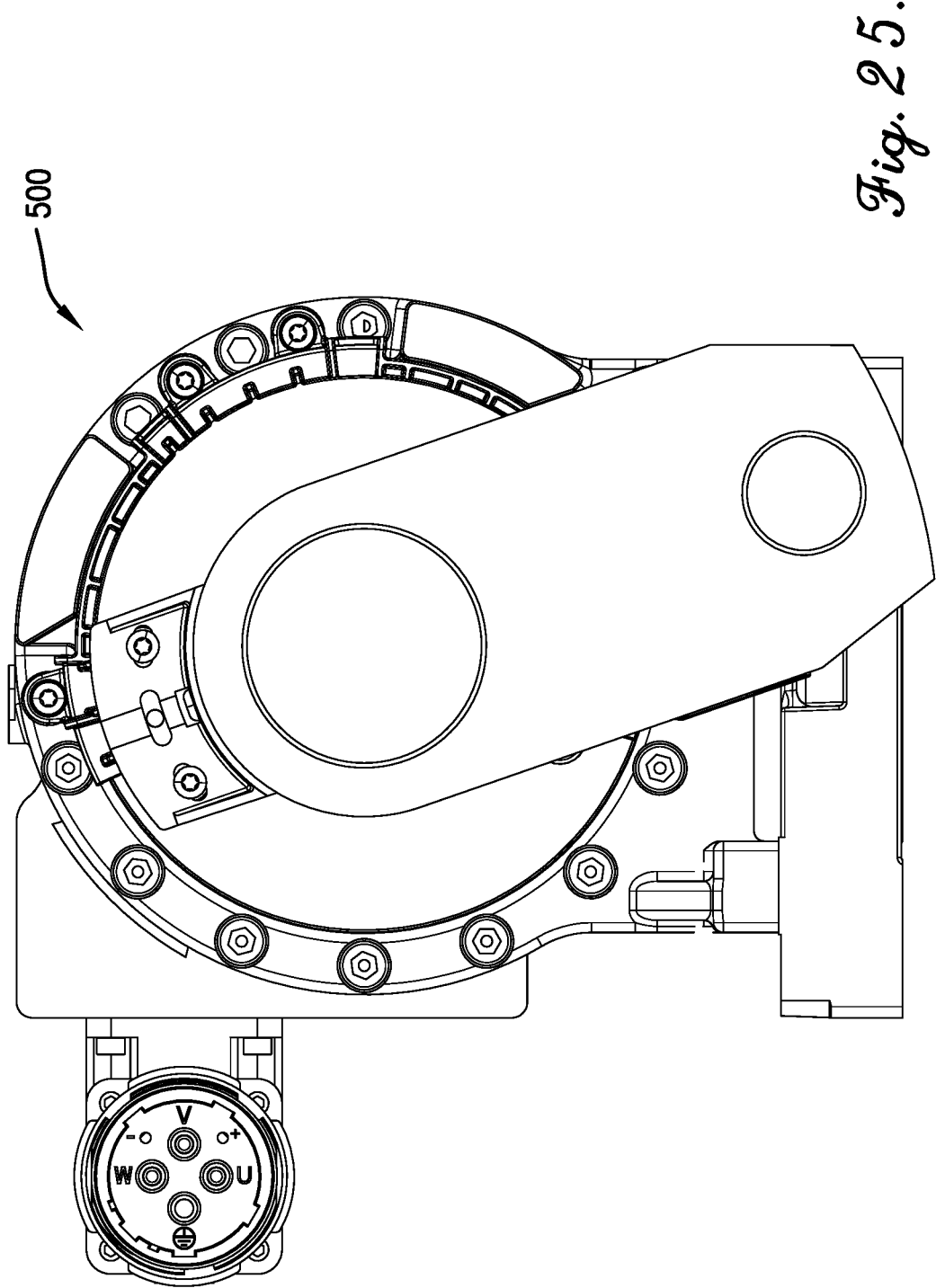
Figure 26:
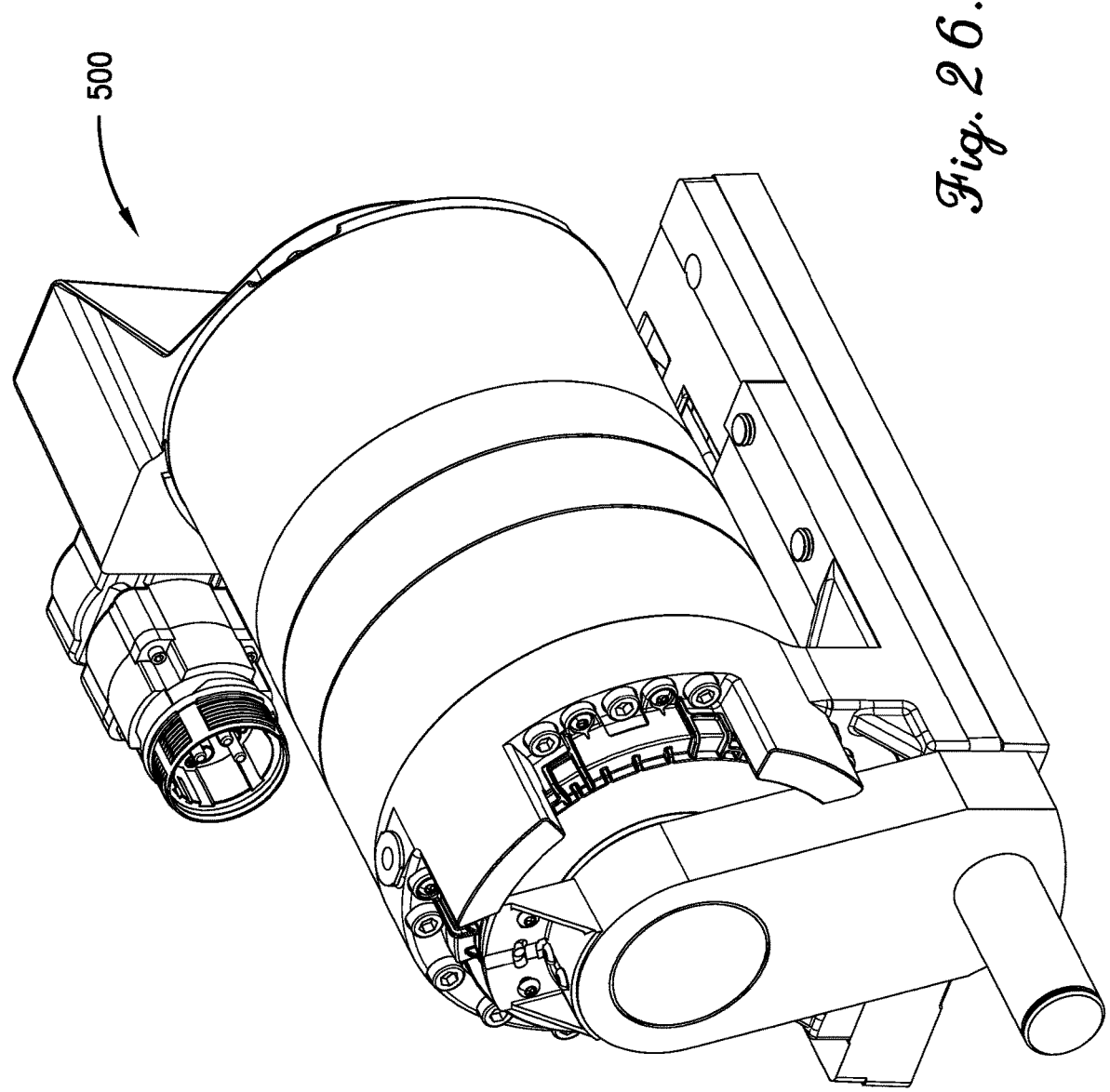
Figure 27:
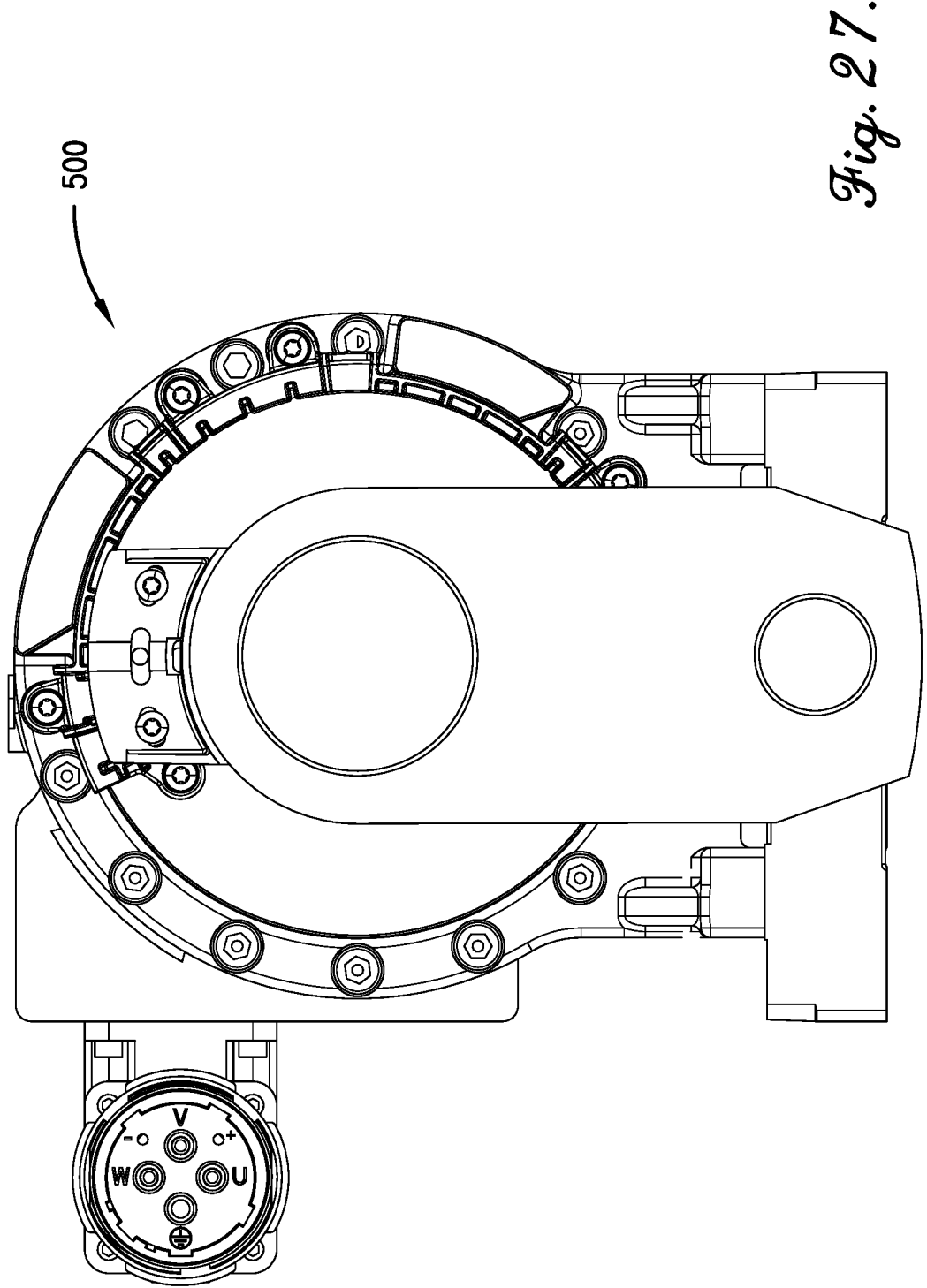
Figure 28:
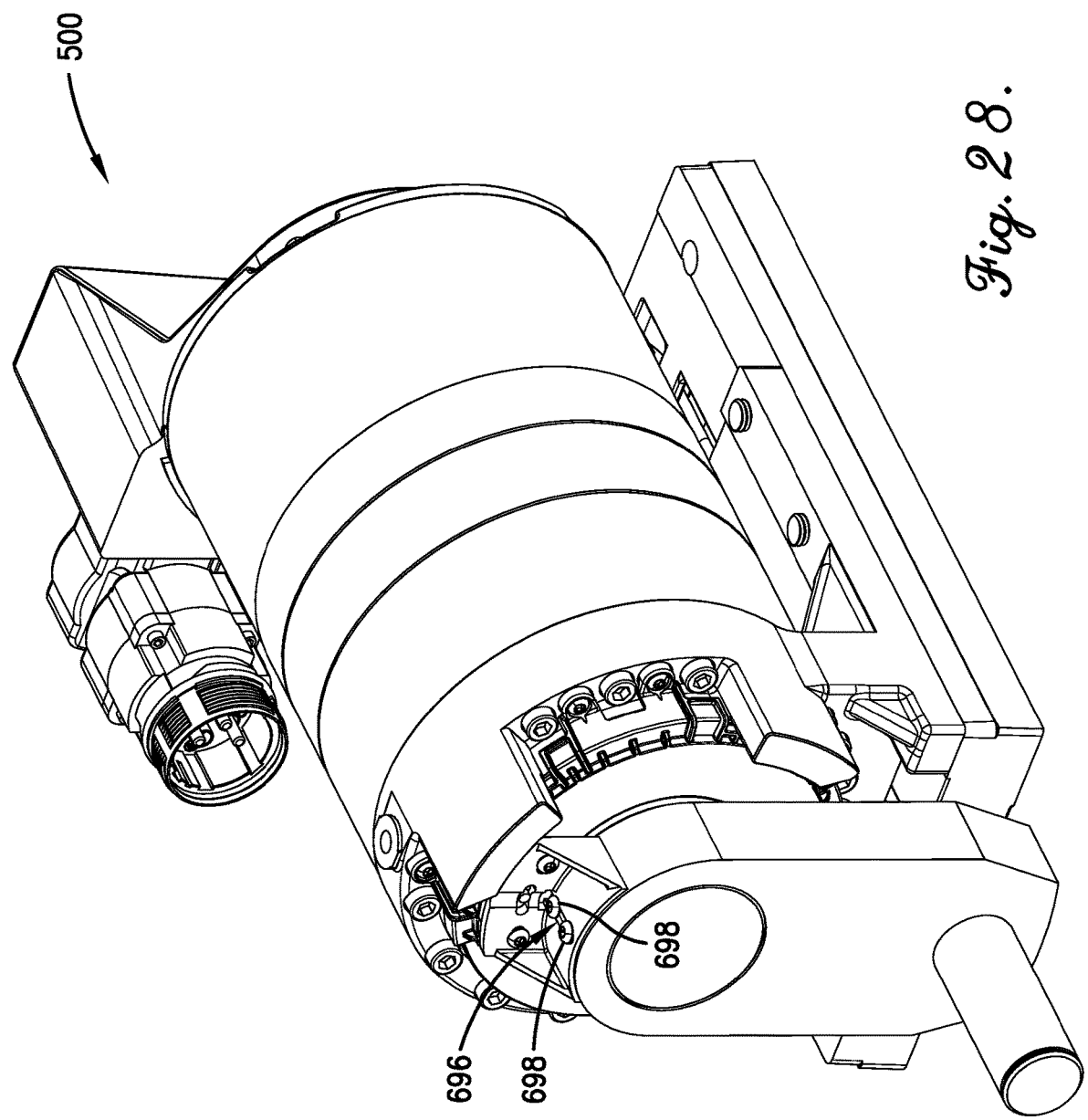
Figure 29:
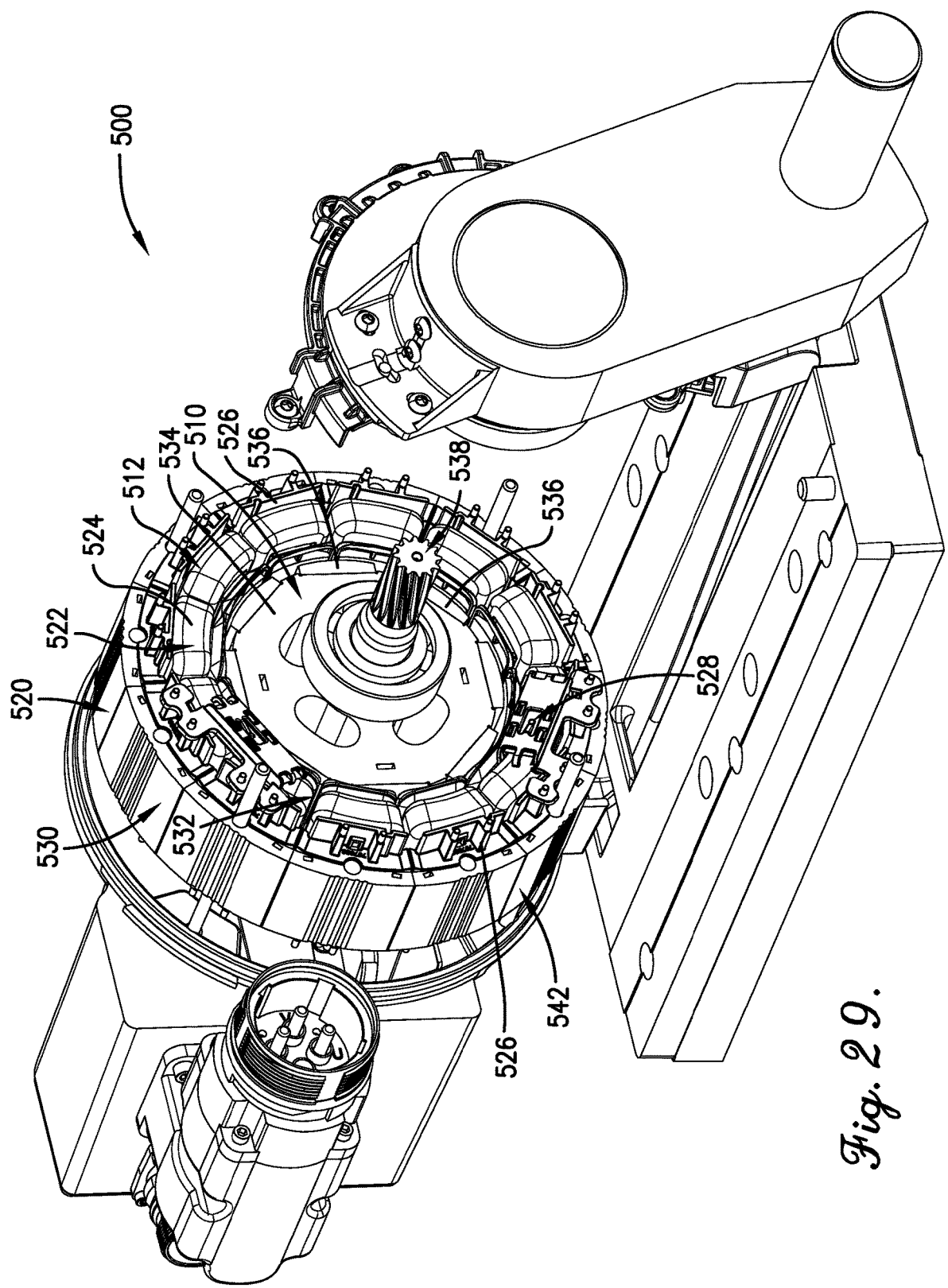
Figure 30:
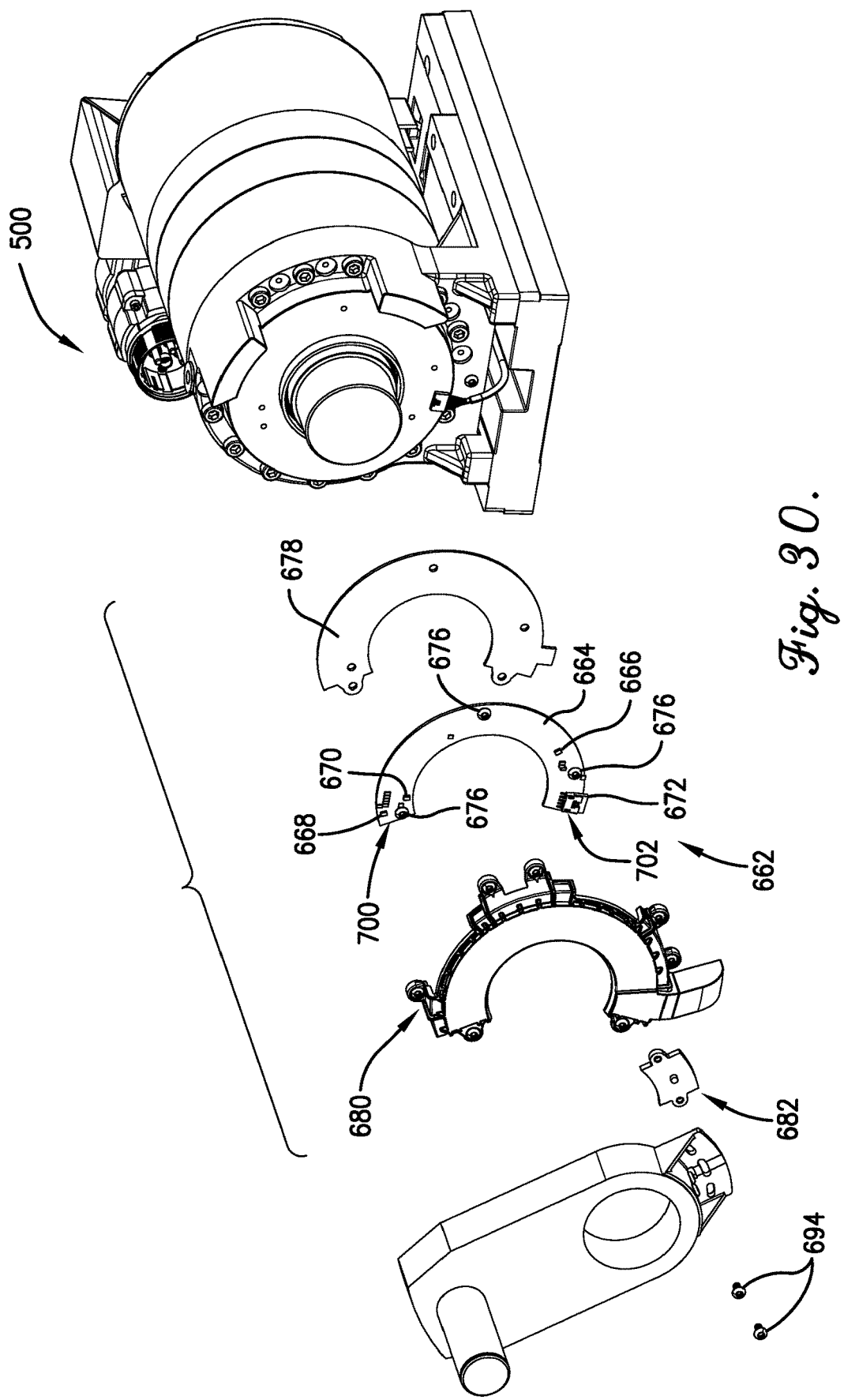
Figure 31:
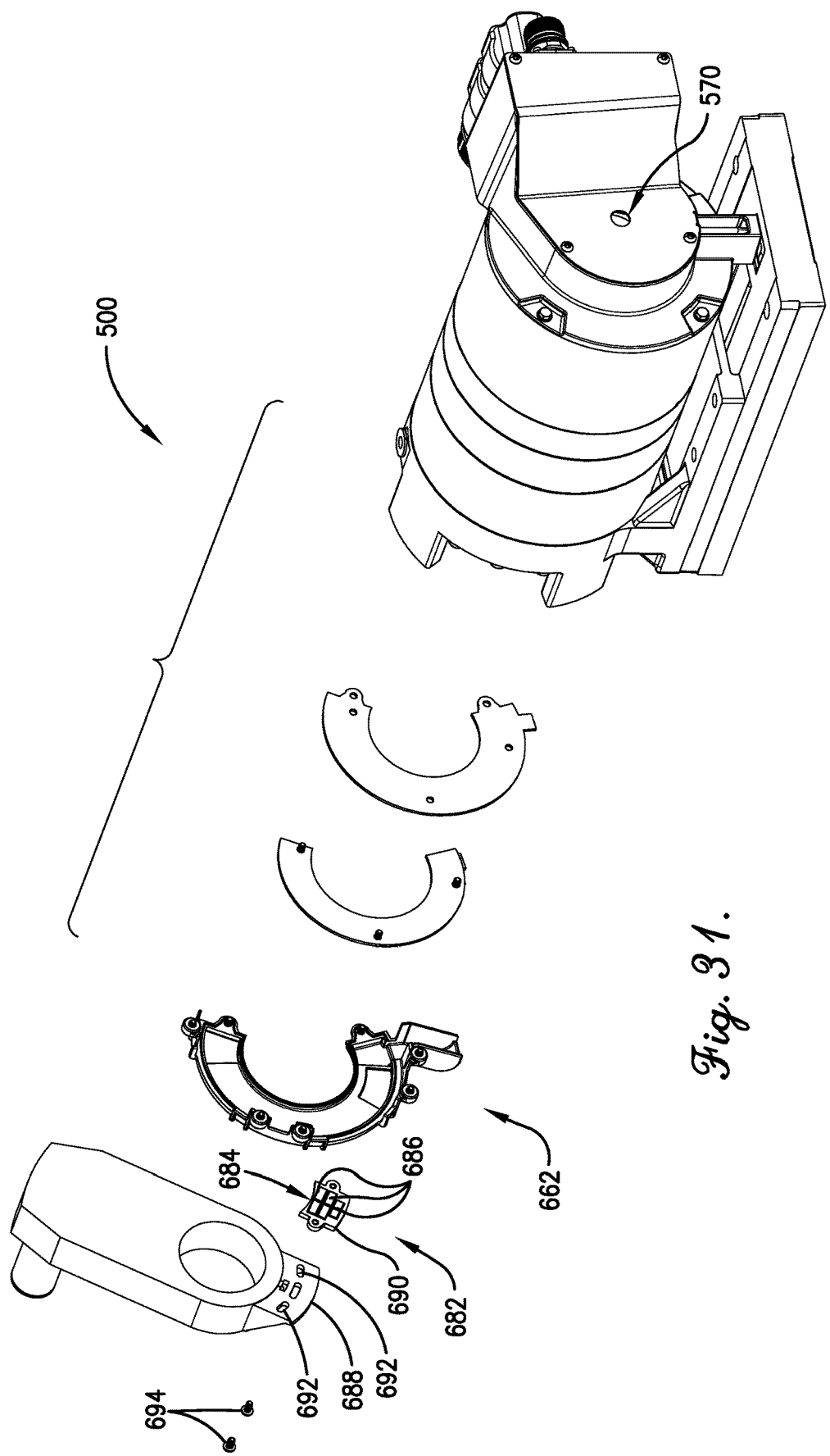
Figure 32A:
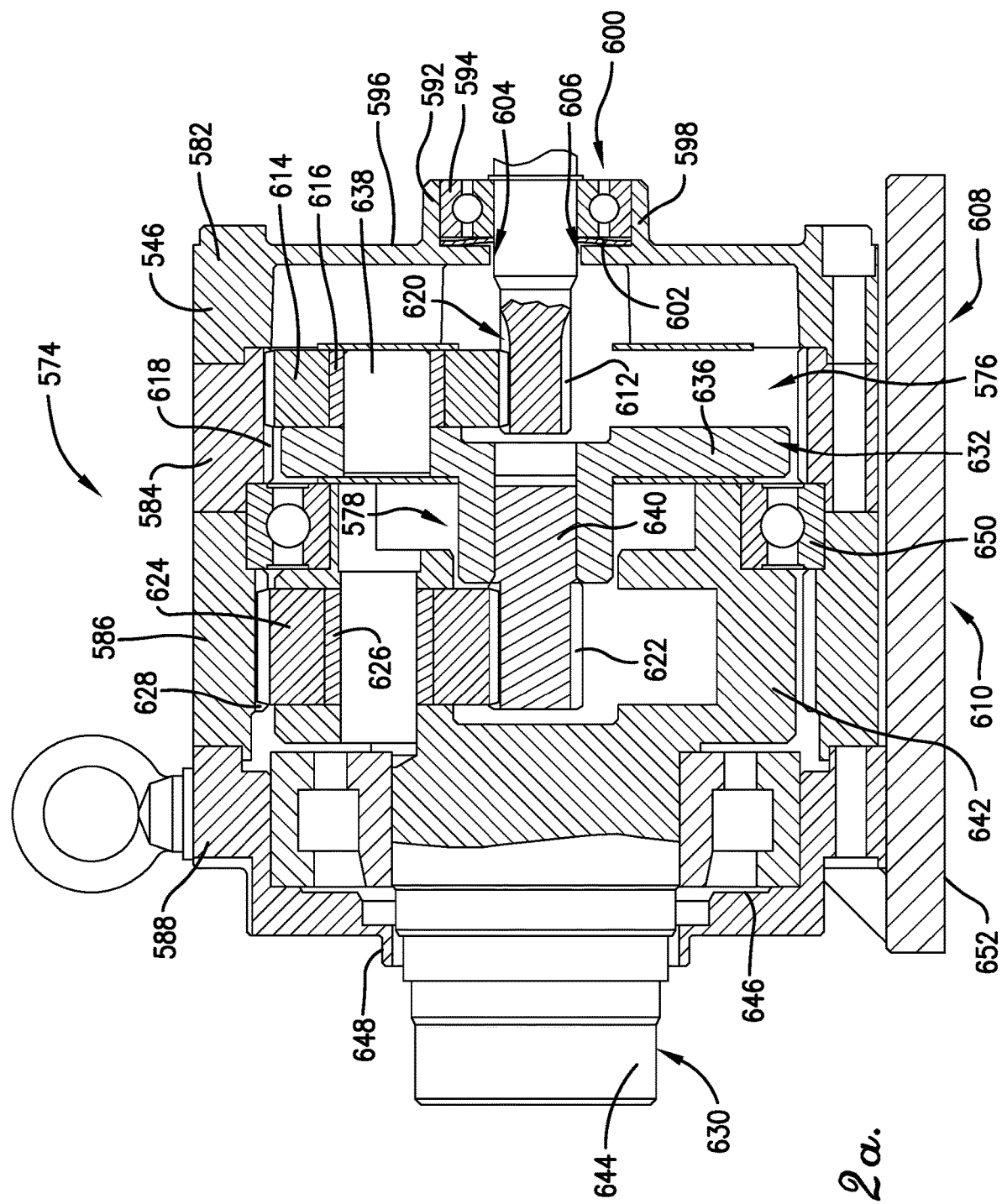
Figure 32C:
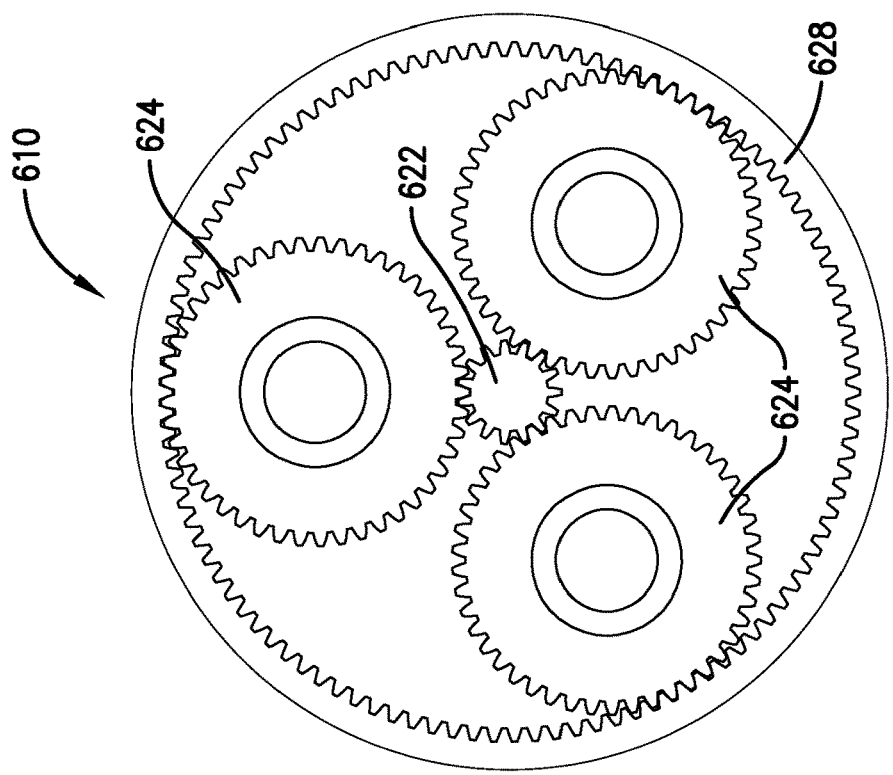
Figure 32B:
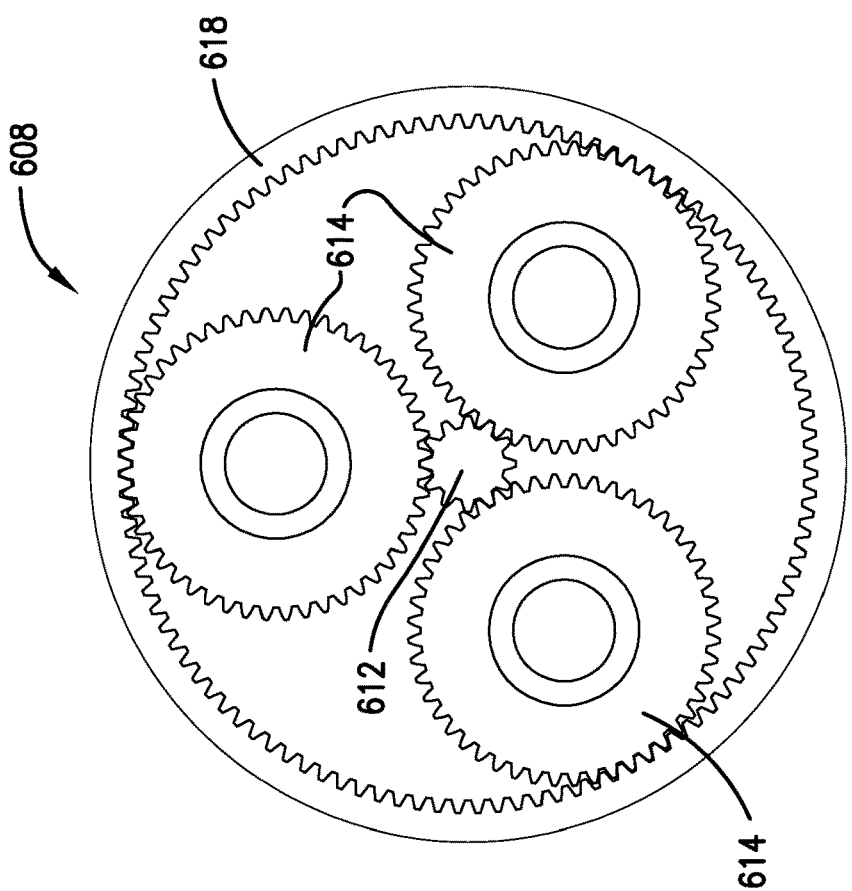
Figure 33:
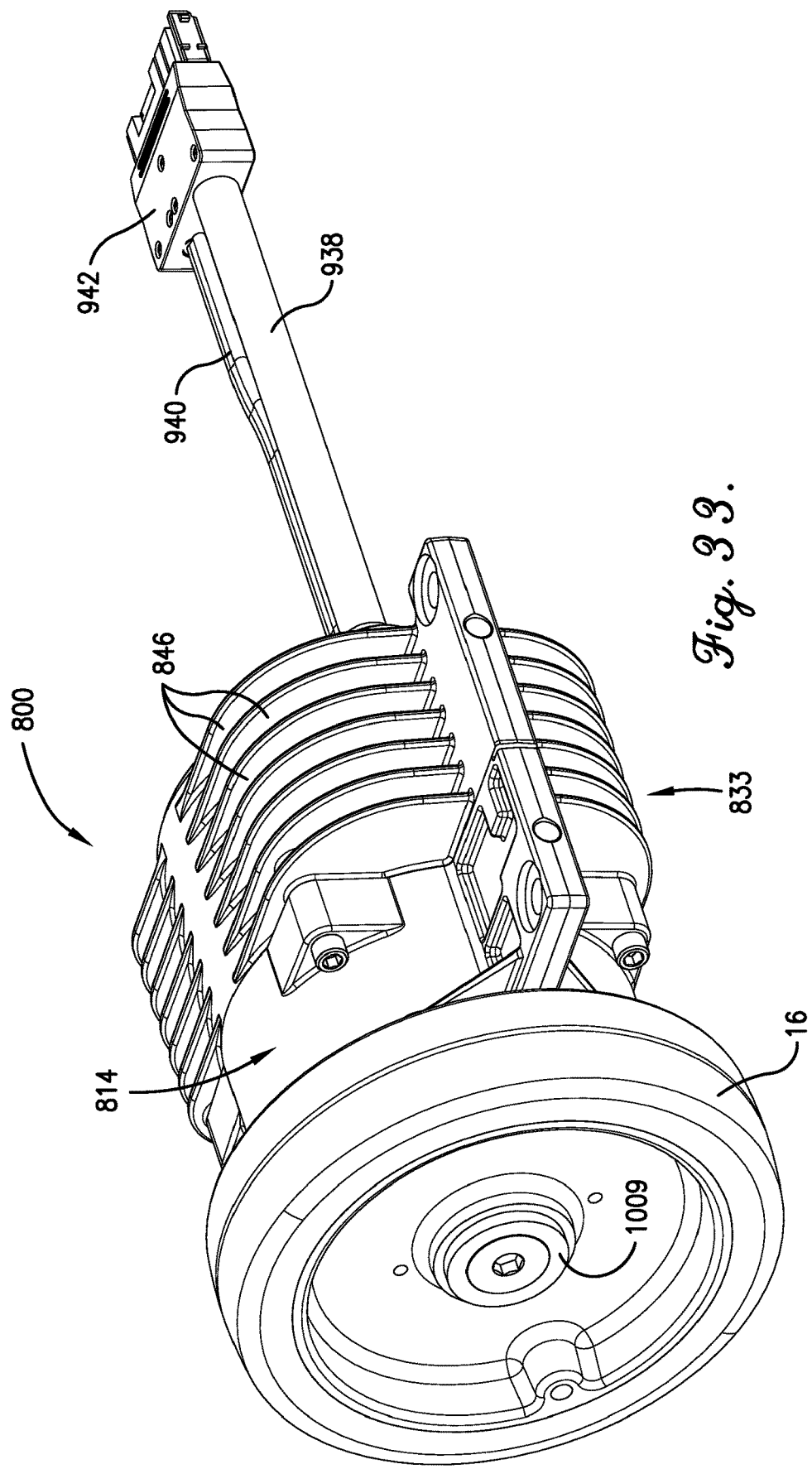
Figure 34:
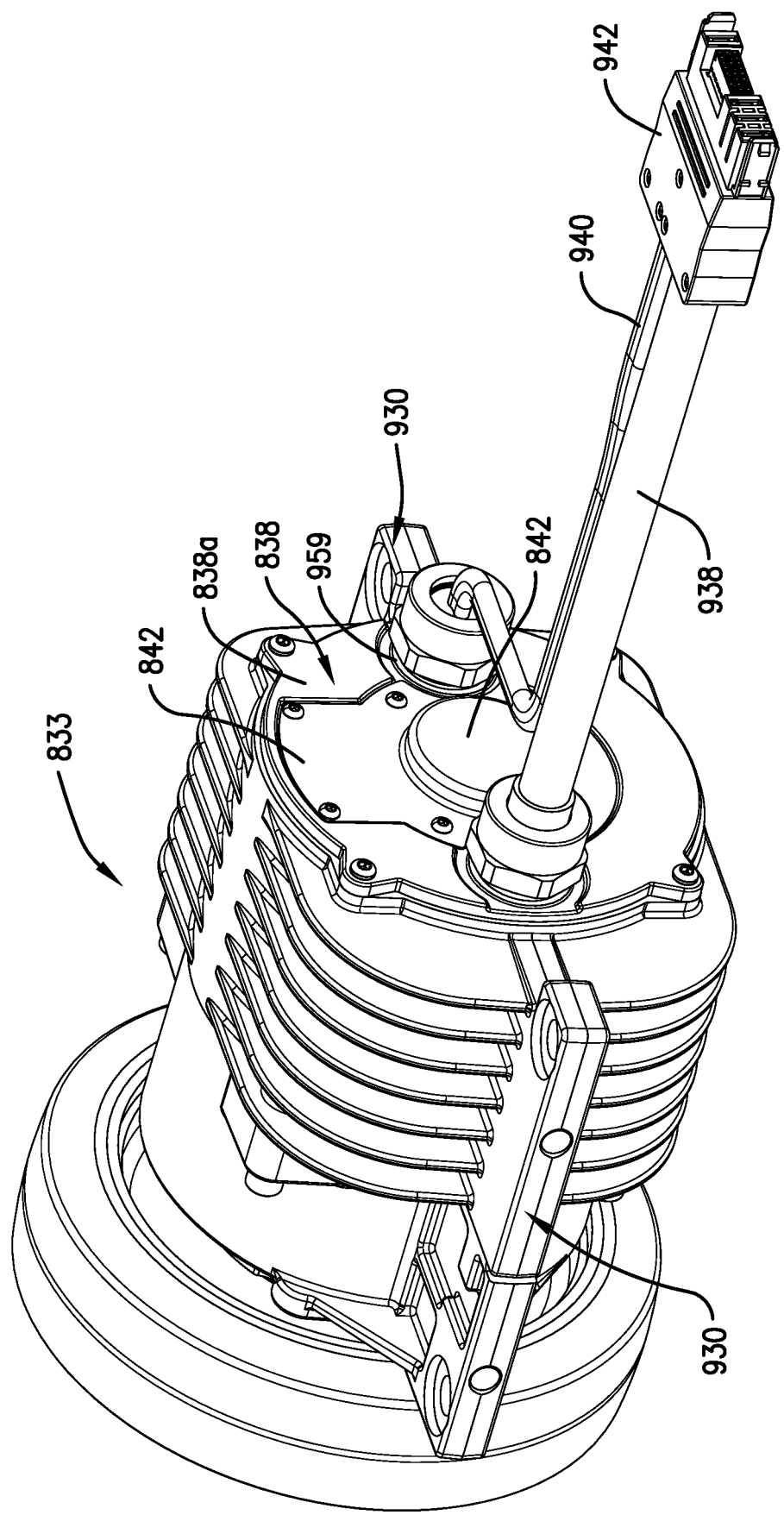
Figure 35:
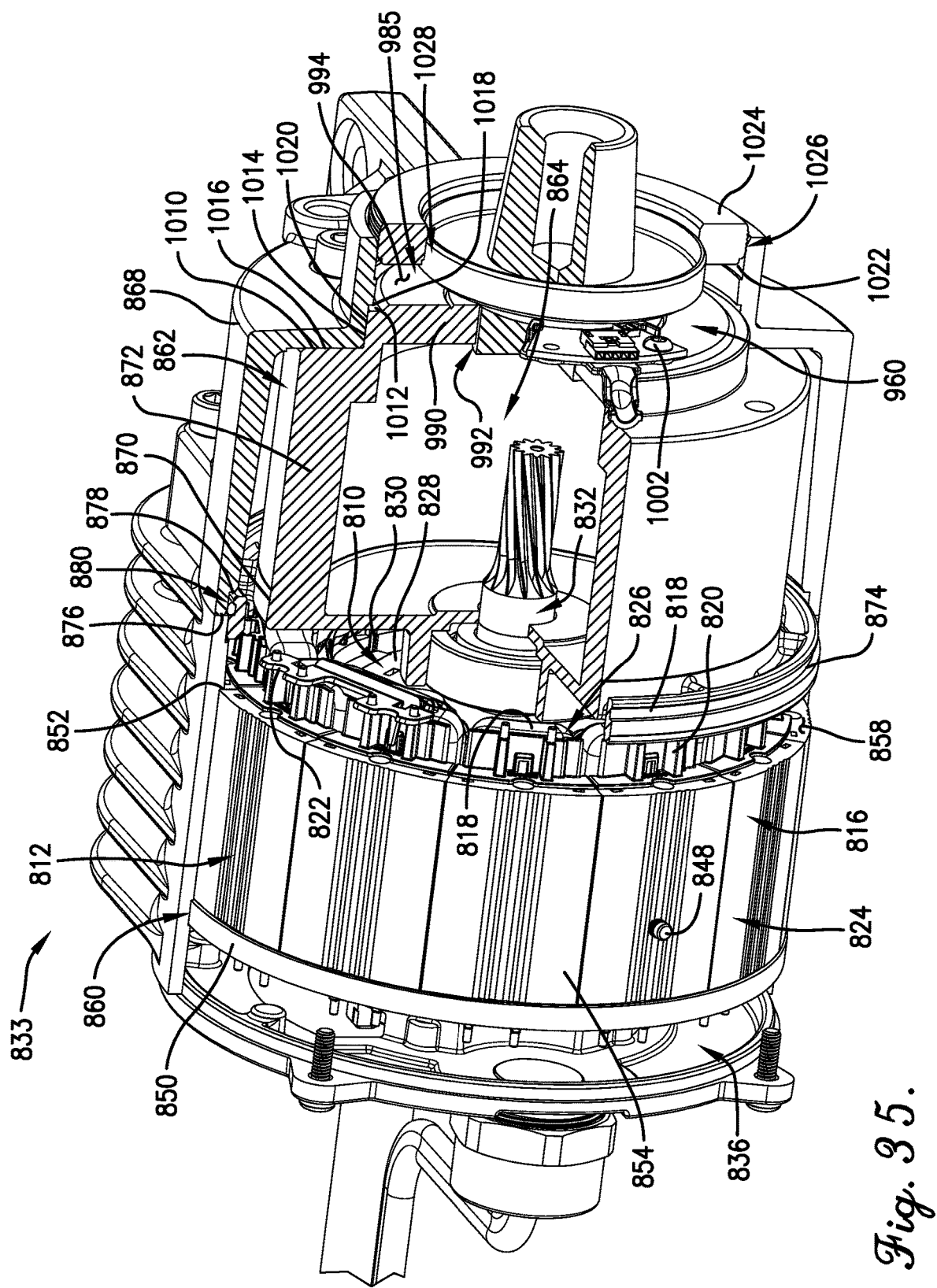
Figure 36:
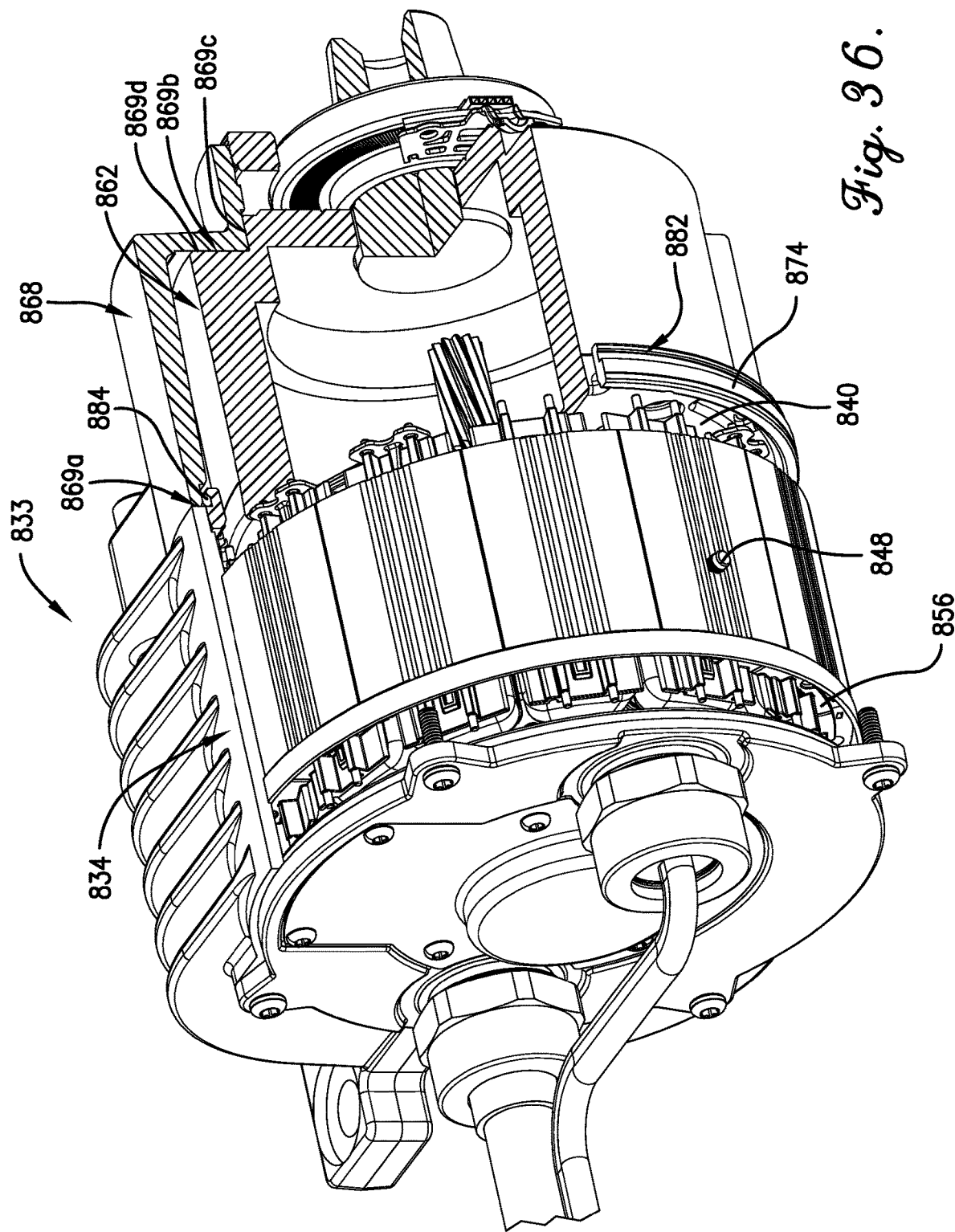
Figure 37:
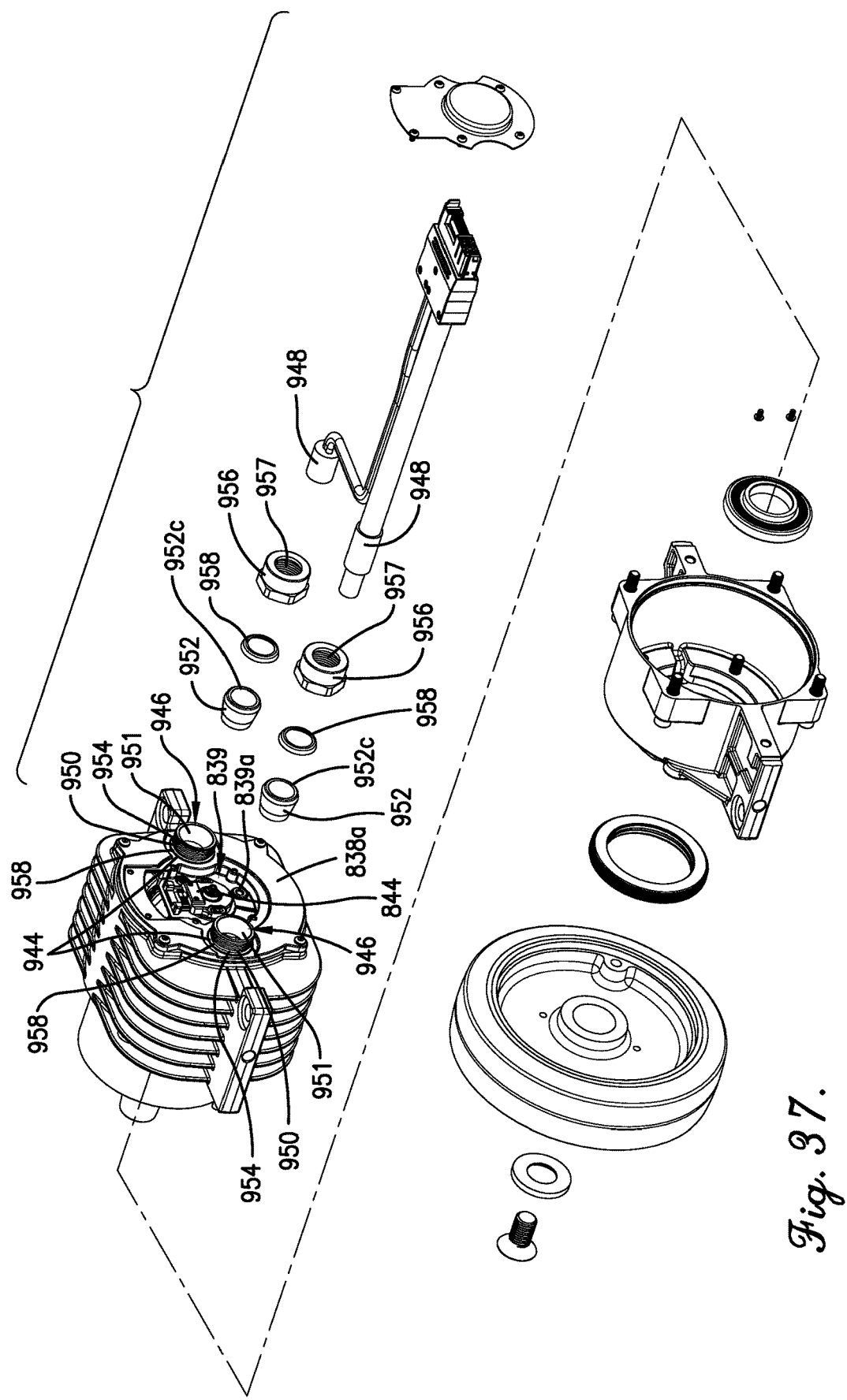
Figure 38:
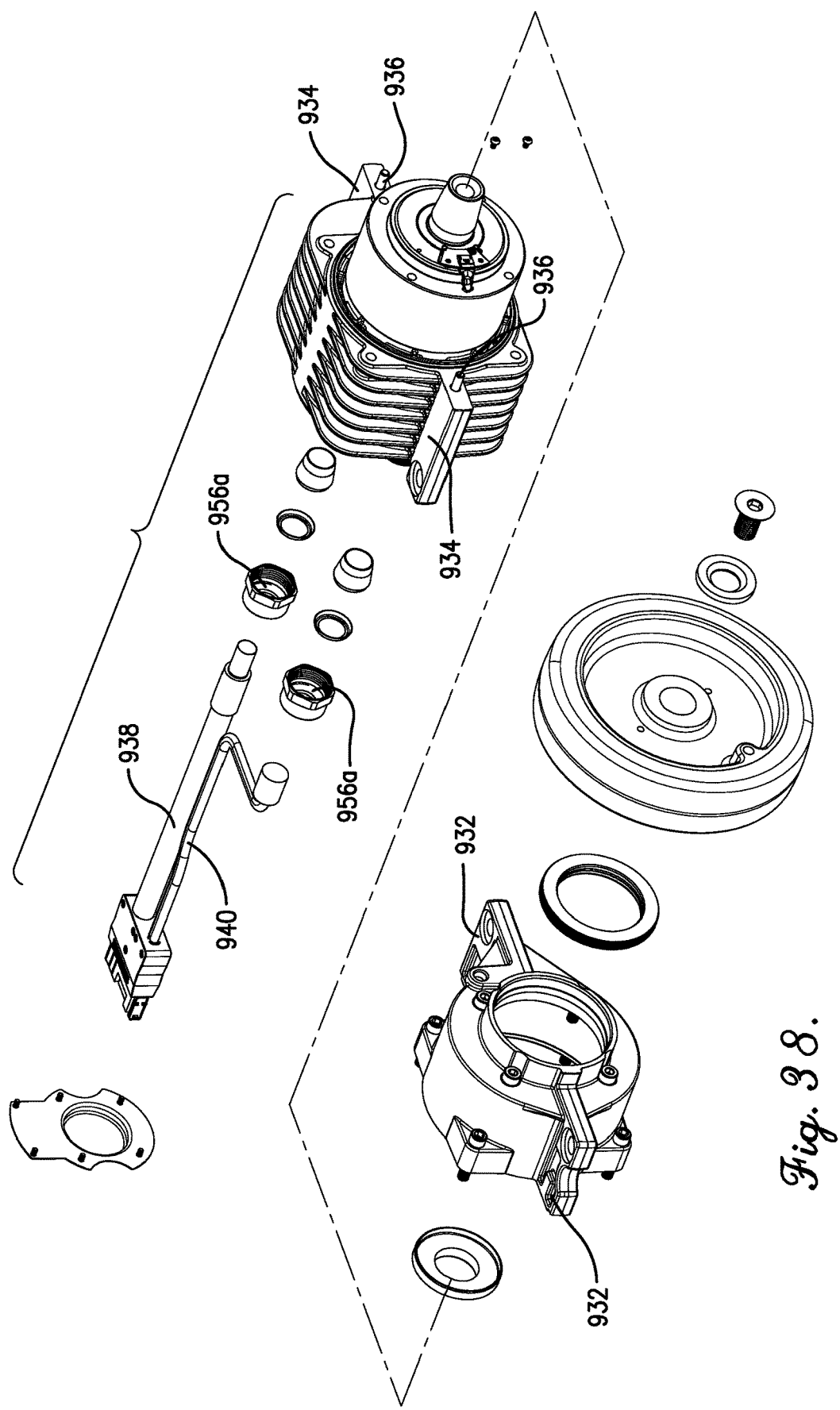
Figure 39:
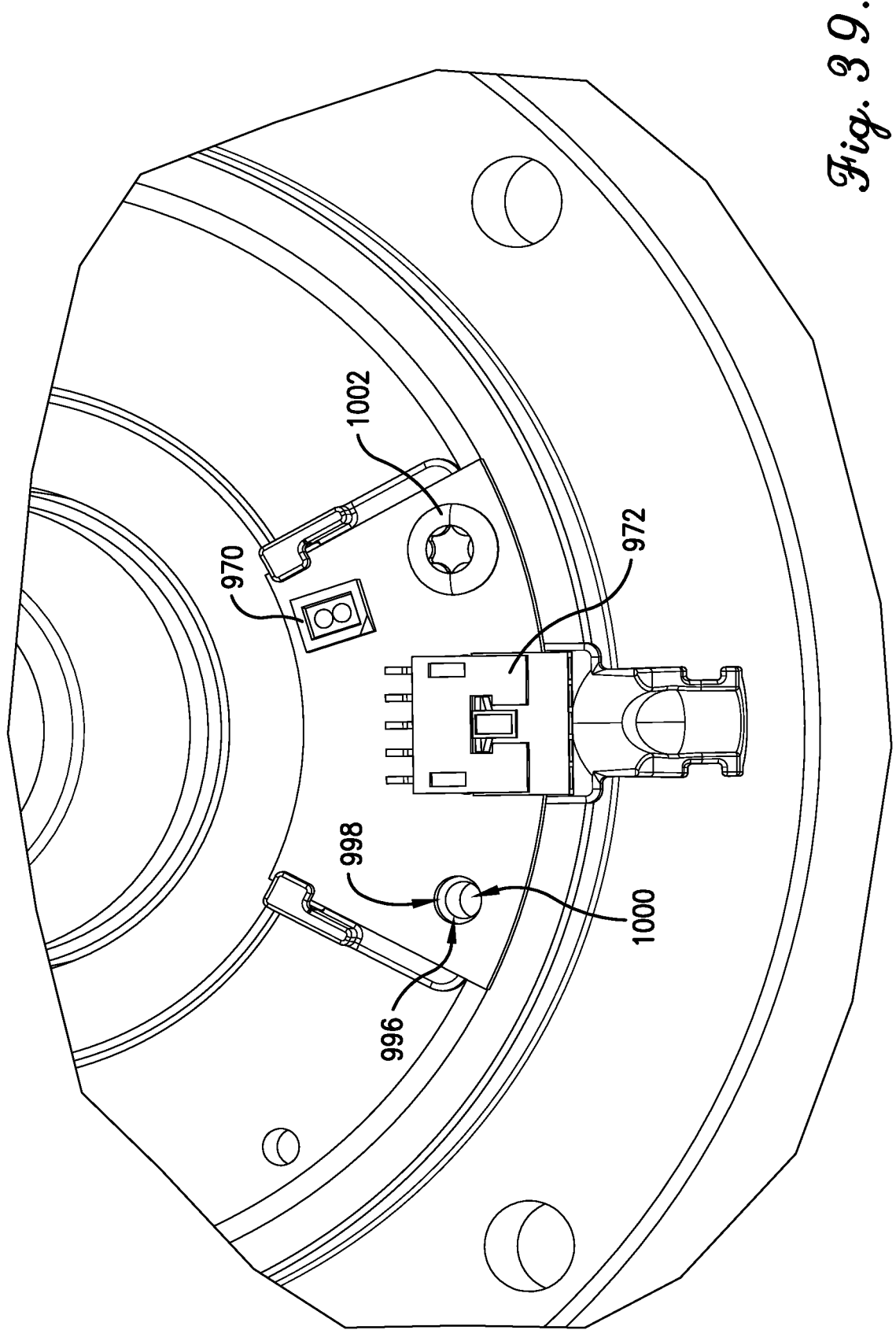
Figure 40:
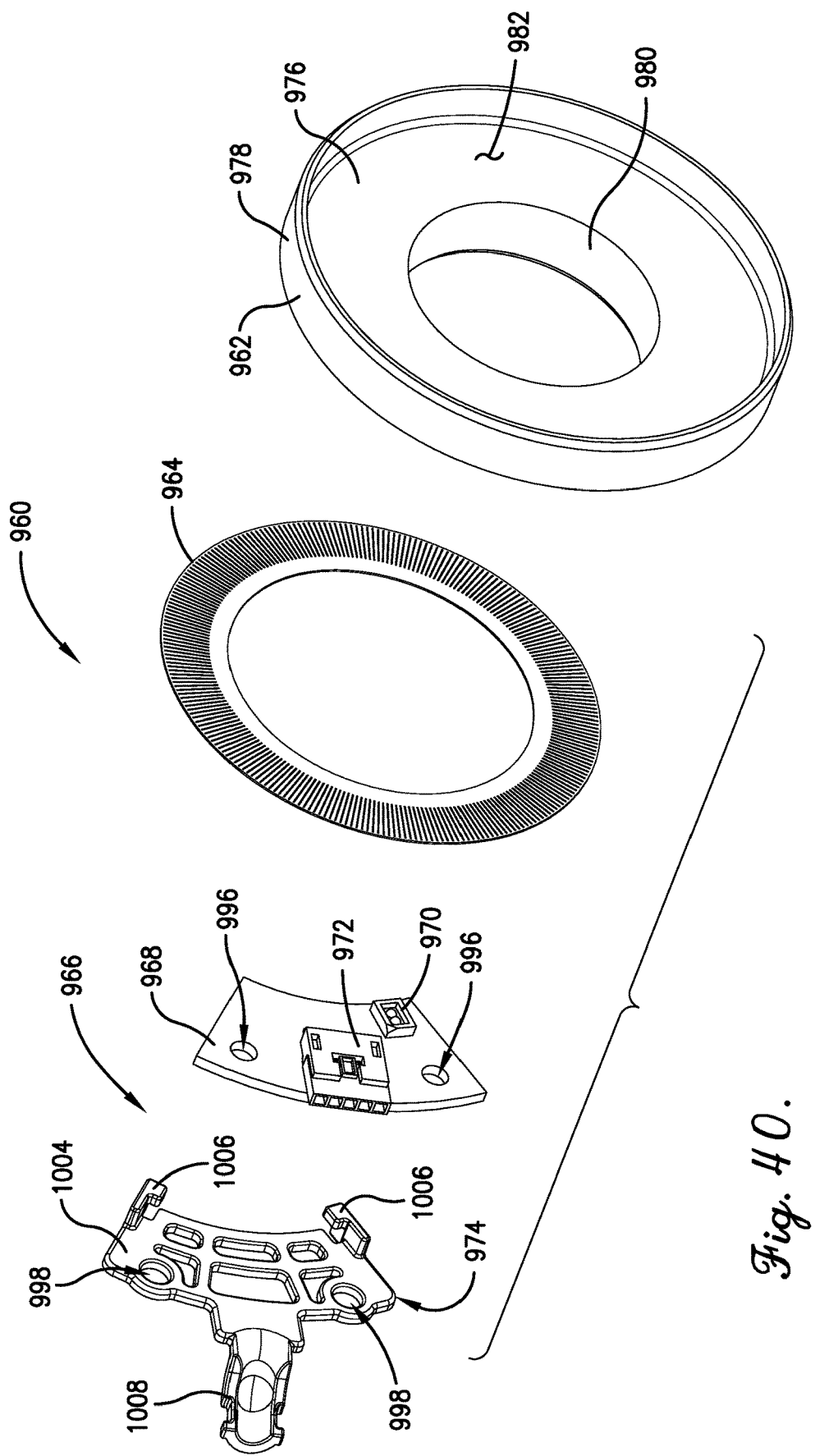
Figure 41:
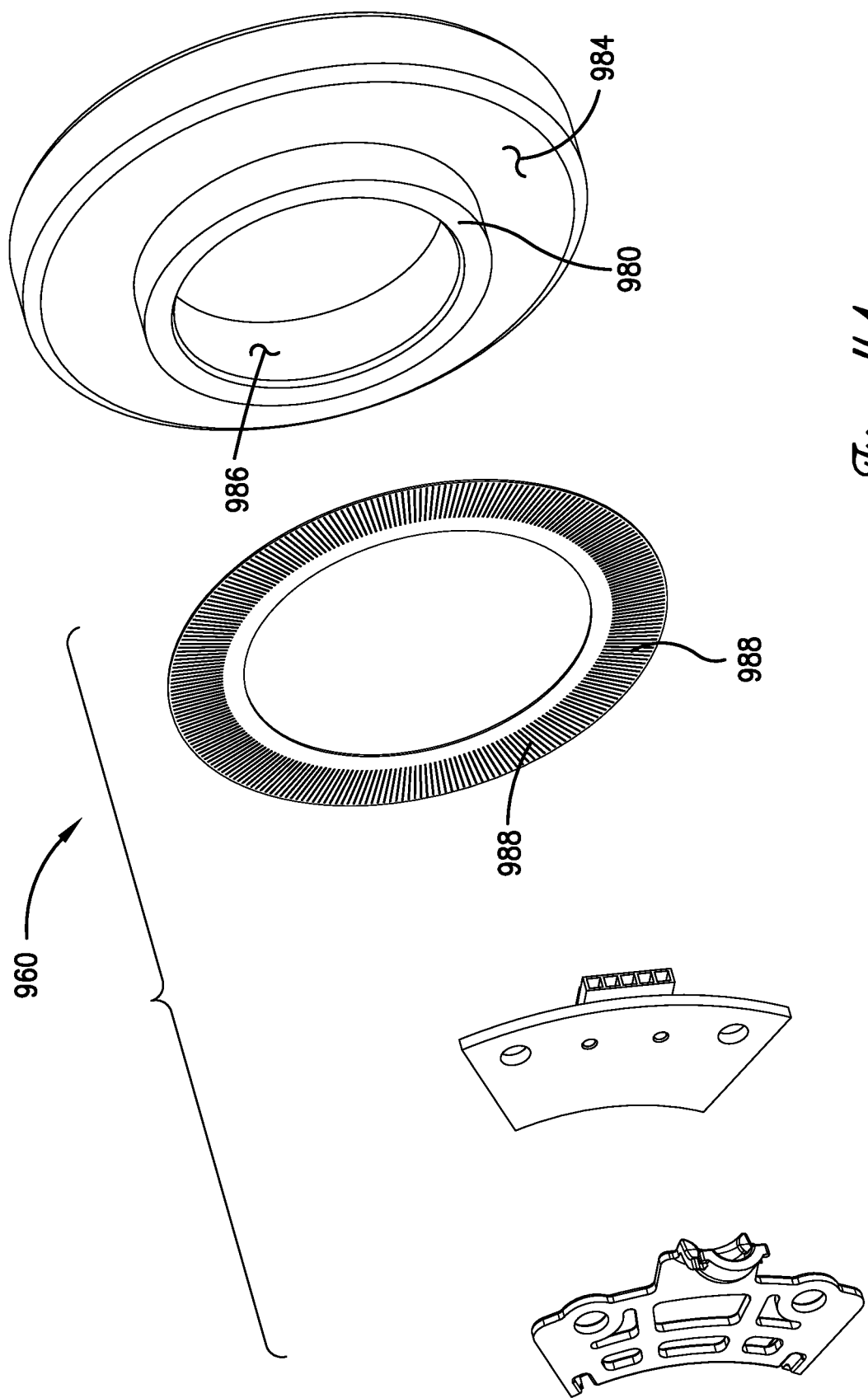
Figure 42A:
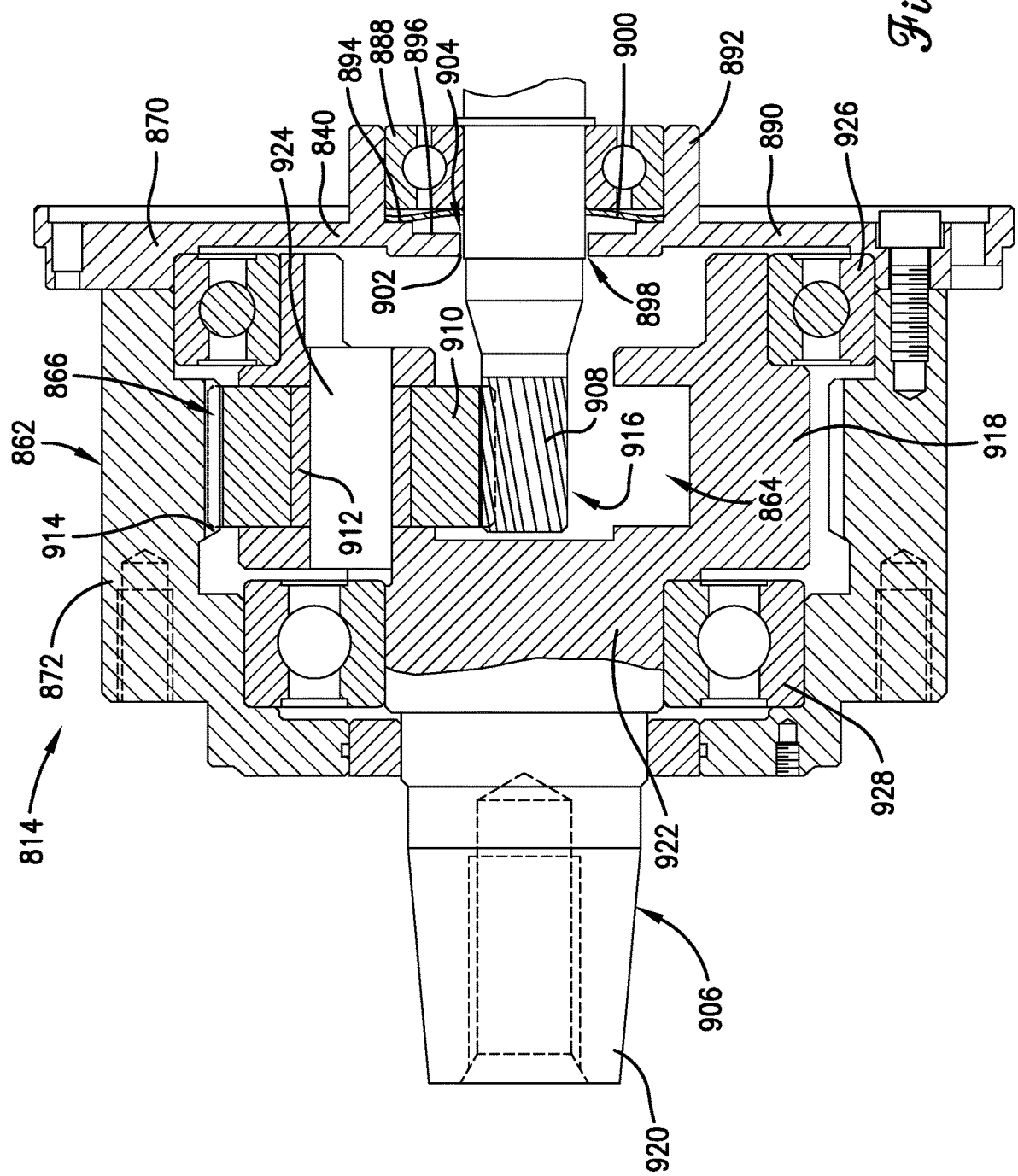
Figure 42B:
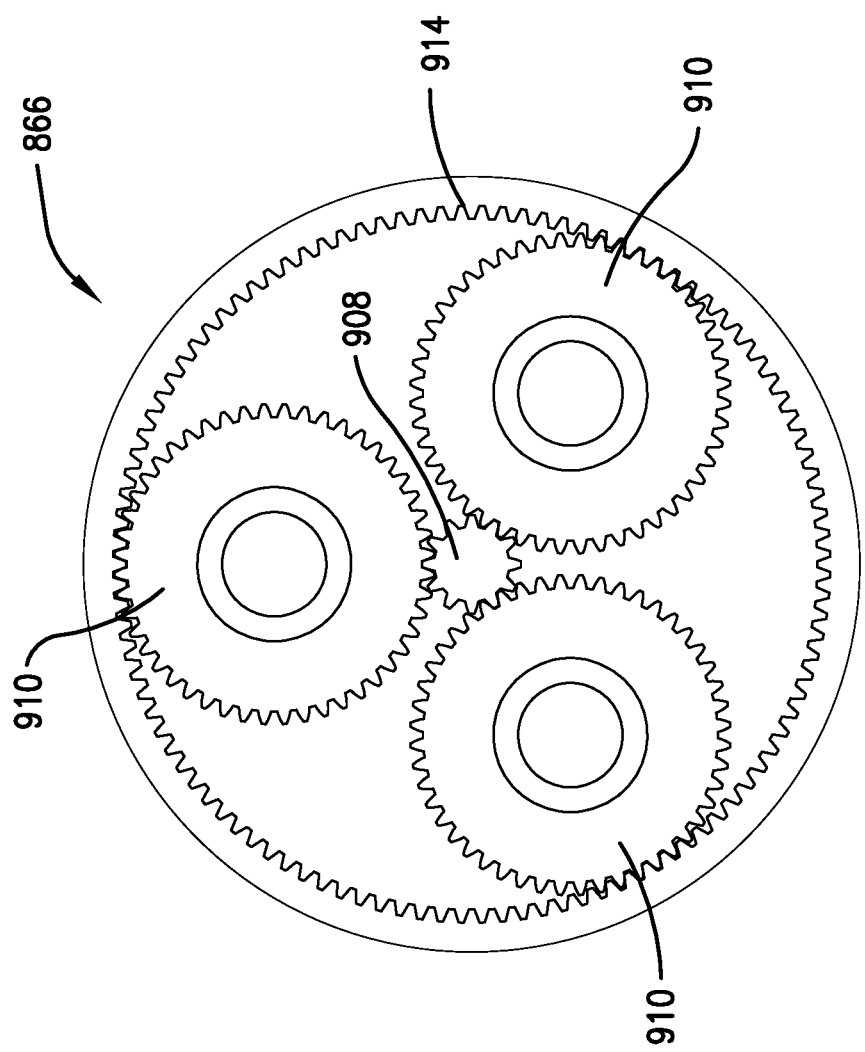
Figure 44:
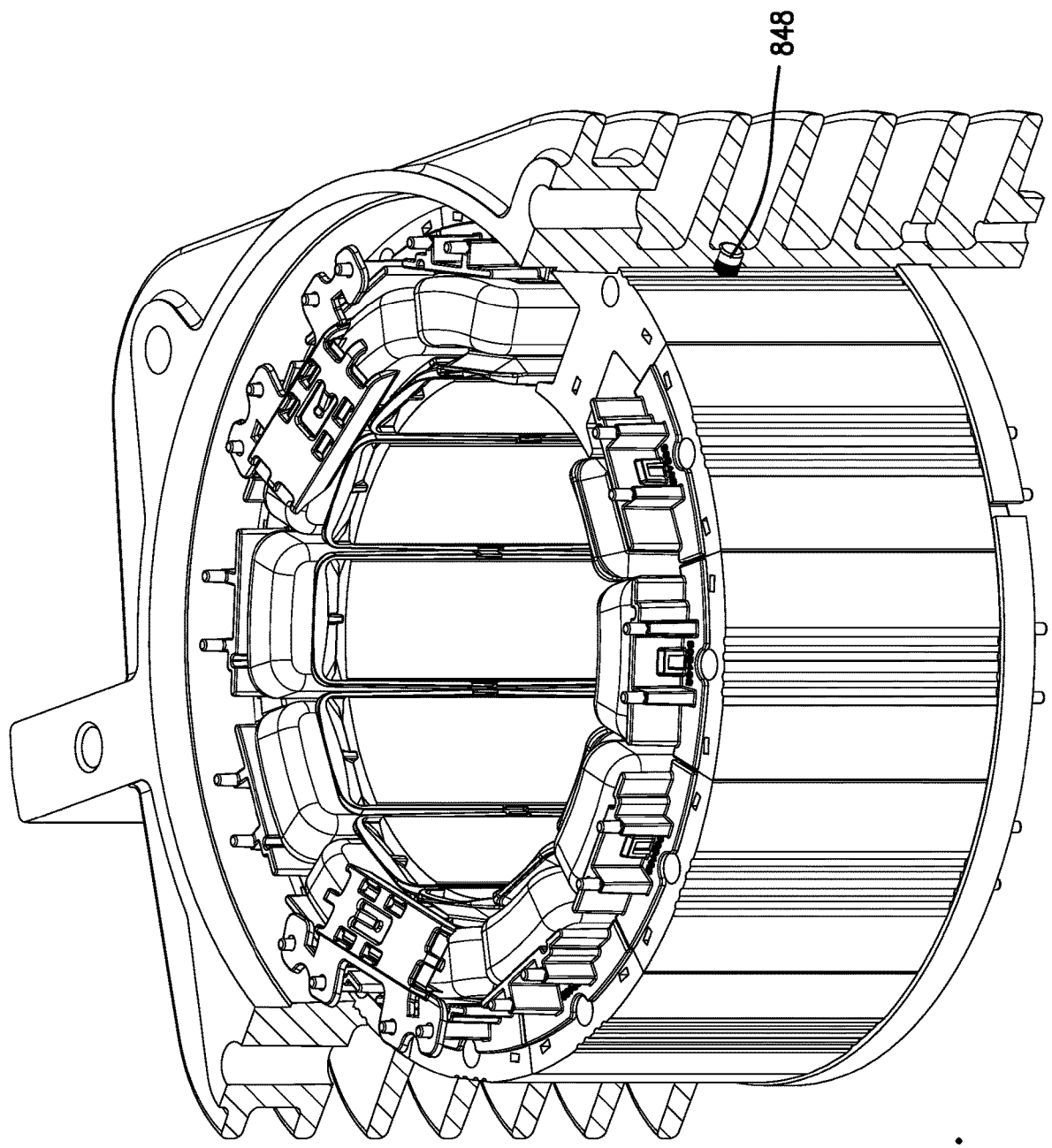

FIG. 10*a* is an enlarged top perspective view of a portion of a turntable motor in accordance with a second preferred embodiment of the present invention, particularly illustrating an alternative sealing sleeve embodiment;

FIG. 11 is a perspective view of the stator of the turntable motor of FIGS. 2-10, particularly illustrating the thermal protector assemblies;

FIG. 12 is a perspective view of the stator of the turntable motor of FIGS. 2-11, particularly illustrating the thermal protector assemblies;

FIG. 13 is perspective view of a pair of end caps of the stator of the turntable motor of FIGS. 2-12;

FIG. 14 is an exploded perspective view of the pair of end caps of FIG. 13;

FIG. 15 is a top perspective view of one of the thermal protector assemblies of the stator of the turntable motor of FIGS. 2-12;

FIG. 16 is a bottom perspective view of the thermal protector assembly of FIG. 15;

FIG. 17 is an enlarged perspective view of the stator and a thermal protector assembly of the turntable motor of FIGS. 2-12;

FIG. 18 is a cross-sectional perspective view of the stator and thermal protector assembly of FIG. 17;

FIG. 19 is a rear perspective view of the lift motor of FIG. 2;

FIG. 20 is a front perspective view of the lift motor of FIGS. 2 and 19;

FIG. 21 is a rear perspective view of the lift motor of FIGS. 2, 19, and 20;

FIG. 22 is a partially sectioned rear perspective view of the lift motor of FIGS. 2 and 19-21;

FIG. 23 is a front view of the lift motor of FIGS. 2 and 19-22, particularly illustrating the lift arm positionability and the lift arm stops;

FIG. 24 is a front perspective view of the lift motor of FIGS. 2 and 19-23, particularly illustrating the lift arm positionability and the lift arm stops;

FIG. 25 is front view of the lift motor of FIGS. 2 and 19-24, particularly illustrating the lift arm positionability and the lift arm stops;

FIG. 26 is a front perspective view of the lift motor of FIGS. 2 and 19-25, particularly illustrating the lift arm positionability and the lift arm stops;

FIG. 27 is a front view of the lift motor of FIGS. 2 and 19-26, particularly illustrating the lift arm positionability and the lift arm stops;

FIG. 28 is a front perspective view of the lift motor of FIGS. 2 and 19-27, particularly illustrating the lift arm positionability and the lift arm stops;

FIG. 29 is a front perspective view of a portion of the lift motor of FIGS. 2 and 19-28;

FIG. 30 is an exploded front perspective view of the lift motor of FIGS. 2 and 19-29;

FIG. 31 is an exploded rear perspective view of the lift motor of FIGS. 2 and 19-30;

FIG. 32a is a cross-sectional side view of the lift motor of FIGS. 2 and 19-31, particularly illustrating the gear system;

FIG. 32b is a schematic front view of the first stage of the gear system;

FIG. 32c is a schematic front view of the second stage of the gear system;

FIG. 33 is an outer perspective view of one of the locomotion motors of FIG. 2;

FIG. 34 is an inner perspective view of the locomotion motor of FIGS. 2 and 33;

FIG. 35 is a partially cross-sectioned outer perspective view of a portion of the locomotion motor of FIGS. 2, 33, and 34;

FIG. 36 is a partially cross-sectioned inner perspective view of a portion of the locomotion motor of FIGS. 2 and 33-35;

FIG. 37 is an exploded inner perspective view of the locomotion motor of FIGS. 2 and 33-36, particularly illustrating the integrated wire connection and sealing mechanism;

FIG. 38 is an exploded outer perspective view of the locomotion motor of FIGS. 2 and 33-37, particularly illustrating the integrated wire connection and sealing mechanism;

FIG. 39 is an enlarged view of a portion of the output encoder assembly of the locomotion motor of FIGS. 2 and 33-38;

FIG. 40 is an enlarged, exploded outer perspective view of the output encoder assembly of the locomotion motor of FIGS. 2 and 33-39;

FIG. 41 is an enlarged, exploded inner perspective view of the output encoder assembly of the locomotion motor of FIGS. 2 and 33-40;

FIG. 42a is a cross-sectional side view of the locomotion motor of FIGS. 2 and 33-41, particularly illustrating the gear system;

FIG. 42b is a schematic front view of the gear system;

FIG. 43 is an inner perspective view of the locomotion motor of FIGS. 2 and 33-42b, particularly illustrating the integrated wire connection and sealing mechanism;

FIG. 44 is a perspective view of the stator and shell of the locomotion motor of FIGS. 2 and 33-43, particularly illustrating the interconnection of the stator and the shell;

FIG. 45 is an enlarged, cross-sectional end view of the stator and shell of FIG. 44, particularly illustrating the interconnection of the stator and the shell; and FIG. 46 is an enlarged, cross-sectional side view of the stator and shell of FIGS. 44 and 45, particularly illustrating the interconnection of the stator and the shell.

The drawing figures do not limit the present invention to the specific embodiments disclosed and described herein. The drawings are not necessarily to scale, emphasis instead being placed upon clearly illustrating the principles of the preferred embodiments.

DETAILED DESCRIPTION OF THE PREFERRED EMBODIMENTS

In a preferred embodiment of the present invention, a robot 10 is provided. The robot 10 preferably includes a main body 12 supported on a chassis (not shown), a support platform 14, and a pair of wheels 16 enabling the robot 10 to have a zero-turn radius.

The robot 10 is preferably configured to transport goods in a warehouse environment. For instance, in a preferred embodiment, the robot 10 is configured to transport shelving 18 and various goods 20 supported thereon through a warehouse environment. More particularly, the robot 10 is preferably operable at least to (1) lift the shelving 18 and associated goods 20 on the platform 14; (2) rotate at least a portion of the platform 14 so as to appropriately orient the shelving 18 and goods 20 supported by the platform 14; (3) transport the shelving 18 and goods 20 on the platform 14 from one location to another in the warehouse, making use of the wheels 16; (4) deposit the shelving 18 and goods 20 at their new location through lowering of the platform 14; and (5) completely disengage from the shelving 18 and goods 20 via lowering of the platform 14 so as to no longer be in contact with the shelving 18 and/or goods 20.

The robot 10 is preferably provided with numerous features to enable such operation, including but not limited to one or more printed circuit boards, sensors, cameras, and communication devices. A control system (not shown) is also preferably provided to control each robot 10 and to synchronize operation of multiple robots 10 in a warehouse.

Preferably, some embodiments of the robot 10 are able to transport loads as large as three thousand (3,000) pounds.

The robot 10 is preferably battery-powered and rechargeable.

In a preferred embodiment, the robot 10 includes four (4) motors: a turntable motor 100 operable to rotate and stabilize at least a portion of the platform 14; a lift motor 500 operable to raise the platform 14, preferably but not necessarily with the assistance of a scissor lift mechanism or other lifting aid; and a pair of locomotion motors 700, each of which is associated with a respective one of the wheels 16, and which cooperatively enable the robot 10 to travel through the warehouse. Each of these motors 100, 500, 700 will be described in detail below.

Preferably, the turntable motor 100 is mounted to the platform 14. The lift motor 500 and the locomotion motors 700 are preferably mounted directly to the chassis.

Although the turntable motor 100, the lift motor 500, and the locomotion motors 700 are preferably part of the robot 10 and function generally as described above, it is noted that it is within the scope of the present invention for the motors to instead be provided in an alternative application and/or to be provided separately from one another. For instance, the locomotion motors might instead be provided for use in an electric vehicle for human transport, the turntable motor might be used to operate a rotating display, or the lift motor might be used to raise and lower a load that is in no manner associated with a warehouse operation. Furthermore, certain features of each of the motors may be used in entirely different applications than shown. For example, certain aspects of the locomotion motor might be capable of use in motors that are not used to drive or propel a wheeled vehicle.

Turntable Motor

A preferred embodiment of the turntable motor 100 is shown in detail in FIGS. 3-18. The turntable motor 100 is preferably a three-phase, direct-current (DC) brushless permanent magnet (BPM) motor, although certain features described below are suitable for use with alternatively phased or configured motors. For instance, certain features are suitable for use on a single phase motor, an AC motor, and/or an induction motor.

Among other things, the turntable motor 100 preferably includes a rotor 110 rotatable about an axis, a stator 112, and a gearbox assembly 114. The turntable motor is preferably oriented such that the axis is a vertical axis. The rotor 110 and stator 112 are preferably positioned at an axially downward end of the turntable motor 100, while the gearbox assembly 114 is positioned at an axially upward end of the turntable motor 100. It is permissible according to some aspects of the present invention, however, for the turntable motor to be alternatively oriented. That is, unless otherwise specified or made clear, the directional references made herein with regard to the turntable motor 100 (e.g., top, bottom, upper, lower, etc.) are used solely for the sake of convenience and should be understood only in relation to each other. For instance, a component might in practice be oriented such that faces referred to as "top" and "bottom" are sideways, angled, inverted, etc. relative to the chosen frame of reference.

As will be discussed in greater detail below, the gearbox assembly 114 preferably engages the platform 14 such that the turntable motor 100 causes rotation of the platform 14.

Stator Overview

As best shown in FIGS. 11 and 12, the stator 112 preferably includes a generally toroidal stator core 116 and wiring 117 wound about the stator core 116 to form a plurality of coils 118. The stator core 116 is preferably a laminated stator core, although it is permissible for the stator core to be non-laminated. The stator core 116 preferably comprises a ferromagnetic material such as steel, although use of any one or more electrically conductive materials is permissible without departing from the scope of the present invention. In a preferred embodiment, for instance, the stator core 116 is formed from 0.0185 or 0.195 inch thick c5 core plate. Preferably, no stress annealing occurs after punching of the laminations. Other gauges, processing techniques, and grades fall within the scope of the present invention, however.

The laminations of the stator core 116 are preferably interlocked to restrict relative axial shifting, although other configurations (e.g., non-interlocked laminations) are permissible.

The stator core 116 preferably defines an axis. Most preferably, the axis is co-axial with the axis of the rotor 110, although offset or skewed axes are permissible according to some aspects of the present invention.

Preferably, the stator core 116 includes a plurality of arcuately spaced apart, generally radially extending teeth 120. More particularly, in a preferred embodiment, each of the teeth 120 includes a generally circumferentially extending yoke 122, a generally radial arm 124 extending from the yoke 122 and having an end 126, and a crown 128 extending generally circumferentially from the end 126.

The turntable motor 100 is preferably an inner rotor motor, with the stator 112 at least substantially circumscribing the rotor 110 (in a manner similar to that shown in FIG. 29 for the lift motor 500). More particularly, each yoke 122 preferably engages a pair of adjacent yokes 122, such that the yokes 122 cooperatively present an outer circumferential stator core face 130. The crowns 128 cooperatively present a discontinuous inner circumferential stator core face 132 that faces the rotor 110. As will be discussed in greater detail below, a circumferentially extending radial gap (not shown) is preferably formed between the inner circumferential stator core face 132 and the rotor 110.

Each tooth 120 preferably presents an upper tooth face 134, a lower tooth face 136, and two side tooth faces 138. The teeth 120 preferably cooperatively present an upper stator core face 140 and a lower stator core face 142.

In a preferred embodiment, the stator core 116 has an axial length of about one and five tenths (1.5) inches measured from the upper stator core face 140 to the lower stator core face 142, an outside diameter of about five and four hundred ninety thousandths (5.490) inches, and an inside diameter of about three and two hundred thirty-four thousandths (3.234) inches.

It is permissible according to some aspects of the present invention for the stator core to be alternatively configured, however. Among other things, for instance, the stator core could comprise a plurality of interconnected multi-tooth segments, comprise one or more helically wound laminations, or comprise stacked annular laminations each formed from a single punched strip. Furthermore, the aforementioned preferred length and gap dimensions may vary without departing from the scope of the present invention.

As will be discussed in greater detail below, the stator core 116 is preferably electrically insulated by means of a plurality of discrete, electrically insulative end caps 144 secured relative to the core 116. However, it is noted that use of any one or more of a variety of insulation means, including but not limited to the use of electrically insulative overmolding, powder-coating, and/or liners, is permissible according to some aspects of the present invention. It is also permissible according to some aspects of the present invention for the stator core to be devoid of electrical insulation.

The coils 118 are preferably wound about the arms 124 of the teeth 120. More particularly, a slot 146 is defined between each adjacent pair of teeth 120. The coils 118 are preferably wound about the teeth 120 and through the slots 146 so as to circumscribe respective ones of the arms 124.

The coils 118 preferably comprise electrically conductive wiring wiring 117. The wiring 117 is preferably wound multiple times about each tooth 120 to form a plurality of turns or loops. The wiring 117 is preferably formed of copper or aluminum, although any one or more of a variety of electrical conductive materials or a combination thereof may be used within the ambit of the present invention.

Furthermore, the wiring 148 may be coated or uncoated.

As is customary, the wiring 148 is wound around the teeth 120 in a particular manner according to the configuration and desired performance characteristics of the turntable motor 100.

The turntable motor 100 preferably includes twelve (12) teeth 120 defining twelve (12) slots 146.

Rotor Overview

Figure 8:
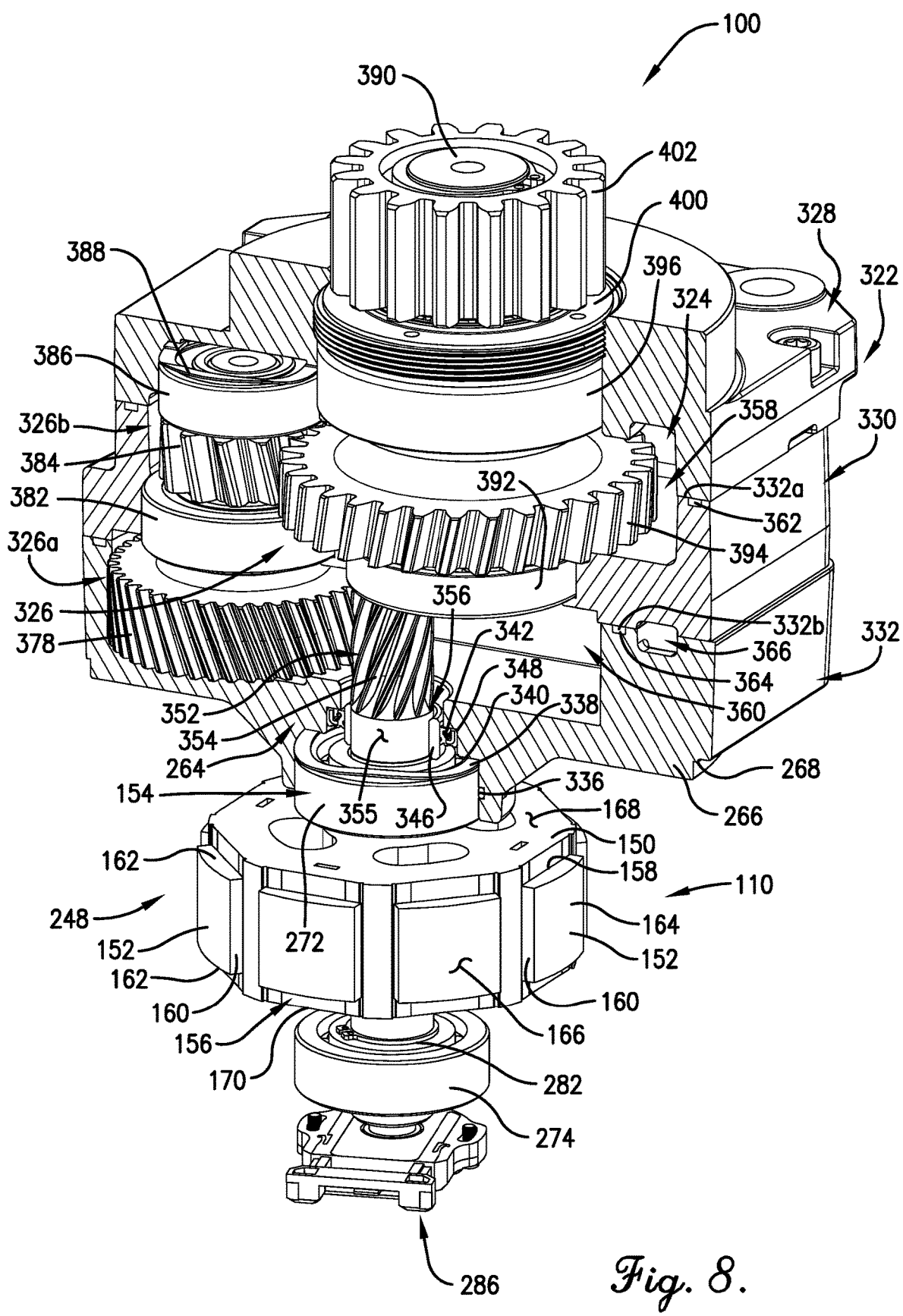
FIG. 8 is a top perspective view of a portion of the turntable motor of FIGS. 2-7, particularly illustrating the gear assembly, the oil sealing system, and the sealing sleeve.

As best shown in FIG. 8, the rotor 110 preferably includes a rotor core 150, a plurality of arcuately arranged magnets 152, and a motor shaft 154.

The rotor core 150 is preferably a laminated rotor core, although it is permissible for the rotor core to be non-laminated. The rotor core 150 preferably comprises a ferromagnetic material such as steel, although use of any one or more electrically conductive materials is permissible without departing from the scope of the present invention. In a preferred embodiment, for instance, the rotor core 150 is formed from thirty-one thousandths (0.031) inch laminations of semi-processed S85 steel. Preferably, the rotor core 150 is annealed as a partially fluffed core. Other gauges, processing techniques, and grades fall within the scope of the present invention, however.

The laminations of the rotor core 150 are preferably interlocked, although other configurations (e.g., non-interlocked laminations) are permissible.

Rotor Magnet Securement

The rotor core 150 is preferably generally octagonal in cross-section so as to define a plurality of magnet-mounting faces 156, although other shapes (e.g., round or hexagonal) are permissible according to some aspects of the present invention.

Each magnet-mounting face 156 preferably includes a recessed central portion 156a, a pair of side portions 156b on opposite sides of the central portion 156a, and a pair of grooves 156c adjacent and outside the side portions 156b.

Retaining walls 157 are preferably formed by the rotor core 150 adjacent the magnet-mounting faces 156 and may restrict circumferential shifting of the magnets 152 if necessary.

The magnets 152 are preferably mounted to corresponding ones of the magnet-mounting faces 156 through use of a glue or adhesive. In a preferred embodiment, for instance the magnets 152 are retained on the magnet-mounting faces 156 through use of a two step acrylic, one-part, dual-cure, thixotropic magnet bonding adhesive with a solvent-less activator (e.g., Loctite® 334™ Structural Adhesive in conjunction with Loctite® 7380™ Depend® Activator).

The adhesive is preferably applied to each magnet-mounting face 156 and to each magnet 152. The adhesive may applied in the form of a bead, in a pattern (e.g., a grid or a plurality of evenly spaced apart dots), in a random dispersion, or over the entire surface.

The rotor 110 is preferably additionally wrapped with a thin film (not shown) to provide redundant magnet 152 retention. Preferably, the film is heat shrunk over the rotor 110. In a preferred embodiment, for instance, the rotor 110 is wrapped in a seven thousandths (0.007) inch thick Mylar® spiral-wound tube which is then heat shrunk onto the motor. After heat shrinking, the thickness preferably increases to about ten thousandths (0.010) inches.

In a preferred embodiment, the film has a tensile strength of between about twenty-six thousand (26,000) psi and about forty-five thousand (45,000) psi.

In addition to providing retention of the magnets 152 in whole, the thin film is also preferably operable to retain any chips that might break away from the magnets 152. (The likelihood of such chip formation is greater if a non-preferred magnet material such as ferrite is used, rather than the previously described preferred, unlikely-to-chip neodymium iron boron magnet material.)

The magnet retention means may vary from the preferred combination described above without departing from some aspects of the present invention, however. For instance, it is permissible according to some aspects of the present invention for the thin film to be omitted and/or for the magnets to be retained using alternative or additional mechanical means or an alternative or additional adhesive. Preferably, however, the magnet retention means are sufficient to restrict magnet dislodgement at all speeds of the turntable motor 100.

In a preferred embodiment, for instance, the turntable motor 100 has a high speed of about three thousand, six hundred thirty (3,630) rpm and a maximum speed of about three thousand, six hundred forty (3,640) rpm. Such speeds, in combination with a preferred magnet 152 mass of about fifteen and three tenths (15.3) grams and the radial positioning of the magnets 152 relative to the axis of rotation lead to centrifugal magnet forces of about eighteen and seven tenths (18.7) lb. The magnets 152 may also be subject to radial forces of about thirty-one and eight tenths (31.8) lb due to the maximum motor torque force of about thirty-one and eight tenths (31.8) lb (i.e., about seven and nintety-five hundredths (7.95) lb/magnet, wherein the radial magnetic force is approximately four (4) times the torque force).

The magnet retention means should also be sufficient to restrict magnet dislodgement at all possible magnet temperatures during operation. In a preferred embodiment, for instance, the magnet retention means function acceptably when the magnets 152 are at temperatures between about zero degrees Celsius (0° C.) and a predicted maximum temperature of about eighty-five and three tenths degrees Celsius (85.3° C.).

Rotor Overview—Cont.

The magnets 152 are preferably rare earth magnets. More particularly, the magnets 152 are preferably thirty-five (35) uh (one hundred eighty degrees Celsius (180° C.) grade neodymium iron boron magnets. Other magnet types may be used without departing from some aspects of the present invention, however. For instance, according to some aspects of the present invention, the magnets might be of a lower grade and/or comprise ferrite.

In a preferred embodiment, the magnets 152 include nickel-copper-nickel plating. Alternative plating or no plating is permissible, however.

The magnets 152 preferably have a "bread loaf" geometry, including a flat base 158 for mounting to the corresponding magnet-mounting face 156, a pair of flat sidewalls 160, flat front and rear walls 162, and a rounded top 164. The tops 164 preferably cooperatively present an outer circumferential rotor face 166.

The gap is preferably formed between the inner circumferential stator core face 132 and the outer circumferential rotor face 166. The gap preferably has a minimum radial dimension of about one (1) mm.

In a preferred embodiment, eight (8) magnets 152 are provided and define eight (8) poles. Each magnet 152 is preferably about eighty-one hundredths (0.81) inches in length and extends along an arc of about thirty-two degrees (32°). Magnet numbers and dimensions may vary within the ambit of the present invention, however.

In keeping with the above-described preferred stator core 116, which defines twelve (12) slots, it is noted that the turntable motor 100 is preferably a twelve (12) slot, eight (8) pole motor. It is permissible according to some aspects of the present invention, however, for the turntable motor to have a different number of slots and poles maintaining the preferred three (3) slot: two (2) pole ratio or for an entirely different slot to pole ratio to be defined.

In a preferred embodiment, the rotor core 150 presents upper and lower rotor core faces 168 and 170, respectively. The rotor core 150 preferably has an axial length of about one and five tenths (1.5) inches measured between the upper and lower rotor core faces 168 and 170. The magnets 152 are preferably sized so as to not extend past the upper and lower rotor core faces 168 and 170 (i.e., the magnets 152 preferably have an axial length less than or equal to one and five tenths (1.5) inches).

Stator Core Insulation

As noted previously, the stator core 116 is preferably insulated by means of a plurality of end caps 144 fitted over portions of the teeth 120. Each end cap 144 preferably comprises an electrically insulative material. For instance, a plastic or synthetic resin material may be used.

In a preferred embodiment and as best shown in FIGS. 11 and 12, each end cap 144 provides both a physical and electrical barrier between the coils 118 and the stator core 116, with a pair of end caps 144 fitted over opposite axial sides (corresponding to upper and lower stator core faces 140 and 142) of a corresponding tooth 120 and engaging one another at an end cap juncture 172 so as to in part encompass the tooth 120.

More particularly, as shown in detail in FIGS. 13 and 14, each end cap 144 includes a yoke portion 174, an arm portion 176, and a crown portion 178 corresponding to the yoke 122, arm 124, and crown 128 of a corresponding tooth 120. Each yoke portion 174 extends along at least a portion of a corresponding one of the upper and lower axial tooth faces 134 and 136. Preferably, the outer circumferential stator core face 130 cooperatively defined by the yokes 122 is left exposed. The arm portions 176 of a corresponding pair of end caps 144 preferably cooperatively fully circumscribe the corresponding arms 124. Furthermore, the crown portions 178 of a corresponding pair of end caps cooperatively fully encircle portions of the corresponding crowns 128 and leave the inner circumferential stator core face 132 (cooperatively defined by the crowns 128) exposed.

Preferably, as will be discussed in greater detail below, at least part of each yoke portion 174 preferably extends axially in such a manner as to restrict radially outward movement of the coils 118. Furthermore, the at least part of each of the crown portions 178 preferably extends axially in such a manner as to restrict radially inward movement of the coils 118. As best shown in FIGS. 11 and 12, for instance, each crown portion 178 preferably includes a flared edge portion 180 supported relative to the stator core 116 by axially opposed struts 182. Thus, the end caps 144 preferably function both to insulate the stator core 116 and to assist in management of the wiring 117.

In a preferred embodiment, interengaging structure 184 is provided at the juncture 172 to secure and position corresponding end caps 144 relative to each other. More particularly, in a preferred embodiment and as best illustrated in FIGS. 13 and 14, each end cap 144 includes an axially projecting constricted tab 186 and an axially extending recess 188. The tab 186 of a first one of a corresponding pair of end caps 144 is received in the recess 188 of the second one of the corresponding pair, while the tab 186 of the second one of the pair is received in the recess 188 of the first one. Other means of securing and/or positioning the end caps are permissible, however. For instance, latches or adhesives might be used.

Variations from the above-described general end cap 144 structure are also permissible according to some aspects of the present invention. For instance, the juncture between corresponding end cap pairs may be discontinuous, with a portion of the core thereby being exposed. It is also permissible according to some aspects of the present invention for the end caps to be non-discrete or for insulation to be provided by a plurality of multi-tooth end caps or coverings. Yet further, as will be discussed in greater detail below, entirely different forms of stator core insulation (e.g., overmolding) may additionally or alternatively be provided.

As noted previously, each yoke portion 174 preferably extends at least in part axially in such a manner as to restrict radial movement of the coils 118. More particularly, each yoke portion 174 preferably includes a generally radially and circumferentially extending base portion 190 overlying at least a portion of a respective one of the upper and lower tooth faces 134 and 136 and a generally axially and circumferentially extending retaining wall portion 192 projecting axially from the base portion 190 and having an axial margin 194.

As best shown in FIGS. 13, 14, 17, and 18, each yoke portion 174 further preferably includes a pair of axially extending pillars 196 supporting corresponding posts 198 that project axially beyond the axial margin 194. A shoulder 200 is preferably defined between each pillar 196 and corresponding post 198. In addition, the retaining wall portion 192 preferably includes recess-defining structure 202 defining a recess 204. The functions of the pillars 196, posts 198, shoulders 200, recess-defining structures 202, and recesses 204 will be discussed in greater detail below.

In a preferred embodiment, circumferentially adjacent ones of the end caps 144 are spaced apart by a small gap 206. It is permissible according to some aspects of the present invention, however, for one or more circumferentially adjacent end caps to be in contact with each other.

Preferably, the end caps 144 provide an insulative layer of at least sixty-two thousandths (0.062) inches on the stator core 116. More preferably, the layer is between about sixty-five thousandths (0.065) inches and seventy-five thousandths (0.075) inches thick. Most preferably, the layer is about seventy thousandths (0.070) inches thick.

Stator Winding Thermal Protectors Support

In a preferred embodiment and as illustrated in FIGS. 11, 12, and 15-18, the turntable motor 100 includes at least one thermal protector assembly 207. The thermal protector assembly 207 includes a thermal protector 208 configured to provide signals associated with the temperature of the turntable motor 100.

In a preferred embodiment, each thermal protector 208 comprises a normally closed sensor switch that opens when the rated temperature of the turntable motor 100 has been exceeded proximal to the thermal protector 208. Opening of the switch may result in automatic shut-off of the motor, provision of a signal that is sent to an operating system, etc., as appropriate for the particular application. However, in a preferred embodiment, the thermal switch output is not directly connected to the motor windings or coils 118. Rather, the output is preferably remotely monitored (e.g., by customer control).

Preferably, the switch is self-resetting, although other switch types may be used without departing from the scope of the present invention.

The thermal protector assembly 207 further preferably includes a pair of protector brackets 210 for support and mounting of the thermal protectors 208. More or fewer brackets 210 may be provided without departing from the scope of the present invention, however, although it is preferred that the number of brackets 210 correspond to the number of thermal protectors 208.

Preferably, as will be discussed in greater detail below, each bracket 210 is coupled to the end caps 144 so as to position the corresponding protector 208 at least substantially adjacent the wiring 117. Most preferably, the bracket 210 positions the corresponding protector 208 in contact with the wiring 117.

As noted previously, the wiring 117 preferably forms a plurality of coils 118. The bracket 110 preferably positions the corresponding thermal protector 108 at least substantially between adjacent ones of the coils 118.

In a preferred embodiment, as illustrated, two (2) series-connected thermal protectors 208 are provided to ensure sensitivity to all three (3) phases of the motor windings 117 (i.e, of the coils 118). More particularly, the coils 118 preferably include A-phase, B-phase, and C-phase coils.

A first one of the brackets 210 preferably positions a first one of the thermal protectors 208 at least substantially between an A-phase coil 218 and an adjacent B-phase coil 218. A second one of the brackets 210 preferably positions a second one of the thermal protectors 208 at least substantially between a B-phase coil 218 and an adjacent C-phase coil 218. Such an arrangement enables efficient monitoring of the three (3) phases. However, more or fewer thermal protectors may be provided and/or may be alternatively connected.

For instance, a thermal protector might be provided for each of the three (3) phases (i.e., three (3) protectors total), or the thermal protectors might be connected instead in parallel if appropriate measures are taken to ensure appropriate readings are taken.

Preferably, each bracket 210 includes a case 212. The case 212 preferably includes a base 216 and a pair of side walls 218 extending from the base 216. The case 212 further preferably includes a pair of side hooks 220 extending from the base 216 between the side walls 218. The base 216, the side walls 218, and the side hooks 220 cooperatively at least in part surround, engage, and retain the thermal protector 208.

More particularly, each thermal protector 208 preferably includes a sensor 213 and a sleeve 214 encircling or at least in part surrounding the sensor 213. The base 216, the side walls 218, and the side hooks 220 preferably cooperatively in part surround the sensor 213 and directly engage the sleeve 214. A variety of means of supporting the protector are permissible, however.

The case 212 also preferably includes a resiliently deflectable spring arm 222 providing an axial retention force on the protector 208. That is, the spring arm 22 preferably yieldably engages the protector 208 so as to restrict shifting thereof. However, omission of the spring arm is allowable according to some aspects of the present invention.

As discussed in greater detail below, the bracket 210 preferably additionally aids in appropriate positioning of the respective protector 208. Provision of a such a means of both securely supporting and accurately positioning the protector 208 is highly advantageous, enabling greater ease of assembly of the stator 112, more repeatable positioning of the protector 208, and acquisition of more accurate thermal data from the wiring 117 (or from specific ones of the coils 118) by the thermal protector 208.

In keeping with the above-described positioning functionality, the case 212 preferably includes a mounting portion 224 including a mounting plate 226 and a pair of resiliently deflectable fingers or latches 228 extending from the mounting plate 226. More particularly, the mounting plate 226 preferably extends generally radially outwardly, while the latches 228 preferably extend generally axially.

In a preferred embodiment, a plurality of post-receiving openings 230 are formed in each of the mounting plates 226. The post-receiving openings 230 correspond with the previously described pillars 196 and posts 198 of a corresponding pair of adjacent end caps 144. More particularly, in a preferred embodiment, the four (4) total posts 198 of a pair of arcuately adjacent end caps 144 extend through the four (4) post-receiving openings 230 of a single bracket 210 to couple the bracket 210 and the end caps 144. It is permissible, however, for more or fewer post-receiving openings, pillars, and posts to be provided. Furthermore, it is permissible for more or fewer end caps to be associated with support of a single bracket. For instance, a single end cap might be provided to support a sole corresponding bracket.

As noted previously, the pillars 196 and the posts 198 preferably extend generally axially. The posts 198 therefore preferably restrict relative radial and circumferential movement between the corresponding bracket 210 and end caps 144.

Furthermore, as also noted previously, each pillar 196 preferably defines a shoulder 200 adjacent the corresponding post 198. Each shoulder 200 preferably supports the bracket and restricts axial movement between the bracket 210 and the corresponding end cap 144.

The posts 198 are preferably heat-staked or coined into place. That is, an endmost portion 232 of each post 198 is heated such that the endmost portion 232 melts and forms a cap (not shown) that extends along the mounting plate 226 and secures the mounting plate 226 in place relative to the corresponding end caps 144.

It is permissible according to some aspects of the present invention for more or fewer posts or post-receiving openings to be provided and/or for the posts to be non-heat-staked. For instance, only two (2) posts and post-receiving openings might be provided, or the posts could be threaded and secured with nuts in lieu of heat-staking.

In a preferred embodiment and as best shown in FIGS. 15, 16, and 18, the latches 228 each include a latch arm 234 and a latch head or catch 236 defining a latch cam surface 238 and a latch engagement surface 240. The latch cam surface 238 is preferably angled about forty-five (45)° from axial, while the latch engagement surface 240 is preferably orthogonal to the axial direction.

As noted previously, each end cap 144 preferably includes a retaining wall portion 192 that includes recess-defining structure 202 defining a recess 204. Each catch 236 is preferably received in a corresponding one of the recesses 204.

More particularly, each recess-defining structure 202 preferably defines a cam surface 242 and an engagement surface 244. The cam surface 242 is preferably angled about forty-five (45°) from axial, while the engagement surface 244 is preferably orthogonal to the axial direction.

Each latch 228 is preferably resiliently deformable in such a manner that, as the bracket 210 is moved axially onto the posts 198 and pillars 196, engagement of the angled latch and recess-defining structure cam surfaces 238 and 242, respectively, deflects the latch arm 234 radially outwardly until the head 236 of the latch 228 clears the corresponding recess-defining structure 202 in the radially outward direction. Upon sufficient continued axial movement, the latch 228 snaps back radially inwardly in such a manner that the latch and recess-defining structure engagement surfaces 240 and 244, respectively, abut one another. Such engagement restricts axially outward movement of the bracket 210 relative to the corresponding end caps 144.

The bracket 210 preferably comprises an electrically insulative material. For instance, in a preferred embodiment, the bracket 210 comprises synthetic resin. Use of other suitable materials falls within the ambit of the present invention, however. Furthermore, it is preferred that the bracket 210 is an integrally formed or, more particularly, integrally molded body. Multi-part construction, whether achieved via molding processes or otherwise, is also permissible, however.

Furthermore, it is particularly noted that, according to some aspects of the present invention, the brackets may instead be mounted to any alternative electrically insulative covering that at least in part covers the stator core 116. For instance, such an insulative covering might instead be provided by overmolding, which could, via use of appropriate molds, provide the preferred aforementioned structures for secure mounting of the bracket or alternative means for supporting the bracket.

Motor Shell and Endshields Overview

The turntable motor 100 preferably includes a motor shell 246. The motor shell 246 at least substantially circumscribes the stator 112 and in part defines a motor chamber 248 that at least substantially receives the stator 112 and the rotor 110.

Preferably, the shell 246 is cylindrical in form, although other shapes (e.g., polygonal) are permissible according to some aspects of the present invention.

In a preferred embodiment, the shell 246 comprises metal. More particularly, in the preferred embodiment, the shell 246 comprises cast aluminum.

The shell 246 is preferably fit on the stator core 116 via an interference fit. More particularly, as noted previously, the stator core 116 preferably has an outer diameter of about five and four hundred ninety thousandths (5.490) inches. The shell 246 preferably has an inner diameter of about five and four hundred eighty-six thousandths (5.486) inches. The interference fit is preferably achieved via a cold press operation. Non-interference fits (e.g., tight fits or slip fits) fall within the scope of the present invention, however. The fit might also alternatively be achieved via a hot drop operation.

Figure 6:
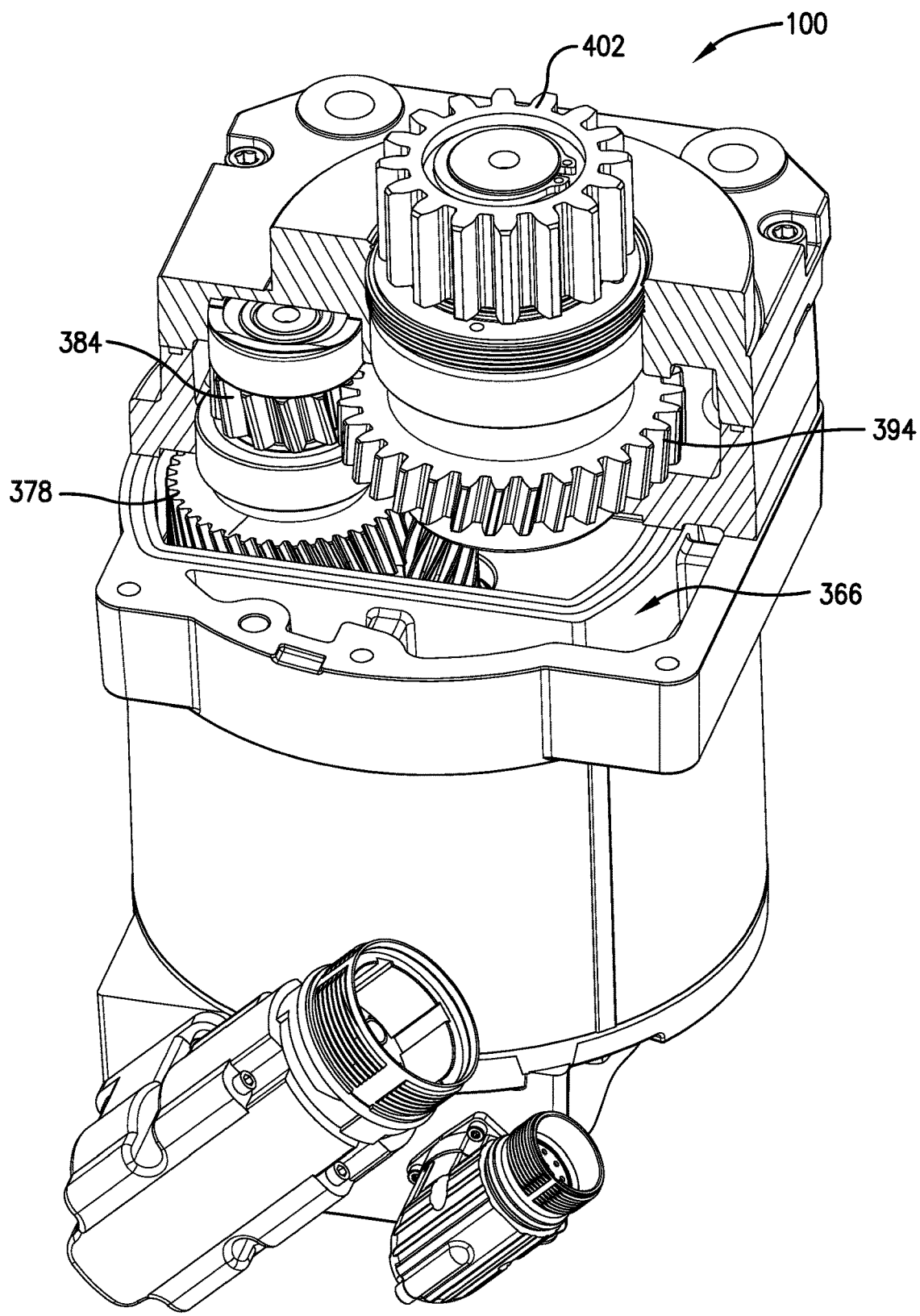
FIG. 6 is a top perspective view of the turntable motor of FIGS. 2-5, particularly illustrating the gear assembly.
Figure 7:
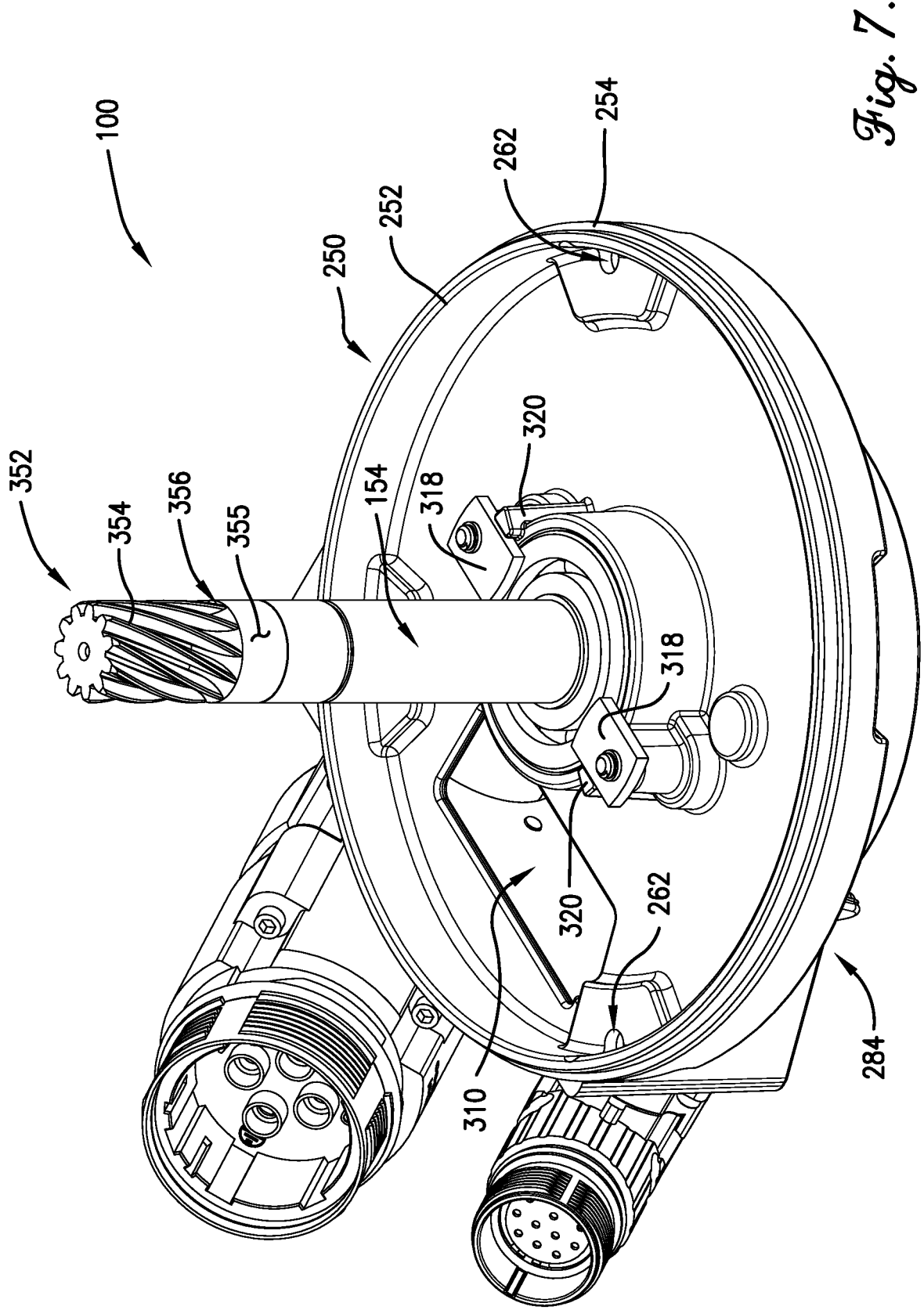
FIG. 7 is top perspective view of a portion of the turntable motor of FIGS. 2-6.

As shown in FIGS. 3-7, in a preferred embodiment, the turntable motor 100 includes a lower endshield 250 that at least substantially encloses one end of the motor chamber 248. More particularly, as shown in FIG. 7, the lower endshield 250 preferably includes a cylindrical lip 252 extending axially relative to an annular shoulder 254. The lip 252 is preferably received within the shell 246, with an axial end (not shown) of the shell 246 abutting the shoulder 254. An annular overlapping region 2564 is thus formed by the shell 246 and the lip 252.

The lower endshield 250 preferably supports the stator 112. More particularly, in a preferred embodiment, the stator core 116 includes a plurality of fastener-receiving openings 258. A plurality of fasteners 260 extend through at least some of the fastener-receiving openings 258 and through corresponding apertures 262 in the lower endshield 250.

Figure 9:
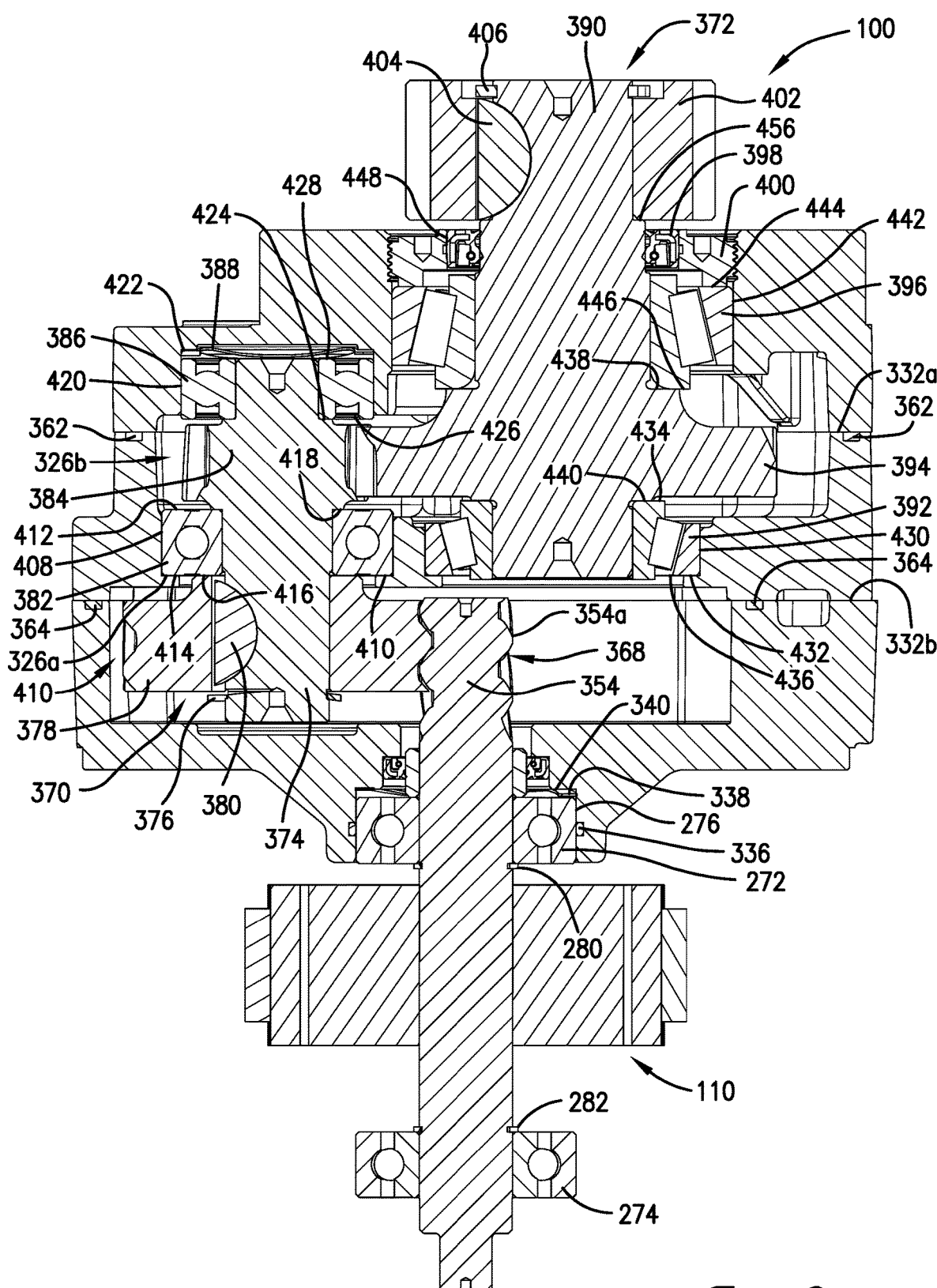
FIG. 9 is a cross-sectional side view of a portion of the turntable motor of FIGS. 2-8, particularly illustrating the gear assembly, the oil sealing system, and the sealing sleeve.

The turntable motor 100 further preferably includes an upper endshield 264 that at least substantially encloses the other end of the motor chamber 248. More particularly, as illustrated in FIGS. 8 and 9, the upper endshield 264 preferably includes a cylindrical constricted region 266 extending axially relative to an annular shoulder 268. The constricted region 266 is preferably received within the shell 246, with an axial end (not shown) of the shell 246 abutting the shoulder 268. An upper annular overlapping region 270 is thus formed by the shell 246 and the constricted region 266.

Preferably, the fit of the shell 246 and the lower and upper endshields 250 and 264 is a tight fit. However, it is permissible within some aspects of the present invention for an interference fit or other type of fit, such as a slip fit in combination with fasteners, to be used.

Motor Shaft Bearings

The turntable motor 100 preferably includes a pair of upper and lower motor shaft bearings 272 and 274 supporting the rotor 110.

The endshield 250 preferably includes a first motor shaft bearing housing 276 and second motor shaft bearing housing (not shown) supporting the upper and lower motor shaft bearings 272 and 274, respectively and, in turn, the rotor 110. Each motor shaft bearing 272, 274 is preferably additionally secured by means of a respective snap ring 280 and 282.

Additional details of the lower and upper endshields 250 and 264, respectively are provided below.

Integrated Endshield and Connection Box

In a preferred embodiment, the turntable motor 100 includes a connection box 284 that houses a motor encoder 286. In a preferred embodiment, the encoder 286 senses the position and speed of the rotor 110. The connection box 284 further preferably defines a pair of apertures 288 and 290 in communication with connectors 292 and 294. The connection box 284 further preferably covers a free end 296 of the motor shaft 154.

The connection box 284 preferably broadly includes a base wall 298, a cover 300, and a side wall 302 extending between and connecting the base wall 298 and the cover 300. The apertures 288 and 290 are preferably formed through the side wall 302.

The connection box 284 preferably includes a platform 304 on which the encoder 286 is secured using fasteners 306. Preferably, an encoder hub 308 is formed in the encoder 286. The encoder 286 is mounted on the platform in such a manner that the motor shaft 154 extends through the encoder hub 308.

An access opening 310 is preferably formed through the base wall 298 to enable access to the encoder 286. Furthermore, the cover 300 is preferably removable from the side wall 302. More particularly, the cover 300 is preferably removably mounted to the side wall 302 using fasteners 312, although other connection means (e.g., adhesives or latches) may be used according to some aspects of the present invention.

The connectors 292 and 294 preferably enable the routing and connection of wiring from the turntable motor 100 to an external device. For instance, in a preferred embodiment, the connectors 292 and 294 are associated with power and with sensors and controls. The connection box 284 protects the wiring from moisture and/or other contaminants.

In a preferred embodiment, each connector 292 and 294 has a threaded end 314 or 316, respectively, to which a desired structure may be connected.

The connectors 292 and 294 are preferably elbow-shaped, although other shapes are permissible.

The connectors 292 and 294 are preferably secured to the connection box 284 using discrete fasteners, although other connection means (e.g., integral formation, adhesives, or latches) are permissible without departing from the scope of the present invention.

In a preferred embodiment, the connection box 284 and the lower endshield 250 are integrally formed. More particularly, the connection box 284 and the lower endshield 250 are preferably formed of a single cast aluminum structure. It is permissible according to some aspects of the present invention, however, for the connection box and endshield to be discrete components connected to each other by means of fasteners, adhesives, welding, latches, or other means known in the art. Yet further, it is within the ambit of some aspects of the present invention for the endshield and connection box to be non-interconnected or only indirectly connected.

In a preferred embodiment, the lower endshield 250/connection box 284 further preferably includes a pair of radially extending screw-on tabs 318, shown in FIG. 7, and a pair of axially extending latches 320 that restrict rotation of corresponding ones of the tabs 318. The tabs 318 preferably overhang the outer race of the lower motor shaft bearing 274.

Gearbox Assembly Overview

As noted previously, the turntable motor 100 preferably includes a gearbox assembly 114. The gearbox assembly 114 preferably includes a gearbox housing 322 defining a gear chamber 324 in which a gear system or assembly 326 is substantially located.

As will be discussed in greater detail below, the gear assembly 326 includes a plurality of gears received in the gear chamber 324. Furthermore, as will also be discussed in greater detail below, the housing 322 is preferably configured to contain gear lubricant within the gear chamber.

In a preferred embodiment, the gear assembly 326 has a gear ratio of 10:1. The gear assembly 326 preferably has an efficiency of at least seventy-five percent (75%) and, more preferably, of at least eighty percent (80%). Most preferably, the gear assembly 326 efficiency is about eighty-four and six tenths percent (84.6%).

As shown in FIGS. 3-6 and 8-10, the gearbox housing 322 preferably includes a plurality of adjoining housing portions. Most preferably, as will be described in greater detail below, the housing 322 includes an upper portion 328, a lower portion 330, and a middle portion 332 positioned between and abutting the upper and lower portions 328 and 330, respectively.

In a preferred embodiment, each portion 328, 330, 332 of the gearbox housing 322 is an integrally formed aluminum casting. However, it is permissible according to some aspects of the present invention for alternative materials or formation techniques to be used. The gearbox housing 322 could be in whole or in part machined, for instance, or formed of a different metal, such as iron.

It is also permissible according to some aspects of the present invention for the housing to be formed of a single piece or to include more or fewer portions than the three (3) preferred portions described above. For instance, the middle portion might be formed of multiple sections rather than being integrally formed, as preferred.

In a preferred embodiment, the lower portion 330 of the gearbox housing 322 is integrally formed with the upper endshield 264. More particularly, the lower portion 330 and the upper endshield 264 are preferably formed of a single cast aluminum structure. It is permissible according to some aspects of the present invention, however, for the lower portion and upper endshield to be discrete components connected to each other by means of fasteners, adhesives, welding, latches, or other means known in the art. Yet further, it is within the ambit of some aspects of the present invention for the endshield and lower portion to be non-interconnected or only indirectly connected.

Preferably, the upper portion 328 of the gearbox housing 322 includes a plurality of mounting bosses 334 to enable mounting of the turntable motor 100 to the platform 14. Other mounting means fall within the scope of the present invention, however.

In a preferred embodiment, and as best shown in FIGS. 8-10, an O-ring 336 circumscribes the upper motor shaft bearing 272 to provide a seal therewith. More particularly, the upper motor shaft bearing 272 preferably includes contact seals (e.g., rather than shields) that form a seal with the O-ring 336 to restrict ingress of lubricants (e.g., oil or grease) or other contaminants from the gear assembly 326 and gear chamber 324 into the motor chamber 248. Other bearing seal configurations are permissible according to some aspects of the present invention, however.

A wavy washer (i.e., a spring washer) 338 is preferably positioned in the upper motor shaft bearing housing 276 between the upper motor shaft bearing 272 and a shoulder 340 formed in the upper motor shaft bearing housing 276. The wavy washer 338 thereby preferably aids in axial positioning of the upper motor shaft bearing 272 through cooperation with the upper motor shaft bearing housing 276 itself and the aforementioned snap ring 280.

In a preferred embodiment, the upper endshield 264 defines an input sealing chamber 342 adjacent the upper motor shaft bearing 272. The motor shaft 154 preferably extends through the input sealing chamber 342 and presents a smooth outer surface 334 therein.

Shaft Sleeve Providing Seal-Engaging Surface

The input sealing chamber 342 preferably houses a motor shaft sleeve or sealing sleeve 346 that at least substantially (most preferably completely) circumscribes the motor shaft 154 and an input seal 348 that at least substantially (most preferably completely) circumscribes the sealing sleeve 346. As will be discussed in greater detail below, the seal 348 is preferably configured to restrict passage of contaminants between the gear chamber 324 and the motor chamber 248.

Preferably, both the sleeve 346 and the input seal 348 extend at least substantially continuously circumferentially, although discontinuities such as holes or slits are permissible according to some aspects of the present invention.

As will be discussed in greater detail below, the sealing sleeve 346 is preferably fixed to the motor shaft 154 to rotate therewith. That is, the sleeve 346 preferably rotates with the shaft 154 and is axially fixed to the shaft 154 to maintain its position along the shaft 154.

In a preferred embodiment, the sealing sleeve 346 presents opposite axial ends 346a, 346b and an outer sleeve surface 346c extending between the ends 346a, 346b. The sealing sleeve 346 further preferably defines an outer seal-engaging surface 350 along the outer sleeve surface 346c.

The input seal 348 preferably presents presenting an inner seal surface 351 that sealingly engages the seal-engaging surface 350 of the sleeve 346. The input seal 348 and the O-ring 336 thereby preferably both prevent grease and/or other contaminants from the gearbox assembly 114 from migrating into the motor chamber 248, with the input seal 348 providing primary sealing and the O-ring 336 providing secondary or redundant sealing.

In a preferred embodiment, the upper end 352 of the motor shaft 154 is a pinion end comprising a toothed portion 354. The toothed portion 354 preferably presents a plurality of teeth 354a and has a toothed portion outer diameter. The teeth 354a are preferably helical teeth, as illustrated, although other tooth types are permissible according to some aspects of the present invention.

The motor shaft 154 preferably presents a smooth portion 355 adjacent the toothed portion 354. The smooth portion 355 preferably presents a smooth portion outer diameter that is at least substantially equal to the toothed portion outer diameter.

In a preferred embodiment, the toothed portion 354 includes a transition region 355 adjacent the smooth portion 355. The transition region 355 is preferably defined by a "sweep out" or other form of transition between smoothed and toothed surfaces.

The sealing sleeve 346 preferably at least substantially circumscribes the shaft 154 along the smooth portion 355. The sealing sleeve 346 thereby presents an inner diameter that is at least substantially equal to (i.e., slightly larger than) both the toothed portion outer diameter and the smooth portion outer diameter, as well as an outer sleeve surface outer diameter that is larger than both the toothed portion outer diameter and the smooth portion outer diameter.

The outer sleeve surface 346c preferably has an at least substantially constant sleeve outer diameter from one end 346a of the sleeve to the other end 346b, such that seal-engaging surface 350 has an outer diameter at least substantially equal to that of the remainder of the outer sleeve surface 346c. Thus, the seal-engaging surface outer diameter is likewise larger than both the toothed portion outer diameter and the smooth portion outer diameter.

Provision of the sealing sleeve 346 between the motor shaft 154 and the input seal 348 preferably enables assembly of the turntable motor 100 without damage occurring to the input seal 348. That is, the teeth 354a could cause cuts, abrasion, or other damage to the input seal 348 during motor shaft 154 insertion if the protective sealing sleeve 346 were not placed on the motor shaft 154.

More particularly, due to the aforementioned relative diametrical sizing of the sleeve 346 (relative to the toothed portion 354) and the engagement of the input seal 348 and the sleeve 346, the inner seal surface 351 necessarily presents a seal inner diameter that is greater than the toothed portion outer diameter. If the sleeve were not present, the seal would be sized to have a much smaller diameter in order to engage the smooth outer surface of the motor shaft. The seal would therefore be at great risk of damage by the teeth, which have an outer diameter identical to or nearly identical to that of the smooth outer surface of the motor shaft.

Preferably, the sealing sleeve 346 is discrete from the motor shaft 154. Most preferably, the sleeve 346 is fixed to the motor shaft 154 via a thermal fit. However, it is within the scope of some aspects of the present invention for other types of interference fit or, more broadly, other fixation types in general, to be used. Furthermore, it is permissible according to some aspects of the present invention for the sealing sleeve 346 to be integrally formed with the motor shaft 154.

In a preferred embodiment, the input seal 348 is a double-lip seal including a spring 348*a* that provides additional securement forces. Other types of seals are permissible, however.

Preferably, the O-ring 336 and the input seal 348 each comprise a compressible material suitable for sealing purposes. For instance, in a preferred embodiment, the O-ring 336 comprises nitrile, and the input seal 348 comprises a fluoroelastomer such as Viton®.

The sealing sleeve 346 preferably comprises a metal or resilient material. More particularly, in a preferred embodiment, the sealing sleeve 346 comprises steel. The steel is preferably carbon steel. Most preferably, for instance, the sealing sleeve 346 comprises 1215 steel or, alternatively, 1018 or 1144 steel.

The steel forming the sealing sleeve 346 is preferably hardened and is most preferably carburized. Non-hardened steel or alternatively hardened steel may be used without departing from some aspects of the present invention, however.

The sealing sleeve 346 is preferably at least in part machined. More particularly, the sealing sleeve 346 is preferably polished to improve the surface finish of at least the outer seal-engaging surface 350 (and most preferably the entire outer sleeve surface 346*c*) to enable a good seal to be formed between the outer seal-engaging surface 350 and the input seal 348.

Preferably, the motor shaft 154 is formed of 8620 steel that is machined, then hardened by both carburizing and induction hardening.

A second preferred sealing sleeve embodiment is shown in FIG. 10*a*. It is initially noted that, with the certain exceptions discussed below, many features of the sealing sleeve and related components of the second embodiment are the same as or very similar to those described in detail above in relation to the sealing sleeve 346 and related components of the first embodiment. Therefore, for the sake of brevity and clarity, redundant descriptions and numbering are generally avoided here. Unless otherwise specified, the detailed descriptions of the elements presented above with respect to the first embodiment should therefore be understood to apply at least generally to the second embodiment, as well.

In the illustrated first preferred embodiment best shown in FIGS. 8-10, the sealing sleeve 346 circumscribes the motor shaft 154 along only the smooth portion 355. In an alternative embodiment illustrated in FIG. 10*a*, however, an alternative sealing sleeve 1110 extends axially in such a manner as to at least substantially circumscribe a motor shaft 1112 along both a smooth portion 1114 thereof and a toothed portion 1116 thereof.

Yet further, the sleeve 1110 extends axially over a transition region 1118 of the toothed portion 1116. The transition region 1118 is preferably a region of the toothed portion 1116 immediately adjacent the smooth portion 1114 and is similar to the transition region 356 described above with respect to the first preferred embodiment.

It is also permissible, but not illustrated, for a sealing sleeve to be provided that circumscribes the motor shaft along only a transition region thereof, only along a toothed portion thereof, along only a combination of a smooth portion and the transition region thereof, or along only a combination of the transition region and toothed portion.

In the preferred alternative embodiment shown in FIG. 10*a*, a seal 1120 engages the sleeve adjacent (i.e., radially outside) the smooth portion 1114. However, it is permissible for the seal 1120 to additionally or alternatively engage the sleeve adjacent the transition region and/or the toothed region.

Sealed Housing of Gearbox Assembly

As noted previously and as shown in FIGS. 3-6 and 8-10, the gearbox housing 322 preferably includes the upper portion 328, the lower portion 330, and the middle portion 332 abutting the upper and lower portions 328, 330.

In a preferred embodiment, the middle housing portion abuts the upper and lower housing portions along respective upper and lower interfaces 332*a*, 332*b* exposed to the gear chamber 324.

In a preferred embodiment, the gear chamber 324 includes an upper chamber 358 defined by the upper and middle portions 328 and 332 of the gearbox housing 322. The gear chamber 324 also includes a lower chamber 360 defined by the middle and lower portions 332 and 330 of the gearbox housing 322. Because the upper and middle portions 328 and 332 define the upper chamber 358, the upper interface 332*a* is preferably exposed to the upper chamber 358. Similarly, the lower interface 332*b* is preferably exposed to the lower chamber 360.

Preferably, the upper chamber 358 and the lower chamber 360 are at least partly and, most preferably, at least substantially fluidly sealed relative to each other by means that will be discussed in greater detail below.

In a preferred embodiment, an upper seal 362 is preferably positioned along the interface 332*a* between the upper and middle portions 328 and 332. Furthermore, the chamber 358 is configured so that a lubricant fill-line is below the interface 332*a* and therefore the seal 362. The upper seal 362 preferably at least substantially (and preferably continuously) circumscribes the gear chamber 324 (more particularly, the upper chamber 358) and at least substantially prevents leakage of lubricants from the upper chamber 358 through the interface 332*a*.

Similarly, a lower seal 364 is preferably provided preferably positioned along the interface 332*b* between the middle and lower portions 332 and 330, above a lubricant fill-line of the lower chamber 360. The lower seal 364 preferably at least substantially (and preferably continuously) circumscribes the gear chamber 324 (more particularly, the lower chamber 360) and at least substantially prevents leakage of lubricants from the lower chamber 360 through the interface 332*b*.

Each of the seals 362 and 364 preferably comprises an O-ring, although other seal configurations are permissible according to some aspects of the present invention.

In a preferred embodiment, the gearbox housing 322 defines a secondary fill chamber or overflow chamber 366 adjacent the lower interface 332b, such that the lower interface 332b and the lower seal 364 are disposed between the gear chamber 324 and the overflow chamber 366. More particularly, the lower interface 332b and the lower seal 364 are preferably disposed between the overflow chamber 366 and the lower portion 330 of the gear chamber 324.

As best shown in FIG. 6, the overflow chamber 366 is preferably cooperatively defined by the lower and middle portions 330, 332 of the gearbox housing 322, such that the overflow chamber 366 is defined at least in part radially outside and below the lower interface 332b and the lower seal 364. More particularly, the overflow chamber 366 is preferably largely defined by the lower portion 330, with the middle portion 332 serving primarily as a cover for the overflow chamber 366.

Preferably, the overflow chamber 366 has a generally elongated form and extends generally perimetrically around at least part of the gear chamber 324. However, as best shown in FIG. 6, the overflow chamber preferably extends along only a part of the fully circumferential lower seal 364. That is, complete circumscription is not necessary. In a preferred embodiment, for instance, the overflow chamber 366 extends along only three (3) sides of the gear chamber 324 to define a generally U-shaped or C-shaped cross-section.

The overflow chamber 366 is thus operable to retain oil or other lubricants or contaminants escaping through the lower interface 332b and past the lower seal 364 (at least along the length of the overflow chamber 366), thereby providing an additional means of preventing leakage to ambient.

It is particularly noted that, although the above-described three-part housing 322 associated with dual interfaces 332a, 332b and dual seals 362, 364 is preferred, it is wholly within the scope of the present invention for more or fewer housing portions, interfaces, and seals to be provided. For instance, an overflow chamber might suitably be provided adjacent a single interface and seal associated with a housing having only an upper portion and a lower portion abutting each other along said interface (i.e., a housing having no middle portion). In another alternative, the overflow chamber might be provided adjacent an upper or intermediate interface rather than a lowermost interface; or a plurality of overflow chambers associated with a corresponding plurality of interfaces might be provided.

Yet further, the overflow chamber might be discontinuous in form. For instance, a first part of the chamber might extend along a first portion of a given interface, while a second, non-interconnected part of the chamber might extend along a second portion of a given interface.

Gear Assembly Overview

In a preferred embodiment and as best shown in FIGS. 6 and 8-10, the gear assembly 326 includes an input portion 368, an intermediate portion 370, and an output portion 372. Each of the portions 368, 370, 372 is preferably generally axially arranged relative to a corresponding local axis, although non-axially aligned arrangements may in some instances be permissible.

The input portion 368 preferably includes the motor shaft 154, rotatable about an input axis, and the toothed portion or pinion 354 formed at the end of the motor shaft 154.

The intermediate portion 370 preferably includes an intermediate shaft 374 rotatable about an intermediate axis and, in axial order from bottom to top (as noted previously, directional references made herein are used solely for the sake of convenience and should be understood only in relation to each other), a snap ring 376, a lower intermediate gear 378 and an associated key 380, a lower intermediate transmission bearing 382 rotatably supporting the intermediate shaft 374, an upper intermediate gear 384, an upper intermediate transmission bearing 386 rotatably supporting the intermediate shaft 374, and a resiliently deflectable spring element 388.

The output portion 372 preferably includes an output shaft 390 rotatable about an output axis and, in axial order from bottom to top, a lower output transmission bearing 392 rotatably supporting the output shaft 390, a lower output gear 394, an upper output transmission bearing 396 rotatably supporting the output shaft 390, an output seal 398 and an output shaft nut 400, an output connector 402 and associated key 404, and a snap ring 406.

Furthermore, as will be apparent from the below detailed descriptions, the input, intermediate, and output portions 368, 370, and 372, respectively, additionally include corresponding portions of the housing 322.

In a preferred embodiment, as will be discussed in greater detail below, the pinion 354 rotatably engages the lower intermediate gear 378 in the lower chamber 360 of the gear chamber 324 and drives rotation of the intermediate shaft 374. (The motor shaft 154 may therefore alternatively be referred to as an input drive shaft.) The upper intermediate gear 384 preferably rotatably engages the lower output gear 394 in the upper chamber 358 of the gear chamber 324, such that the intermediate shaft 374 in turn drives the output shaft 390.

Preferably, the motor shaft 154, the intermediate shaft 374, and the output shaft 390 are each arranged in parallel to each other, such that the gear assembly 326 is a parallel-shaft gear assembly. That is, the rotational axes of the shafts 154, 374, and 390 are preferably at least substantially parallel. Non-parallel arrangements or partially parallel arrangements fall within the scope of some aspects of the present invention, however.

As will be apparent to one of ordinary skill in the art, the gear assembly 326 is preferably a multi-stage system and, most preferably, a two-stage system. More particularly, the gear assembly includes a first stage 326a comprising the gears 354 and 374, as well as a second stage 326b comprising the gears 384 and 394.

Shimless Gear Assembly: Intermediate Portion

As noted previously, in a preferred embodiment, the pinion 354 preferably rotatably engages the lower intermediate gear 378. The lower intermediate gear 378 is preferably secured to the intermediate shaft 374 via the key 380 so as to rotate with the intermediate shaft 374, such that rotation of the pinion 354 drives rotation of both the lower intermediate gear 378 and the intermediate shaft 374.

The snap-ring 376 preferably restricts axially downward movement (e.g., due to gravity in certain motor orientations) of the lower intermediate gear 378 relative to the intermediate shaft 374.

The middle portion 332 of the gearbox housing 322 preferably defines a lower intermediate transmission bearing housing 408 including an annular middle housing intermediate shoulder 140. The lower intermediate transmission bearing 382 is preferably received by the lower intermediate transmission bearing housing 408 in such a manner as to rest on the middle housing intermediate shoulder 410, best shown in FIGS. 9 and 10. More particularly, the lower intermediate transmission bearing 382 preferably presents opposite, axially spaced apart upper and lower faces 412 and 414, respectively. The lower face 414 preferably rests on the middle housing intermediate shoulder 410, such that the middle housing intermediate shoulder 410 restricts axially downward motion (e.g., due to gravity in certain motor orientations) of the lower intermediate transmission bearing 382.

Furthermore, as also best shown in FIGS. 9 and 10, the lower intermediate gear 378 preferably presents an upper shoulder or contact surface 416 that abuts the lower face 414 of the lower intermediate transmission bearing 382 such that axially shifting of the intermediate shaft 374 and the lower intermediate gear 378 in an axially upward direction is restricted.

The intermediate shaft 374 preferably integrally defines a circumferential lower intermediate shaft shoulder 418, shown in FIGS. 9 and 10, that abuts the upper face 412 of the lower intermediate transmission bearing 382. The lower intermediate transmission bearing 382, by nature of the support provided by the middle housing intermediate shoulder 410, thus prevents axially downward shifting (e.g., due to gravity in certain motor orientations) of the intermediate shaft 374.

In a preferred embodiment, the upper intermediate gear 384 is preferably axially fixed relative with the intermediate shaft 374 and additionally secured thereto so that the intermediate gear 284 and shaft 374 rotate together. Most preferably, the upper intermediate gear 284 is integrally formed with the intermediate shaft 374. It is permissible according to some aspects of the present invention, however, for the upper intermediate gear to be a discrete gear attached to the intermediate shaft to rotate therewith while also being axially fixed relative thereto. For instance, the upper intermediate gear could be keyed to the intermediate shaft or secured via an interference fit.

Preferably, the aforementioned lower intermediate shaft shoulder 418 is disposed axially between the upper intermediate gear 384 and the lower intermediate transmission bearing 382, such that axially downward shifting of the intermediate shaft 374 and the upper intermediate gear 384 is restricted.

As noted previously, the upper intermediate gear 384 preferably engages the lower output gear 394, such that rotation of the motor shaft 154 ultimately is transferred to the lower output gear 394.

The upper portion 328 of the gearbox housing 322 preferably defines an upper intermediate transmission bearing housing 420 including an annular upper housing shoulder 422, as shown in FIGS. 8-10. Furthermore, as best shown in FIGS. 9 and 10, the intermediate shaft 374 preferably includes an integrally formed circumferential upper intermediate shaft shoulder 424. The upper intermediate transmission bearing 386 is preferably received by the upper intermediate transmission bearing housing 420 in such a manner as to rest on the upper intermediate shaft shoulder 424 and be spaced from the upper housing shoulder 422. More particularly, the upper intermediate transmission bearing 386 preferably presents opposite, axially spaced apart upper and lower faces 426 and 248, respectively. The lower face 426 preferably rests on the upper intermediate shaft shoulder 424 and is axially spaced from the upper housing shoulder 422. The upper intermediate shaft shoulder 424 restricts axially downward motion (e.g., due to gravity) of the upper intermediate transmission bearing 386.

The lower and upper intermediate transmission bearings 382 and 386, respectively, are preferably slip fit on the intermediate shaft 374. Furthermore, the lower and upper intermediate transmission bearings 382 and 386, respectively, are preferably ball bearings, with the lower intermediate transmission bearing being a sealed ball bearing, although other bearing types are permissible according to some aspects of the present invention.

Preferably, the upper intermediate gear 384 and the lower intermediate gear 378 are each helical gears that cooperatively create a first load in a generally axially upward direction.

Furthermore, in a preferred embodiment, the spring element 388 is positioned between the upper face 428 of the upper intermediate transmission bearing 386 and the upper housing shoulder 422. The spring element 388 acts to provide a downward axial force (i.e., a second load acting in a direction at least substantially opposite the first load) on the upper intermediate transmission bearing 386. This downward axial force is then transferred to or acts upon the upper intermediate gear 384 and, in turn, on other components of the intermediate portion 370.

Preferably, this second load has a greater magnitude than the first load. That is, the downward force exerted by the spring element 388 is preferably greater than the upward force generated by the rotation of the helical upper and lower intermediate gears 384 and 378, respectively.

In a broad sense, therefore, the spring element 388 functions to take up any axial slack in the intermediate portion 370 of the gear assembly 326 and thereby accommodates variations in axial length and positioning that may occur due to allowable manufacturing tolerances.

It is also noted that additional downward loads (i.e., downward loads in addition to the second load provided by the spring element 388) are provided by the other components of the intermediate portion 370. For instance, the weight of the intermediate shaft 374 places a downward force on the lower intermediate transmission bearing, and so on. These secondary or supplemental forces assist the second load in countering the first load.

In a preferred embodiment, the spring element 388 comprises a wavy washer, although other spring element types or means for yieldably urging the intermediate portion 370 downward may be used.

In a preferred embodiment, the intermediate portion 370 of the gear assembly 326 is devoid of shims. Such a configuration is enabled by the above-described configuration of the intermediate portion 370 of the gear assembly 326. More particularly, as described above, axial positioning of the intermediate portion 370 in a broad sense is based primarily on the abutment of the lower face 414 of the lower intermediate transmission bearing 382 on the middle housing intermediate shoulder 410 and the abutment of the lower intermediate shaft shoulder 418 on the upper face 412 of the lower intermediate transmission bearing 382, with the wavy washer 388 accommodating axial variations due to manufacturing tolerances and at least substantially eliminating end play (i.e., the resultant upward axial forces during motor operation are preferably less than the downward axial forces applied by the wavy washer 388).

Shimless Gear Assembly: Output Portion

In a preferred embodiment, the previously described first and second loads, along with third and fourth loads to be discussed below, cooperate to at least in part reduce axial shifting of not just the intermediate portion 370 but of the input, intermediate, and output portions 368, 370, and 372. Furthermore, in keeping with the preferred reduction in shifting of all of the portions 368, 370, and 372, it is preferred that the gear assembly 326 as a whole is devoid of shims.

As noted previously, the upper intermediate gear 384 preferably rotatably engages the lower output gear 394. The lower output gear 394 is preferably integrally formed with the output shaft 390, such that the output shaft 390 rotates with the lower output gear 394. It is permissible according to some aspects of the present invention, however, for the lower output gear to be a discrete gear attached to the output shaft to rotate therewith while being fixed axially relative thereto. For instance, the lower output gear could be keyed to the output shaft or secured via an interference fit.

The pinion 354 and the lower output gear 394 are each preferably helical gears that cooperatively create a fourth load in a generally axially upward direction.

In a preferred embodiment, the lower output gear 394 is supported by the lower output transmission bearing 392. More particularly, the middle portion 332 of the gearbox housing 322 preferably defines a lower output transmission bearing housing 430 including an annular middle housing output shoulder 432 (best shown in FIGS. 9 and 10). The lower output transmission bearing 392 is preferably received by the lower output transmission bearing housing 430 in such a manner as to rest on the middle housing output shoulder 432. More particularly, the lower output transmission bearing 392 preferably presents opposite, axially spaced apart upper and lower faces 434 and 436, respectively. The lower face 436 preferably rests on the middle housing output shoulder 432, such that the middle housing output shoulder 432 restricts axially downward motion (e.g., due to gravity) of the lower output transmission bearing 392.

As best shown in FIGS. 9 and 10, the output shaft 390 preferably presents integrally defined opposite, axially spaced apart upper and lower shoulders or contact surfaces 438 and 440, respectively. Preferably, the upper and lower contact surfaces 438 and 440 are disposed on opposite axial sides of the lower output gear 394 and, in some embodiments, might alternatively be integrally formed therewith. Furthermore, the lower contact surface 440 is preferably disposed axially between the lower output gear 394 and the lower output transmission bearing 434.

The lower contact surface 440 preferably abuts the upper face 434 of the lower output transmission bearing 392 (which presents the lower face 436 that rests on the middle housing output shoulder 432), such that both the lower output gear 394 and output shaft 390 are supported and restricted from axially downward motion.

In a preferred embodiment, the upper portion 328 of the gearbox housing 322 defines an upper output transmission bearing housing 442. The upper output transmission bearing 396 is preferably received by the upper output transmission bearing housing 442 and rests on the upper contact surface 438 of the lower output gear 394. More particularly, the upper output transmission bearing 396 preferably presents opposite, axially spaced apart upper and lower faces 444 and 446, respectively (the upper face 444 including two tiers). The lower face 444 preferably rests on the upper contact surface 438 defined by the output shaft 390.

The upper and lower output transmission bearings 396 and 392, respectively, are preferably each tapered roller bearings, although other bearing types are permissible according to some aspects of the present invention.

It is noted that, as previously discussed, the upper chamber 358 and the lower chamber 360 of the gear chamber 324 are at least partly and, most preferably, at least substantially fluidly sealed relative to each other. Such restriction against fluid flow is provided in part by physical obstructions provided by the middle housing portion 332, the sealed roller bearing 382 (i.e., the lower intermediate transmission bearing 382), and the tapered roller bearing 392 (i.e., the lower output transmission bearing 392). Additional restriction is provided by use of a higher viscosity lubricant or grease within the bearing 392 than is used in the gear chamber 324. That is, the higher viscosity grease, upon tight packing into the bearing 392, effectively forms a seal against leakage of the lower viscosity grease through the interior of the bearing 392.

The upper portion 328 of the gearbox housing 322 further preferably defines an output sealing chamber 448. The output sealing chamber 448 preferably houses the output shaft nut 400 and the output seal 398.

More particularly, as shown in FIGS. 8-10, the upper portion 328 preferably defines a threaded interface 450 adjacent the sealing chamber 448. The output shaft nut 400 preferably includes threads 452 corresponding to the threaded interface 450. The output shaft nut 400 is preferably threadably secured in the output sealing chamber 448 by means of interengagement of the threads 452 with the threaded interface 450.

The output shaft nut 400 preferably circumscribes the output seal 398 and forms a seal therewith. The output seal 398 preferably circumscribes the output shaft 390 and also forms a seal therewith. That is, the output seal 398 preferably provides seals both with the output shaft nut 400 and with the output shaft 390.

Preferably, the output seal 398 comprises a compressible material suitable for sealing purposes. For instance, in a preferred embodiment, the output seal 398 comprises nitrile, although Viton® and other materials may be used without departing from the scope of the present invention.

The output shaft nut 400 preferably comprises steel or an alternative metal or other material having sufficient hardness to function as required.

It is permissible according to some aspects of the present invention for the output nut and seal to be a pre-assembled unit.

In a preferred embodiment, the output shaft nut 400 presents a lower contact face or nut face 454 that abuts the upper face 444 of the upper output transmission bearing 396 to apply the previously mentioned third load thereto in a generally axially downward direction. The third load is then transferred to (i.e., acts upon) the lower output gear 394, etc.

Thus, the output shaft nut 400 restricts axially upward motion of the upper output transmission bearing 396. More broadly, the previously described engagements between various components of the output portion 372 are such that the output shaft nut 400 additionally restricts axially upward shifting of the output shaft 390, the lower output gear 394, and the lower output transmission bearing 392.

The output connector 402 is preferably fixed to the output shaft 390 by means of the key 404, as shown in FIG. 9, such that rotation of the output shaft 390 results in rotation of the output connector.

Furthermore, as shown in FIGS. 9 and 10, the output shaft 390 preferably defines an annular output shaft shoulder 456. The output connector 402 preferably abuts the output shaft shoulder 456.

Finally, the snap ring 406 preferably additionally secures the output connector 402 relative to the output shaft 390, restricting axially upward motion of the output connector 402 relative to the output shaft 390.

Turning again to the output shaft nut 400, it is preferred that the axial length of the threaded interface 450 of the upper portion 328 of the gearbox housing 322 is greater than the axial length spanned by the threads 452 of the output shaft nut 400. Such disparity enables the output shaft nut 400 to be axially positioned as appropriate for axially securing other components of the output portion 372 of the gear assembly 326 (via transfer of axial force from the lower contact face 454 of the output shaft nut 400 to the upper face 444 of the upper output transmission bearing 396 and onward through the output portion 372).

That is, the output shaft nut 400 is shiftable to accommodate axial variations due to manufacturing tolerances and can be torqued as desired to achieve an appropriate third load magnitude. An appropriate third load magnitude results in an appropriate balance between the first, second, third, and fourth loads and, in turn, a substantial overall lack of shifting (or at least some degree of reduction in axial shifting) of each of the input, intermediate, and output portions 368, 370, and 372. Such lack of or reduction in shifting preferably enables the preferred shimless design not just of the intermediate portion 370 but of the output portion 372 and of the gear assembly 326 as a whole.

It is noted that additional downward loads (i.e., downward loads in addition to the third load provided by the nut 400) are provided by the other components of the output portion 370. For instance, the weight of the output shaft 390 places a downward force on the lower output transmission bearing 392, and so on. These secondary or supplemental forces assist the third load in countering the fourth load.

The components of the output portion 372 are preferably "set" during assembly by loading the nut 400 sufficiently to prevent all axial movement of the output shaft 390. This might require the nut 400 to be "overloaded" relative to the desired third load (i.e., the downward load desired to counter the upward fourth load of the output portion 372). To ensure the output portion 372 is not overloaded during operation, the nut 400 is initially torqued to ensure there is no axial play in the output shaft 390, as described. The nut is then backed off (i.e., loosened) and re-torqued to a predetermined amount that corresponds with the desired third load.

Again, with respect to the output portion 372, such a configuration is enabled the by axial positioning of the output portion 372 that is achieved in a broad sense based primarily on the abutment of the lower face 436 of the lower output transmission bearing 392 on the middle housing output shoulder 432 and the abutment of the lower contact face 440 of the lower output gear 394 (which is preferably integrally formed with the intermediate shaft 390) on the upper face 434 of the lower output transmission bearing 392, with the axially adjustable output shaft nut 400 accommodating axial variations due to manufacturing tolerances and at least substantially eliminating end play.

Thus, the motor shaft 154, intermediate shaft 374, and output shaft 390 are at least substantially prevented from axially shifting relative to one another; and the gears associated with the shafts 154, 374, 390 are maintained in acceptable axial alignment. Such stability and alignment quality leads to less wear, lower noise, and a variety of other advantages.

Lift Motor

A preferred embodiment of the lift motor 500 is shown in detail in FIGS. 19-32c. It is initially noted that, with certain exceptions to be discussed in detail below, many of the elements of the lift motor 500 are the same as or very similar to those described in detail above in relation to the turntable motor 100. Therefore, for the sake of brevity and clarity, redundant descriptions and numbering will be generally avoided here. Unless otherwise specified, the detailed descriptions of the elements presented above with respect to the turntable motor 100 should therefore be understood to apply at least generally to the lift motor 500, as well.

In some cases, features described below with respect to the lift motor 500 may also be applicable to the turntable motor 100.

In a preferred embodiment, the lift motor 500 broadly includes a rotor 510 rotatable about an axis, a stator 512, a gearbox assembly 514, a lift arm assembly 516, and a motor mounting assembly 518.

The lift motor 500 is preferably oriented such that the axis extends generally horizontally and the mounting assembly 518 serves as a base or bottom structure. The lift arm assembly 516 is thus positioned on a side of the lift motor 500. It is permissible, however, in connection with certain aspects of the present invention, for the lift motor to be alternatively oriented. That is, unless otherwise specified or made clear, the directional references made herein with regard to the lift motor 500 (e.g., top, bottom, upper, lower, etc.) are used solely for the sake of convenience and should be understood only in relation to each other. For instance, a component might in practice be oriented such that faces referred to as "top" and "bottom" are sideways, angled, inverted, etc. relative to the chosen frame of reference.

The lift arm assembly 516 preferably indirectly engages the platform 14 via a scissor mechanism (not shown) to raise and lower the platform 14. Such a configuration is not necessary, however.

Stator Overview

Similar to the stator 112 of the turntable motor 100 and as shown in FIGS. 22 and 29, the stator 512 of the lift motor 500 preferably includes a generally toroidal stator core 520 and a plurality of coils 522 wound about the stator core 520. The coils 522 preferably comprise electrically conductive wiring 524.

The stator core 520 preferably has an axial length of about one and twenty-five hundredths (1.25) inches, an outside diameter of about five and four hundred ninety thousandths (5.490) inches, and an inside diameter of about three and two hundred thirty-four (3.234) inches.

Furthermore, the stator core 520 is preferably electrically insulated by means of electrically insulative end caps 526.

In a preferred embodiment, the lift motor 500 includes at least one thermal protector 528 secured to the end caps 526 and configured to provide signals associated with the temperature of the lift motor 500.

The stator core 520 preferably includes twelve (12) teeth 530 defining twelve (12) slots 532 therebetween.

Rotor Overview

As shown in FIG. 29, the rotor 510 preferably includes a rotor core 534, a plurality of arcuately arranged magnets 536, and a motor shaft 538.

The magnets 536 are preferably generally secured as described above with respect to the magnets 152 of the turntable motor 100. However, the magnet retention means must be sufficient only to restrict magnet dislodgement at all speeds of the lift motor 500 rather than those of the turntable motor 100. In a preferred embodiment, for instance, the lift motor 500 has a high speed of about eight hundred forty (840) rpm and a maximum speed of about eight hundred forty (840) rpm. Such speeds, in combination with a preferred mass of the magnets 536 of about twenty-three and six tenths (23.6) grams each and the radial positioning of the magnets 536 relative to the axis of rotation, lead to centrifugal magnet forces of about one and fifty-four hundredths (1.54) lb. The magnets 536 may also be subject to radial forces of about fifty-five and six tenths (55.6) lb due to the maximum motor torque force of about fifty-five and seven tenths (55.7) lb (i.e., about thirteen and nine tenths (13.9) lb/magnet, wherein the radial magnetic force is approximately four (4) times the torque force).

The magnet retention means should also be sufficient to restrict magnet dislodgement at all possible magnet temperatures during operation of the lift motor 500. In a preferred embodiment, for instance, the magnet retention means function acceptably when the magnets 536 are at temperatures between about zero degrees Celsius (0° C.) and a predicted maximum temperature of about sixty-one and two tenths degrees Celsius (61.2° C.).

The magnets 536 are preferably rare earth magnets. More particularly, the magnets 536 are preferably thirty-five (35) uh (one hundred eighty degrees Celsius (180° C.)) grade neodymium iron boron magnets. Other magnet types may be used without departing from some aspects of the present invention, however. For instance, the magnets might be of a lower grade and/or comprise ferrite.

In a preferred embodiment, eight (8) magnets 536 are provided and define eight (8) poles. Similar to the turntable motor 100, the lift motor 500 is therefore preferably a twelve (12) slot, eight (8) pole motor.

Each magnet 536 is preferably about one and twenty-five hundredths (1.25) inches in length and extends along an arc of about thirty-two (32°).

The rotor core 534 preferably has an axial length of about one and twenty-five hundredths (1.25) inches.

Motor Shell and Endshields Overview

The lift motor 500 further includes a motor shell 540 at least substantially circumscribing the stator 512 and in part defining a motor chamber 542 that at least substantially receives the stator 512 and the rotor 510.

In a preferred embodiment, the lift motor 500 includes a first side endshield 544 that at least substantially encloses one end of the motor chamber 542 and a second side endshield 546 that at least substantially encloses the other end of the motor chamber 542. The first and second side endshields 544 and 546, respectively, will be discussed in greater detail below.

Connection Box

The lift motor 500 further preferably includes a connection box 548 configured similarly to the connection box 284 of the turntable motor 100. For instance, in a preferred embodiment, the connection box 548 is in part integrally formed with the first side endshield 544. Furthermore, the connection box 548 preferably comprises includes a base wall 550, a cover 552, and a side wall 554 extending between and connecting the base wall 550 and the cover 552.

As best shown in FIG. 22, the connection box 548 preferably houses a motor encoder (not illustrated but similar to the encoder 286 of the turntable motor 100) and provides a pair of apertures 556 and 558 in communication with connectors 560 and 562. The connection box 548 further preferably substantially covers a free end 564 of the motor shaft 538 and protects wiring 566 extending between the lift motor 500 and an external device via the connectors 560 and 562. In a preferred embodiment, for instance, the side wall 554 includes an overhanging portion 568 that extends above the wiring 566 and the encoder to protect them from drips or other forms of contamination.

Furthermore, as shown in FIGS. 21 and 31, a portal 570 is preferably formed in the cover 552 to enable easy access to the free end 564 of the motor shaft 538. More particularly, the free end 564 of the motor shaft 538 includes a hexagonal interface 572 (best illustrated in FIG. 22) that enables a user to manually turn the motor shaft 538 if it becomes locked (e.g., due to overloading). That is, the portal 570 enables a user to manually back up the lift motor 500 if, for example, a load were stuck in an undesirable position. Although the cover 552 could be removed entirely to enable the necessary access, such removal would be time-consuming and potentially allow for contamination of the components housed by the connection box 548. In contrast, provision of the portal 570 enables efficient access to the hexagonal interface while minimizing the risk of detrimental contamination.

Gearbox Assembly Overview

As noted previously, the lift motor 500 preferably includes a gearbox assembly 514. The gearbox assembly 514 preferably includes a gearbox housing 574 defining a gear chamber 576 in which a gear assembly 578 is substantially located. (The gear chamber 576 is shown in FIG. 22 with the gear assembly 578 removed, while the gear assembly 578 is shown in FIGS. 32-32*c*.)

As will be discussed in greater detail below, the gearbox housing 574 itself preferably forms part of the gear assembly 578.

The gearbox housing 574 is preferably secured to the shell 540 via fasteners 580, although other securement means (e.g., latches, welding, adhesives, partial or complete integral construction, etc.) may additionally or alternatively be used.

The gearbox housing 574 preferably includes a motor bracket 582, a first intermediate portion 584 adjacent the motor bracket 582, a second intermediate portion 586 adjacent the first intermediate portion 584, and an output holder 588 adjacent the second intermediate portion 586. The first and second intermediate portions 584 and 586, respectively, are thus positioned between the motor bracket 582 and the output holder 588.

Preferably, the housing portions 582, 584, 586, 588 extend continuously and are devoid of openings therein or gaps therebetween, such that gearbox housing 574 at least substantially encloses the gear chamber 576 and protects it from ingress of environmental contaminants.

Gearbox Assembly: Integrated Housing and Endshield

In a preferred embodiment, the motor bracket 582 of the gearbox housing 574 is integrally formed with the second side endshield 546. More particularly, motor bracket 582 and the second side endshield 546 are preferably formed of a single cast structure. For instance, in a preferred embodiment, the motor bracket 582/second side endshield 546 is a cast aluminum structure. It is permissible according to some aspects of the present invention, however, for the motor bracket and second side endshield to be discrete components connected to each other by means of fasteners, adhesives, welding, latches, or other means known in the art. Yet further, it is within the ambit of some aspects of the present invention for the second side endshield and motor bracket to be non-interconnected or to comprise a different material or materials (e.g., iron)

The stator 512 is preferably supported on the motor bracket 582 via fasteners 590.

Gearbox Sealing and Lubrication Management System

In a preferred embodiment and as best shown in FIG. 32*a*, the second side endshield 546/motor bracket 582 includes a motor shaft bearing housing 592. The motor shaft bearing housing 592 preferably receives a motor shaft bearing 594 that supports the motor shaft 538 in the second side endshield 546/motor bracket 582 of the gearbox housing 574. The motor shaft bearing 594 is preferably a ball bearing, although other bearing types are permissible within the ambit of the present invention.

The motor shaft bearing housing 592 preferably includes a generally radially extending base wall 596 and a circumferential sidewall 598 that extends axially from the base wall 596. The motor shaft 538 preferably passes through a motor shaft opening 600 defined in the base wall 596. The sidewall 598 preferably circumscribes both the motor shaft 538 and the motor shaft bearing 594, with the motor shaft bearing 594 being intermediately positioned between the motor shaft 538 and the sidewall 598.

In a preferred embodiment, a wavy washer 602 is provided between the motor shaft bearing 594 and the base wall 596.

As best shown in FIG. 32*a*, it is preferable that only a very small clearance 604 is provided between the motor shaft 538 and the base wall 596 at the motor shaft opening 600. Furthermore, the motor shaft bearing 594 is preferably securely fit in the motor shaft bearing housing 592, such that few or no gaps exist (e.g., via a tight fit or an interference fit, respectively). A labyrinth 606 is thus defined that at least substantially prevents ingress of lubricants (e.g., oil or grease) or other contaminants from the gear assembly 578 into the motor chamber 542, without the use of a traditional seal. Other labyrinth configurations or even a seal may be utilized in some aspects of the present invention, however.

It is noted that the preferred horizontal orientation of the lift motor 500 enables the effective use of the labyrinth 606 as a sealing mechanism. For instance, in a vertically oriented motor, gravity would work against a labyrinthine sealing mechanism to urge contaminants to pass therethrough.

The above-described preferred method of sealing the gearbox housing 574 enables sealing of the gearbox housing 574 without the use of a compressible seal (e.g., a nitrile O-ring, etc.), although compressible seals may alternatively or additionally be used without departing from the spirit of some aspects of the present invention.

Gearbox Assembly: Gear Assembly

In a preferred embodiment, as shown in FIG. 32*a* and schematically in FIGS. 32*b* and 32*c*, the gear assembly 578 is a two (2)-stage planetary gear assembly having a first stage 608 and a second stage 610. The gear assembly preferably has an 80:1 gear ratio, with the first stage 608 having a 10:1 gear ratio and the second stage 610 having an 8:1 gear ratio. The gear assembly 578 is therefore preferably operable to decrease speed and increase torque.

Various individual-stage gear ratios and/or overall gear ratios are permissible without departing from the scope of the present invention, however. Furthermore, the gear ratios of the stages might be equal, or the second stage might have a higher gear ratio than the first stage.

The gear assembly 578 preferably achieves an efficiency of at least eighty percent (80%). More preferably, the gear assembly has an efficiency of at least eighty-five percent (85%). Most preferably, the gear assembly efficiency is about ninety percent (90%).

As shown in FIGS. 32*a* and 32*b*, the first stage 608 preferably includes a first sun gear 612, three (3) first planetary gears 614 (only one shown in FIG. 32*a* for the sake of clarity) driven by the first sun gear 612, three (3) needle bearings 616 (only one shown in FIG. 32*a* for the sake of clarity) supporting respective ones of the first planetary gears 614, and a first internal gear 618 along which the first planetary gears 614 orbit the first sun gear 612. A different number of planetary gears and needle bearings may be provided without departing from the scope of the present invention, however.

The first sun gear 612 is preferably integrally formed at a drive end 620 of the motor shaft 538, although non-integral formation is permissible according to some aspects of the present invention. For instance, the first sun gear might alternatively be press fit onto the drive end of the motor shaft.

Preferably, the first intermediate portion 584 of the gearbox housing 574 comprises the first internal gear 618, although it is permissible according to some aspects of the present invention for the first intermediate portion of the housing and the first internal gear to be discrete components.

As best shown in FIGS. 32*a* and 32*c*, the second stage 610 preferably includes a second sun gear 622, three (3) second planetary gears 624 (only one shown in FIG. 32*a* for the sake of clarity) driven by the second sun gear 622, three (3) needle rollers 626 (only one shown in FIG. 32*a* for the sake of clarity) supporting respective ones of the second planetary gears 624, and a second internal gear 628 along which the second planetary gears 624 orbit the second sun gear 622. A different number of planetary gears and needle rollers may be provided without departing from the scope of the present invention, however.

Preferably, the second intermediate portion 586 comprises the second internal gear 628, although it is permissible according to some aspects of the present invention for the second intermediate portion of the housing and the second internal gear to be discrete components.

In a preferred embodiment and as will be discussed in greater detail below, the gear assembly 578 transfers rotation of the motor shaft 538 to an output shaft 630. The lift arm assembly 516 is preferably attached to the output shaft 630 via a set screw or other suitable means, such that rotation of the motor shaft 538 causes rotation or swinging of the lift arm assembly 516.

Preferably, as shown in FIG. 32*a*, rotation is transferred from the first stage 608 to the second stage 610 by means of a carrier 632. More particularly, in a preferred embodiment, the carrier 632 includes a hub 634, a plate 636 extending radially from the hub 634, and three (3) carrier pins 638 (only one shown in FIG. 32*a* for the sake of clarity) extending axially from the plate 636. Each of the first planetary gears 614 is supported on a respective one of the carrier pins 638 by a corresponding one of the needle bearings 616, such that travel of the first planetary gears 614 along the first internal gear 618 (i.e., orbiting of the first sun gear 612 by the first planetary gears 614) causes rotation of the carrier 632.

The second sun gear 622 preferably includes a connection portion 640 received in the hub 634 of the carrier 632, such that rotation of the carrier 632 causes rotation of the second sun gear 622. The interconnection means by which rotation is transferred from the first stage to the second stage may vary without departing from the scope of the present invention, however.

The first planetary gears 614 are preferably evenly arcuately spaced apart. It is permissible according to some aspects of the present invention, however, for the first planetary gears to be unevenly spaced.

As shown in FIG. 32*a*, in a preferred embodiment, the output shaft 630 includes a transfer portion 642, a connection portion 644, and a mid-portion 646 connecting the transfer portion 642 and the connection portion 644. Rotation is preferably transferred from the second stage to the connection portion 644 via the transfer portion 642. The lift arm assembly 516 is preferably attached to the connection portion 644 in the manner discussed above.

More particularly, in a preferred embodiment, the transfer portion 642 includes three (3) generally axially extending transfer portion pins 648 (only one shown in FIG. 32*a*). Each of the second planetary gears 624 is supported on a respective one of the transfer portion pins 648 by a corresponding one of the needle rollers 626, such that travel of the second planetary gears 624 along the second internal gear 628 (i.e., the orbiting of the second planetary gears 624 about the second sun gear 622) causes rotation of the transfer portion 642 and, in turn, the connection portion 644 and the lift arm assembly 516.

The second planetary gears 624 are preferably evenly arcuately spaced apart. It is permissible according to some aspects of the present invention, however, for the second planetary gears to be unevenly spaced.

In a preferred embodiment, the gear assembly 578 further preferably includes the motor shaft bearing 594 that supports the motor shaft 538 in the motor bracket 582 of the gearbox housing 574 (as described previously); an output shaft ball bearing 650 supporting the transfer portion 642 of the output shaft 630 at the juncture of the first and second intermediate portions 584 and 586, respectively, of the gearbox housing 574; and an output shaft roller bearing 652 supporting the mid-portion 646 in the output holder 588 of the gearbox housing 574. Other bearing types (e.g., ball, roller, etc.) and/or arrangements (e.g., different positioning) are permissible without departing from the ambit of the present invention, however.

The first sun gear 612 preferably includes twelve (12) teeth and is formed of carburized chromium molybdenum steel. The first planetary gears 614 preferably each include forty-eight (48) teeth and are formed of carburized chromium molybdenum steel. The first internal gear 618 preferably includes one hundred eight (108) teeth and is formed of tempered and quenched chromium molybdenum steel. Other numbers of teeth, gear materials, and hardening methods (including no hardening methods) may be used within the ambit of some aspects of the present invention, however.

The second sun gear 622 preferably includes fifteen (15) teeth and is formed of carburized chromium molybdenum steel. The second planetary gears 624 preferably each include forty-five (45) teeth and are formed of carburized chromium molybdenum steel. The second internal gear 628 preferably includes one hundred five (105) teeth and is formed of tempered and quenched chromium molybdenum steel. Other numbers of teeth, gear materials, and hardening methods (including no hardening methods) may be used within the ambit of some aspects of the present invention, however.

Lift Arm Assembly: Crank Arm and Pin

In a preferred embodiment, as noted previously, the lift motor 500 includes a lift arm assembly 516 operable to lift the platform 14 with assistance of a scissor mechanism or other lifting aid. However, as also noted previously, direct lifting of the platform 14 is permissible without departing from the scope of the present invention.

In a preferred embodiment and as best illustrated in FIGS. 19-31, the lift arm assembly 516 includes a generally radially extending crank arm 654 fixed to the output shaft 630 and a crank pin 656 extending generally axially from the crank arm 654.

The crank arm 654 preferably comprises tempered and quenched chromium molybdenum steel with a trivalent chromate conversion coating. Other materials, hardening treatments (including no hardening treatments), and surface treatments (including no surface treatments) are permissible, however.

The crank pin 656 preferably comprises tempered and quenched chromium molybdenum steel with a hard chromium plating. Other materials, hardening treatments (including no hardening treatments), and surface treatments (including no surface treatments) are permissible, however.

Material selections for the crank arm 654 and the crank pin 656 are particularly important in view of the high loads to which the crank arm 654 and crank pin 656 are subjected during operation of the lift motor 500. For instance, in a preferred embodiment, the crank arm 654 and the crank pin 656 are safely operable when associated with a ten and five tenths (10.5) rpm output speed; six hundred seventy (670) Nm output torque; eight thousand, eight hundred (8,800) N radial load; and twenty-three thousand, seven hundred fifty (23,750) radial shock load (once per cycle for five hundredths (0.05) seconds).

Preferably, the crank pin 656 is press fit into the crank arm 654, although other interconnection means (e.g., adhesives and or pins) may be used in addition to or in lieu of the preferred press fit.

The crank arm 654 preferably includes a pivot end 658, at which the crank arm 654 is mounted to the output shaft 630 to rotate therewith, and a lifting end 660, at which the crank pin 656 is located.

In a preferred embodiment, the crank arm 654 is shiftable between three (3) positions: an upper position, best shown in FIGS. 19-24; a lower position, best shown in FIGS. 25 and 26; and a home position, best shown in FIGS. 27 and 28.

The home position is preferably arcuately spaced between the upper and lower positions. More particularly, the home position is preferably located between the upper and lower positions but nearer the lower position.

In a preferred embodiment, the crank arm 654 is offset from vertical while in either of the upper and lower positions, while the crank arm extends at least substantially vertically downward when in the home position. Alternate orientations are permissible according to some aspects of the present invention, however.

Lift Arm Assembly: Position Sensor System

In a preferred embodiment, and as best shown in FIGS. 30 and 31, the lift arm assembly 516 includes a position sensor system 662 including a printed circuit board 664 and a plurality of sensors mounted on the board 664. The sensors include an upper-position sensor 666, a lower-position sensor 668, and a home-position sensor 670. A wiring connector 672 is also mounted to the board 664.

The position sensor system 662 preferably senses when the crank arm 654 is in each of the upper, lower, and home positions.

In a preferred embodiment, the printed circuit board 664 includes an FR-4 laminate base with a one (1) oz copper foil. The printed circuit board 664 is preferably single-sided and semi-circular in shape, with a radial width of about one (1) inch and an outer diameter of about four and seventy-five hundredths (4.75) inches. Other configurations and sizes are permissible according to some aspects of the present invention, however. For instance, the board could use an alternative glass-reinforced epoxy laminate backbone, a different amount of copper, and/or have different dimensions.

The sensors 666, 668, and 670 are preferably Hall Effect sensors, although use of other sensor types is permissible according to some aspects of the present invention.

Preferably, the printed circuit board 664 includes a plurality of arcuately spaced apart mounting holes 674. Fasteners 676 extend through the mounting holes 674 and into the output holder 588 to fix the printed circuit board 664 on the gearbox housing 574. Preferably, three (3) arcuately spaced apart mounting holes 674 are provided, although other configurations and numbers of mounting holes are permissible.

In a preferred embodiment, the position sensor system 662 further includes a gasket 678 positioned between the printed circuit board 664 and the output holder 588.

Yet further, the position sensor system 662 preferably includes a printed circuit board cover 680 that is secured to the output holder 588 in such a manner as to enclose the printed circuit board 664 and the gasket 678, thereby protecting the sensors 666, 668, and 670 from contamination.

The position sensor system 662 further preferably includes a magnet system 682. More particularly, in a preferred embodiment, a magnet array 684, including a plurality of magnets 686, is positioned on the crank arm 654. The sensors 666, 668, and 670 sense the magnets 686 as the crank arm 654 moves between the upper, lower, and home positions.

Preferably, the magnet array 684 defines three alternately oriented pole pairs, wherein each pole pair is oriented generally circumferentially.

In a preferred embodiment, a magnet platform 688 is fixed to and extends generally radially from the pivot end 658 of the crank arm 654. The magnet array 684 is supported on the magnet platform 688 by a magnet carrier 690. Thus, pivoting of the crank arm 654 results in arcuate shifting of the magnet array 684. In a preferred embodiment, for instance, rotation of the crank arm 654 (corresponding to upward movement of the crank pin 656) results in downward shifting of the magnet array 684.

In a preferred embodiment, the magnet platform 688 defines a pair of oblong fastener-receiving holes 692 having generally circumferential major axes. As will be discussed in greater detail below, the oblong shape of the holes 692 enables the position of the carrier 632 and, in turn, of the magnet array 684, to be adjusted circumferentially as required during calibration.

The magnet platform 688 is preferably secured to the crank arm 654 via a pair of fasteners 694. More particularly, as shown in FIGS. 26, 28, and 29, the magnet platform 688 preferably defines an axially extending slot 696 therethrough. The fasteners 694 preferably extend through the slot 696 and into the crank arm 654 to secure the magnet platform 688 to the crank arm 654. As will be discussed in greater detail below, axial extension of the slot 696 allows the magnet platform 688 and, in turn, the magnet array 684, to be adjusted axially during calibration (e.g., moved nearer to or away from the printed circuit board cover 680 and, more particularly, the sensors 666, 668, and 670 therebelow).

In a preferred embodiment, the printed circuit board 664 is oriented in such a manner as to present an upper end 700 and a lower end 702. The wiring connector 672 is preferably positioned adjacent the lower end 702. The upper-position sensor 666 is preferably positioned nearer the lower end 702 than the upper end 700. The lower-position sensor 668 is preferably positioned adjacent the upper end 700. The home-position sensor 670 is preferably positioned nearer the upper end 700 than the lower end 702.

In a preferred embodiment, the sensors 666, 668, and 670 are positioned on the printed circuit board in a radially staggered manner. More particularly, in a preferred embodiment, the home-position sensor 670 is positioned radially inwardly relative to the radially intermediately positioned upper-position sensor 666 and the radially outwardly positioned lower-position sensor 668. Such positions preferably align with the rotational track of the magnets 686. Thus, although alternative arrangements are permissible according to some aspects of the present invention, such alternative arrangements should preferably enable alignment of the sensors to the magnet path to ensure accurate position sensing.

Preferably, the magnet array 684 is calibrated to the home-position sensor 670 during assembly of the lift motor 500. More particularly, in a preferred embodiment, the crank arm 654 is first set to the home position. The magnet array 684 is then shifted circumferentially and axially (as respectively enabled by the oblong fastener-receiving holes 692 and the slot 696 of the magnet platform 688) such that the magnet array 684 is circumferentially aligned with the home-position sensor 670 and separated from the printed circuit board cover 680 (and thus the sensors 666, 668, and 670) by only a very small axial air gap 705.

Lift Arm Assembly: Arm Stops

The output holder 588 preferably includes an upper arm stop 704 and a lower arm stop 706 arcuately spaced away from the upper arm stop 704. The upper arm stop 704 preferably prevents the crank arm 654 from rotating past the upper position, while the lower arm stop 706 preferably prevents the crank arm 654 from rotating past the lower position. That is, the arm stops 704 and 706 limit swinging movement of the crank arm 654.

More particularly, in a preferred embodiment, the crank arm 654 presents upper and lower stop-contacting surfaces 708 and 710, respectively. The upper arm stop 704 presents an upper arm-contacting surface 712, and the lower arm stop 706 presents a lower arm-contacting surface 714. When the crank arm 654 is in the upper position, the upper stop-contacting surface 708 abuts the upper arm-contacting surface 712. When the crank arm 654 is in the lower position, the lower stop-contacting surface 710 abuts the lower stop-contacting surface 714.

In a preferred embodiment, the upper and lower stops 704 and 706, respectively, are integrally formed with the output holder 588. Such integral formation is highly advantageous, enabling the stops 704 and 706 to withstand greater forces (e.g., due to forced or driven contact with the crank arm 654) than achieved via a conventional non-integral attachment. Non-integral configurations are permissible according to some aspects of the present invention, however. For instance, the stops could alternatively be bolted into place, provided the configuration is able to withstand operational shear forces.

In a preferred embodiment, the output holder 588 and upper and lower stops 704 and 706 comprise non-heat treated ductile cast iron. Other materials or processes may be used without departing from some aspects of the present invention, however. For instance, the output holder and stops might alternatively be subjected to one or more heat treatment processes or comprise steel.

Motor Mounting

As noted previously, in a preferred embodiment, the lift motor 500 includes a motor mounting assembly 518. The mounting assembly 518 preferably includes a base plate 716 fixed to the chassis of the robot 10. Furthermore, the output holder 588 preferably includes a mounting portion 718 secured to the base plate 716 and forming part of the mounting assembly 518.

Sensor Wire Protection

In a preferred embodiment, the printed circuit board cover 680 includes a first wire protection extension 720, and the connection box 548 includes a second wire protection extension 722. Furthermore, the base plate 716 defines an axially extending wire protection trough 724. The wire protection extensions 720 and 722 and the trough 724 cooperatively define a wiring passageway 726.

In a preferred embodiment, the wiring 566 includes sensor wiring 728 extending between the printed circuit board 664 and the connection box 548 (or, more particularly, from the wiring connector 672 to an external device configured to receive feedback from the sensors 666, 668, and 670). The sensor wiring 728 is preferably routed through the wiring passageway 726. The extensions 720 and 722 and trough 724 serve to protect the sensor wiring 728 from contact damage (e.g., from a warehouse employee) or exposure to contaminants such as water. The extensions 720 and 722 and trough 724 also serve to protect a "contacter" (e.g., a warehouse employee) from the sensor wiring 728.

Preferably, the first wire protection extension 720 includes an at least substantially solid rear wall 730 extending generally downwardly, and also includes a pair of sidewalls 732 extending axially from the rear wall 730.

The second wire protection extension 722 preferably similarly includes a rear wall 734 extending generally downwardly, as well as a pair of sidewalls 736 extending axially from the rear wall 734. However, in contrast to the rear wall 730 of the first wire protection extension 720, the rear wall 734 of the second wire protection extension 722 preferably defines an access slot 738.

In a preferred embodiment, a barrier 740 extends generally perpendicularly across the trough 724 to restrict upward movement of the sensor wiring 728 out of the trough 724. It is permissible, however, for the barrier to be omitted or alternatively oriented without departing from the scope of some aspects of the present invention.

Preferably, the trough 727 is positioned directly below the shell 540 and gearbox housing 574, such that the shell 540 and gearbox housing 574 provide a physical barricade against some forms of contaminant detrimental to the sensor wiring 728. For instance, the shell 540 and gearbox housing 574 are capable of deflecting water droplets that might otherwise enter the trough 724 and/or contact the sensor wiring 728.

Provision of the wiring passageway 726 outside the shell 540 and the gearbox housing 574 enables decreased shell 540 and gearbox housing 574 dimensions (i.e, permits the shell 540 and the gearbox housing 574 to be smaller).

In a preferred embodiment, the sensor wiring 728 is additionally provided with compressible seals 742 and a cable 744 particularly configured to prevent water and dust ingress.

Locomotion Motor

A preferred embodiment of the locomotion motor 800 is shown in detail in FIGS. 33-46. It is initially noted that, with certain exceptions to be discussed in detail below, many of the elements of the locomotion motor 800 are the same as or very similar to those described in detail above in relation to the turntable motor 100 and/or the lift motor 500. Therefore, for the sake of brevity and clarity, redundant descriptions and numbering will be generally avoided here. Unless otherwise specified, the detailed descriptions of the elements presented above with respect to the turntable motor 100 and the lift motor 500 should therefore be understood to apply at least generally to the locomotion motor 800, as well.

In some cases, features described below with respect to the locomotion motor 800 may also be applicable to the turntable motor 100 and/or the lift motor 500.

In a preferred embodiment, the locomotion motor 800 broadly includes a rotor 810 rotatable about an axis, a stator 812, a gearbox assembly 814, and one of the wheels 16.

The locomotion motor 800 is preferably oriented such that the axis extends generally horizontally. It is permissible, however, in connection with certain aspects of the present invention, for the locomotion motor to be alternatively oriented. That is, unless otherwise specified or made clear, the directional references made herein with regard to the locomotion motor 800 (e.g., top, bottom, upper, lower, etc.) are used solely for the sake of convenience and should be understood only in relation to each other. For instance, a component might in practice be oriented such that faces referred to as "top" and "bottom" are sideways, angled, inverted, etc. relative to the chosen frame of reference.

Stator Overview

Similar to the stator 112 of the turntable motor 100 and the stator 512 of the lift motor 500, the stator 812 of the locomotion motor 800 preferably includes a generally toroidal stator core 816 and a plurality of coils 818 wound about the stator core 816.

The stator core 816 preferably has an axial length of about two (2) inches, an outside diameter of about five and four hundred ninety thousandths (5.490) inches, and an inside diameter of about three and two hundred thirty-four thousandths (3.234) inches.

Furthermore, the stator core 816 is preferably electrically insulated by means of electrically insulative end caps 820.

In a preferred embodiment, the locomotion motor 800 includes at least one thermal protector 822 secured to the end caps 820 and configured to provide signals associated with the temperature of the locomotion motor 800.

The stator core 816 preferably includes twelve (12) teeth 824 defining twelve (12) slots 826 therebetween.

Rotor Overview

The rotor 810 preferably includes a rotor core 828, a plurality of arcuately arranged magnets 830, and a motor shaft 832.

The magnets 830 are preferably generally secured as described above with respect to the magnets 152 of the turntable motor 100 and the magnets 536 of the lift motor 500. However, the magnet retention means must be sufficient to restrict magnet dislodgement at all speeds of the locomotion motor 800 rather than those of the turntable motor 100 or the lift motor 500. In a preferred embodiment, for instance, the locomotion motor 800 has a high speed of about one thousand, one hundred seventy-six (1176) rpm and a maximum speed of about one thousand, one hundred seventy-six (1176) rpm. Such speeds, in combination with a preferred magnet 830 mass of about fifteen and three tenths (15.3) grams and the radial positioning of the magnets 830 relative to the axis of rotation, lead to centrifugal magnet forces of about four and forty-six hundredths (4.46) lb. The magnets 830 may also be subject to radial forces of about sixty-six and eight tenths (66.8) lb due to the maximum motor torque force of about one hundred thirty-three and six tenths (133.6) lb (i.e., about sixteen and seven tenths (16.7) lb/magnet, wherein the radial magnetic force is approximately four (4) times the torque force).

The magnet retention means should also be sufficient to restrict magnet dislodgement at all possible magnet temperatures during operation of the locomotion motor 800. In a preferred embodiment, for instance, the magnet retention means function acceptably when the magnets 830 are at temperatures between about zero degrees Celsius (0° C.) and a predicted maximum temperature of about eighty-two and seven tenths degrees Celsius (82.7° C.).

The magnets 830 are preferably rare earth magnets. More particularly, the magnets 830 are preferably forty-five (45) sh (one hundred fifty degrees Celsius (150° C.)) grade neodymium iron boron magnets. Other magnet types may be used without departing from some aspects of the present invention, however. For instance, the magnets might be of a lower grade and/or comprise ferrite.

In a preferred embodiment, sixteen (16) magnets 830 are provided and define eight (8) poles. More particularly, the magnets 830 are preferably "split magnets" for reduced eddy current loss, with eight (8) pairs of axially aligned magnets 830 being arcuately arranged about the rotor core 828.

Similar to the turntable motor 100 and the lift motor 500, the locomotion motor 800 is preferably a twelve (12) slot, eight (8) pole motor.

Preferably, each of the magnets 830 has an axial length of about eighty-three hundredths (0.83) inches and presents an arc of about thirty-two degrees (32°).

The rotor core 828 preferably has an axial length of about one and seven hundred eighty-eight thousandths (0.788) inches.

Motor Shell and End Plates Overview

The locomotion motor 800 further preferably includes a housing 833 defining a motor chamber 836 that at least substantially houses the stator 812 and the rotor 810.

The housing 833 preferably includes a shell 834 at least substantially circumscribing the stator 812. The housing 833 also includes first and second side end plates 838 and 840, respectively, that connect with the shell 834 to at least substantially enclose respective ends of the motor chamber 836.

In a preferred embodiment, the first side end plate 838 includes a unitary, integrally formed end plate body 838*a*. Most preferably, the end plate body 838*a* is a cast body (e.g., a cast aluminum body), although other means of integral formation are permissible.

In a preferred embodiment, the first side end plate 838 at least in part defines an electronics compartment 839. The end plate body 838*a* preferably defines an access opening 839*a* to the electronics compartment 839.

Preferably, the end plate 838 includes a removable cover 842 at least in part covering the access opening 839*a* but enabling access to, among other things, a motor encoder 844 at least in part disposed in the electronics compartment 839, without removal of the entire first side end plate 838. The cover can be omitted without departing from the scope of the present invention, however.

In a preferred embodiment, the motor shell 834 includes a plurality of radially extending fins 846 operable to disperse heat from the locomotion motor 800. The fins 846 preferably define a generally cuboidal shell envelope, although a circular or otherwise shaped envelope is permissible.

The motor shell 834 may be ventilated or unventilated. Preferably, however, the motor shell 834 includes a plurality of vent holes (not shown) to prevent or minimize the collection of heat at the bottom of the motor shell 834.

Motor Shell Interference Fit

In a preferred embodiment, the motor shell 834 is fit on the stator core 816 via a thermal fit (i.e., a shrink fit). More particularly, the motor shell 834 is preferably heated, positioned about the stator core 816 (e.g., the stator core 816 is dropped into place inside the motor shell 834), and then actively or passively cooled. In its cooled state, the shell 834 has smaller dimensions than in its heated state, such that the tightness of the fit between the shell 834 and the stator core 816 increases as the shell 834 cools.

In a preferred embodiment, the motor shell 834 is heated to five hundred degrees Fahrenheit (500° F.), positioned about the stator core 816, then cooled. Other target temperatures may be used without departing from the scope of the present invention, however.

Preferably, the fit during the initial stages of thermal fitting process (i.e., when the shell is at an elevated temperature) is a slip fit, while that achieved after the thermal fitting process (i.e., after the shell has been cooled) is an interference fit. More particularly, in a preferred embodiment and as noted previously, the stator core 816 has an outer diameter of about five and four hundred ninety thousandths (5.490) inches, while the cooled shell 834 preferably has an inner diameter of about five and four hundred eighty-three thousandths (5.483) inches.

The shell 834 preferably comprises a different material than the stator core 816, such that the stator core 816 and the shell 834 have differing coefficients of thermal expansion. Preferably, both materials are metals, although non-metal materials may be used within the ambit of the present invention.

More particularly, in a preferred embodiment, the shell 834 comprises aluminum, while the stator core 816 comprises steel. The shell thermal expansion coefficient is thus different from and, more particularly, greater than the stator core thermal expansion coefficient.

In a preferred embodiment, the shell 834 and stator core 816 thermal coefficients are at least substantially constant throughout the shell 834 and the stator core 816, respectively. It is permissible according to some aspects of the present invention, however, for material variations resulting in gradients or other variations in the thermal expansion coefficients to be present.

In a preferred embodiment, the shell 834 and stator core 816 materials and dimensions are chosen in such a manner that the shell 834 and the stator core 816 do not separate as a result of temperature fluctuations associated with motor operation.

It is permissible, however, for the shell 834 and stator core 816 materials and dimensions to be chosen in such a manner that the shell 834 may be removed from the stator core 816 upon heating of one or both components to a suitably high temperature or temperatures. For instance, the shell might be intentionally heated relative to the stator core to enable removal of the shell, or both the shell 834 and the stator core might be heated for the same purpose. Such removability is not a requirement of some aspects of the present invention, however.

Motor Shell Secondary Retention

In preferred embodiment, secondary retention of the shell 834 and stator 812 relative to one another is provided by a pair of spaced apart pins 848, a retaining ring or spring clip 850, and a shoulder 852. Such secondary retention is beneficial to supplement the interference fit (i.e., the grip) achieved via the above-described thermal process.

More particularly, as best shown in FIGS. 36 and 44-46, each pin 848 preferably extends through the shell 834 into the stator core 816.

As noted previously, the stator core 816 preferably comprises a plurality of teeth 824. Each of the teeth 824 preferably includes a yoke 854. Each pin 848 preferably extends into the arcuate center of the yoke 854 of one of the teeth 824. Non-centralized positioning or extension into another part of the stator core 816 is permissible according to some aspects of the present invention, however.

Preferably, the stator core 816 has opposite, axially spaced apart first and second side faces 856 and 858, respectively. In a preferred embodiment, each of the pins 848 extends through the shell 834 and into the stator core 816 at an axial position that is offset from the axial center of the stator core 816. That is, each pin 848 is closer to one of the first and second side faces 856 and 858 than to the other of the side faces 856 and 858. Central positioning or varied positioning between the two pins is permissible according to some aspects of the present invention, however.

The pins 848 are preferably spaced apart by about one hundred eighty degrees (180°, although other spacing is permissible. Furthermore, more or fewer pins might be provided. F) or instance, three unequally arcuately spaced pins might be provided.

In a preferred embodiment, the shell 834 defines the aforementioned shoulder 852. The shoulder 852 preferably engages the first side face 856 of the stator core 816 so as to restrict relative axial shifting of the stator core 816 and the shell 834.

Furthermore, the shell 834 preferably defines an annular groove 860 that receives the retaining ring 850. The retaining ring 850 engages the second side face 858 of the stator core 816 so as to further restrict relative axial shifting of the stator core 816 and the shell 834. Although a retaining ring of the type shown is preferred, other similar retention means are suitable without departing from the scope of the present invention.

Although the above-described pins 848, shoulder 825, and retaining ring 850 are preferably provided to supplement retention of the shell 834 relative to the stator core 816, some or all of such features may be omitted without departing from the scope of the present invention.

Gearbox Assembly Overview

As noted previously, the locomotion motor 800 preferably includes a gearbox assembly 814. The gearbox assembly 814 preferably includes a gearbox case 862 (which is also part of the housing 833) defining a gear chamber 864 in which a gear assembly 866 is substantially located. (The gear chamber 864 is shown in FIGS. 35 and 36 with the gear assembly 866 removed. The gear assembly 866 is shown in FIG. 42*a* and schematically in FIG. 42*b*).

As will be discussed in greater detail below, the gearbox case 862 itself preferably forms part of the gear assembly 866.

The gearbox assembly 814 further preferably includes a dust cover 868 (which is also preferably part of the housing 833) at least substantially encompassing the gearbox case 862.

The gearbox case 862 preferably includes a motor bracket 870 and an output holder 872 adjacent the motor bracket 870. Preferably, the motor bracket 870 and the output holder 872 extend continuously and are devoid of openings therein or gaps therebetween, such that gearbox case 862 at least substantially encloses the gear chamber 864.

The shell 834 preferably engages the dust cover 868 along a shell-dust cover interface 869*a* to thereby at least substantially prevent contaminants passing across the shell-dust cover interface 869*a*.

In a preferred embodiment and as best shown in FIGS. 35, 36, and 38, the motor bracket 870 includes a circumferentially extending outer flange 874. The flange 874 is preferably disposed adjacent the shell-dust cover interface 869*a*.

More particularly, the motor shell 834 preferably defines a shoulder 876 facing the dust cover 868, while the dust cover 868 defines a shoulder 878 facing the motor shell 834. A groove 880 is cooperatively defined by the shell 834 and the dust cover 868 between the respective shoulders 876 and 878. The flange 874 is preferably received in the groove 880. The flange 874 thereby restricts relative axial motion of the shell 834 and the dust cover 868.

The flange 874 also preferably restricts bending deformation of the locomotion motor 800 at the shell-dust cover interface 869*a*.

The flange 874 furthermore preferably defines a circumferentially extending outer groove 882. An O-ring or other seal 884 is preferably received in the groove so as to abut the dust cover 868 and be at least in part disposed between the flange 874 and the shell-dust cover interface 869*a*. The flange 874 and O-ring 884 thus cooperatively seal the shell-dust cover interface 869*a*.

In a preferred embodiment, the dust cover 868 preferably engages the gearbox case 862 along a dust cover-gearbox case interface 869*b* to thereby at least substantially prevent contaminants passing across the dust cover-gearbox case interface 869*b*. The dust cover-gearbox case interface 869*b* will be described in greater detail below.

Gearbox Assembly: Integration of Components

In a preferred embodiment, the motor bracket 870 of the gearbox case 862 is integrally formed with the second side end plate 840. More particularly, the motor bracket 870 and the second side end plate 840 are preferably formed of a single cast structure. It is permissible according to some aspects of the present invention, however, for the motor bracket and second side end plate to be discrete components connected to each other by means of fasteners, adhesives, welding, latches, or other means known in the art. Yet further, it is within the ambit of some aspects of the present invention for the second side end plate and the motor bracket to be non-interconnected.

In a preferred embodiment, the motor bracket 870 of the gearbox case 862 is integrally formed with the output holder 872 of the gearbox case 862. More particularly, the motor bracket 870 and the gearbox case 862 are preferably formed of a single cast structure. It is permissible according to some aspects of the present invention, however, for the motor bracket and the output holder to be discrete components connected to each other by means of fasteners, adhesives, welding, latches, or other means known in the art. Yet further, it is within the ambit of some aspects of the present invention for the motor bracket to be only indirectly interconnected.

Therefore, in keeping with the above, it is preferred that the second side end plate 840, the motor bracket 870, and the output holder 872 are all integrally formed.

The above-described construction of the gearbox case 862 enables a decreased axial length of the locomotion motor 800.

Gearbox Sealing and Lubrication Management System

In a preferred embodiment, the second side end plate 840/motor bracket 870 includes a motor shaft bearing housing 886. The motor shaft bearing housing 886 preferably receives a motor shaft bearing 888 (preferably but not necessarily a ball bearing) that supports the motor shaft 832 on the second side end plate 840/motor bracket 870 of the gearbox case 862.

The motor shaft bearing housing 886 preferably includes a generally radially extending base wall 890 and a circumferential sidewall 892 that extends axially from the base wall 890. The base wall 890 preferably includes a first tier 894 and a second tier 896. The motor shaft 832 preferably passes through a shaft opening 898 defined in the base wall 890. The sidewall 892 preferably circumscribes both the motor shaft 832 and the motor shaft bearing 888, with the motor shaft bearing 888 being intermediately positioned between the motor shaft 832 and the sidewall 892.

In a preferred embodiment, a wavy washer 900 is provided between the motor shaft bearing 888 and the base wall 890.

Preferably, only a very small clearance 902 is provided between the motor shaft 832 and the base wall 890 at the shaft opening 898. Furthermore, the motor shaft bearing 888 is preferably securely fit in the motor shaft bearing housing 886, such that few or no gaps (e.g, via a tight fit or an interference fit, respectively) exist. A stepped labyrinth 904 including a plurality of turns due in part to the tiers 894 and 896 is thus defined.

The labyrinth 904 at least substantially prevents ingress of lubricants (e.g., oil or grease) or other contaminants from the gear assembly 866 into the motor chamber 836, without the use of a traditional seal. Other labyrinth configurations and/or a seal along the interface between the gear assembly 866 and the motor chamber 836 may be utilized in accordance with some aspects of the present invention, however. That is, although, the above-described preferred method of sealing the gearbox case 862 enables sealing of the gearbox case 862 without the use of a compressible seal (e.g., a nitrile O-ring, etc.), compressible seals may alternatively or additionally be used without departing from the spirit of some aspects of the present invention.

Gearbox Assembly: Gear Assembly

In a preferred embodiment and as will be discussed in greater detail below, the gear assembly 866 transfers rotation of the motor shaft 832 to an output shaft 956 and, in turn, to the corresponding wheel 16. That is, rotation of the rotor 810 drives rotation of the corresponding wheel 16.

In a preferred embodiment, the gear assembly 866 is a one (1)-stage planetary gear assembly. The gear assembly preferably has a 10:1 gear ratio and achieves an efficiency of at least eighty-five percent (85%). More preferably, the gear assembly has an efficiency of at least ninety percent (90%). Most preferably, the gear assembly efficiency is about ninety-four percent (94%). Other gear ratios and efficiencies are permissible according to some aspects of the present invention, however.

The gear assembly 866 preferably reduces the power requirement for the locomotion motor 800. That is, the gear assembly 866 is designed so as to assist the locomotion motor 800 in providing the required torque with less power draw and in a relatively small envelope.

More particularly, as shown in FIG. 42*a* and schematically in FIG. 42*b*, the gear assembly 866 preferably includes a sun gear 908, three (3) planetary gears 910 (only one shown in FIG. 42*a* for the sake of clarity) driven by the sun gear 908, three (3) needle bearings 912 (only one shown in FIG. 42*a* for the sake of clarity) supporting respective ones of the planetary gears 910, and an internal gear 914 along which the planetary gears 910 orbit the sun gear 908. A different number of planetary gears and needle bearings may be provided without departing from the scope of the present invention, however.

The sun gear 908 is preferably integrally formed at a drive end 916 of the motor shaft 832, although non-integral formation is permissible according to some aspects of the present invention. For instance, the sun gear might alternatively be press fit onto the drive end of the motor shaft.

Preferably, the output holder 872 of the gearbox case 862 comprises the internal gear 914, although it is permissible according to some aspects of the present invention for the intermediate portion of the housing and the internal gear to be discrete components.

The first planetary gears 910 are preferably evenly arcuately spaced apart. It is permissible according to some aspects of the present invention, however, for the first planetary gears to be unevenly spaced.

In a preferred embodiment, the output shaft 956 includes a transfer portion 918, a connection portion 920, and a mid-portion 922 connecting the transfer portion 918 and the connection portion 920. The corresponding wheel 16 is preferably attached to the connection portion 920, as will be discussed in greater detail below.

In a preferred embodiment and as best shown in FIG. 42*a*, the transfer portion 918 includes three (3) generally axially extending transfer portion pins 924 (only one shown in FIG. 42*a* for the sake of clarity). Each of the planetary gears 910 is supported on a respective one of the pins 924 by a corresponding one of the needle rollers 912, such that travel of the planetary gears 910 along the internal gear 914 (i.e., orbiting of the planetary gears 910 about the sun gear 908) causes rotation of the transfer portion 918 and, in turn, of the connection portion 920 and the wheel 16.

In a preferred embodiment, the gear assembly 866 further preferably includes the previously described motor shaft bearing 888 supporting the motor shaft 832 in the motor bracket 870 of the gearbox case 862, a first output ball bearing 926 supporting the transfer portion 918 of the output shaft 956, and a second output ball bearing 928 supporting the mid-portion 922 of the output shaft 956. Other bearing types (e.g., roller bearings) and/or arrangements (e.g., different positioning) are permissible without departing from the spirit of the present invention, however.

It is noted that the integrally formed gearbox case 862 supports and positions each of the bearings 888, 926, and 928.

The sun gear 908 preferably includes twelve (12) teeth and is formed of carburized chromium molybdenum steel. The planetary gears 910 preferably each include forty-eight (48) teeth and are formed of carburized chromium molybdenum steel. The internal gear 914 preferably includes one hundred eight (108) teeth and is formed of tempered and quenched chromium molybdenum steel. Other numbers of teeth, gear materials, and hardening methods (including no hardening methods) may be used within the ambit of some aspects of the present invention, however.

Motor Mounting

In a preferred embodiment and as best shown in FIGS. 33 and 34, the dust cover 868 and the motor shell 834 cooperatively present a pair of motor mounting plates 930. The locomotion motor 800 is preferably mounted on the chassis of the robot 10 by means of the mounting plates 930.

As shown in FIGS. 37 and 38, for instance, the dust cover 868 and the motor shell 834 present respective mounting plate halves 932 and 934 interconnected by means of pegs 936.

Integrated Wire Sealing Structure

In a preferred embodiment, the locomotion motor 800 includes a pair of electrical cables 938 and 940 extending from the motor chamber 836 to a connection interface 942 disposed externally relative to the motor chamber 836.

More particularly, the locomotion motor 800 preferably includes a pair of cable connection assemblies 943 forming a seal about respective ones of the cables 938 and 940, such that ingress of contaminants into the motor chamber 836 is at least substantially prohibited. The connection assemblies 943 are preferably identical in constructions, but the principles of the present invention apply to dissimilar assemblies or to only a single assembly.

Preferably, each cable connection assembly includes a cable receiver 944 defining a cable opening 946. The cables 938 and 940 extend generally axially through the respective receivers 944 and cable openings 946 en route to the connection interface 942.

Most preferably first side end plate 838 integrally defines the pair of cable receivers 944. More particularly, the cable receivers 944 are integrally formed with the end plate body 838*a*.

Each cable connection assembly 943 further preferably includes a sleeve 948 at least substantially circumscribing the respective one of the cables 938, 940 and received in a corresponding one of the cable openings 946. The sleeves 948 are preferably overmolded and comprise a compressible, resiliently deformable material such as rubber.

In a preferred embodiment, each cable connection assembly 943 further includes a compressible grommet 952 at least substantially circumscribing the corresponding cable 938, 940 and being at least in part received in the corresponding cable opening 964. Each grommet 952 at least substantially circumscribes the corresponding sleeve 948.

The grommets 952 preferably comprise a compressible, resiliently deformable material suitable for sealing purposes. For instance, the grommets might comprise nitrile or a fluoroelastomer such as Viton®.

Preferably, the compressible material forming the sleeves 948 is less deformable (e.g., is a higher durometer material) than that of the grommets 952.

As best shown in FIGS. 37 and 43, each receiver 944 preferably includes an axially extending sidewall 950 presenting an axially tapered inner face 951. The inner face 951 preferably presents a broader face end 951a and a narrower face end 951b. The narrower face end 951b is preferably oriented toward the motor chamber 836.

Similarly, each grommet 952 is preferably generally axially frustoconical or tapered in form so as to present a broader grommet end 952a and a narrower grommet end 952b. The narrower grommet end 952b is preferably oriented toward the motor chamber.

Furthermore, although the grommet 952 is preferably frustoconical, non-conical or non-frustoconical (e.g., cylindrical) grommets may be used without departing from the scope of some aspects of the present invention.

In a preferred embodiment, each of the sidewalls 950 of the cable receivers 944 has a threaded outer face 954 defining a plurality of external threads 954a. Furthermore, the cable connection assemblies 943 each preferably include a respective nut 956 having internal threads 957, such that the nut 956 may be threadably secured to the corresponding cable receiver 944. That is, the internal threads 957 of each nut 956 are preferably configured to engage the external threads 954a of the corresponding cable receiver 944.

Each nut 956 preferably at least substantially circumscribes the corresponding one of the grommets 952, the corresponding one of the sleeves 948, and the corresponding one of the cables 938, 940.

As will be described in greater detail below, each grommet 952 is preferably compressed between the sleeve 948 and the sidewall 950 of the corresponding cable receiver 944 to tightly secure the corresponding cable 938 or 940 and seal the motor chamber 836 against ingress of contaminants through the corresponding cable opening 946.

For instance, securement of the nuts 956 on the receivers 944 preferably prevents axially outward shifting of the corresponding grommets 952.

Furthermore, progressive threading of a given one of the nuts 956 onto the corresponding one of the receivers 944 results in progressive compression of the corresponding grommet 952 (and, secondarily, of the sleeve 948). More particularly, each nut 956 presents a grommet-engaging face 956a. Each grommet 952 presents a nut-engaging face 952c. Each grommet 952 is configured to shift axially into the corresponding cable opening 946 and furthermore be compressibly deformed upon corresponding axial shifting of the corresponding nut 956 and engagement of the nut-engaging face 952c and the grommet-engaging face 956a.

In a preferred embodiment, a friction-reducing washer 958 is provided between each nut 956 and grommet 952 (or, more particularly, between each nut-engaging face 952c and the corresponding grommet-engaging face 956a) to reduce the friction generated between the nut 956 and the grommet 952 as torque is applied to the nut 956 (e.g., during threading or unthreading of the nut 956 onto or off of the corresponding cable receiver 944). In view of this preferred configuration, it is particularly noted that engagement of the faces 952c and 956a, as described above, is not necessarily direct. That is, such engagement may occur through an intermediate structure such as one of the preferred friction-reducing washers 958.

It is also noted that the previously described coordinating, generally tapered shapes of the inner faces 951 of the receivers 944 and of the grommets 952 facilitate the above-described shifting and compression, although such effects would be possible without the preferred generally tapered shapes.

In a preferred embodiment, as best shown in FIG. 34, an O-ring 959 circumscribes each cable receiver 944 to provide a seal between the first side end plate 838 and the corresponding nut 956.

The above-described means of integrally sealing the cables 938 and 940 provides several advantages relative to conventional cable interconnection and sealing means. Among other things, for instance, fewer seals are required, fewer overall components are required, and the axial envelope needed for the interconnection is reduced. The latter of these advantages is particularly beneficial in applications like that of the locomotion motor 800, in which axial space is at a premium.

Locomotion Sensor Assembly

In a preferred embodiment and as best shown in FIGS. 35, 36, and 39-41, the locomotion motor 800 includes a locomotion output encoder assembly 960. The encoder assembly 960 preferably senses the speed and direction of the output shaft 956 (which in turn can be used, along with information from the other locomotion moor, to sense the speed and direction of the robot 10).

The encoder assembly 960 preferably includes a rotatable encoder hub 962 and a sensed element 964 secured to the encoder hub 962 to rotate therewith.

The encoder assembly 960 further preferably includes a sensor assembly 966 that is stationary relative to the encoder hub 962 and the sensed element 964. The sensor assembly 966 is configured to sense the sensed element 964 and, in turn, the rotation of the encoder hub 962. Most preferably, the sensor assembly 966 comprises a printed circuit board assembly. The sensor assembly 966 thus preferably includes a printed circuit board 968 and at least an encoder chip 970 and a connector 972, the latter two of which are mounted on the printed circuit board 968. The sensor assembly 966 also preferably includes a printed circuit board holder 974.

In a preferred embodiment, the encoder hub 962 is mounted on the output shaft 956 to rotate therewith. More particularly, the encoder hub 962 preferably includes a radially extending base plate 976, a generally circumferential sidewall 978, and a circumferential center wall 980. The base plate 976 preferably presents a wheel-facing side 982 and an axially opposite gearbox-facing (or housing-facing) side 984. The circumferential sidewall 978 preferably extends generally axially outwardly from the wheel-facing side 982. The circumferential center wall 980 preferably extends axially inwardly from the gearbox-facing side 984 and cooperates with the base plate 973 to define an interior contact surface 986 that fixedly engages the output shaft 956.

The dust cover 868, the gearbox case 962, and the gearbox-facing (or housing-facing) side 984 of the encoder hub 962 preferably cooperatively define an encoder chamber 985. The sensed element 964 is preferably mounted to the gearbox-facing (or housing-facing) side 984 so as to circumscribe the center wall 980, face the gearbox case 862, and be disposed within the encoder chamber 985.

The sensed element 964 is preferably secured by means of a pressure-sensitive adhesive, although other securement means are permissible.

In a preferred embodiment, the sensed element 964 comprises at least one of (most preferably both) a position indicator and a direction indicator. For instance, in a preferred embodiment, the sensed element 964 comprises a reflective code disc. Most preferably, the reflective code disc is a window-type decal including hundreds of lines 988. In a preferred embodiment, for instance, the reflective code disc includes one thousand and twenty-four (1024) lines per revolution.

In a preferred embodiment, as shown in FIG. 35 and others, the output holder 872 of the gearbox case 862 includes a radially extending sidewall 990 defining an output shaft opening 992 and presenting an outer side face 994 facing the wheel 16.

The output shaft 956 preferably extends through the output shaft opening 992.

The sensor assembly 966 is preferably mounted to the outer side face 994 of the output holder 872 so as to be fixed relative to the (rotating) output shaft 956 and disc 964.

More particularly, in a preferred embodiment and as shown in detail in FIG. 39, the printed circuit board 968 and the printed circuit board holder 974 each include a corresponding pair of fastener-receiving holes 996 and 998, respectively, that correspond to a pair of apertures 1000 formed through the sidewall 990 of the output holder 872. Fasteners 1002 extend though the holes 996 and 998 and apertures 1000 to secure the printed circuit board holder 974 to the output holder 872.

In a preferred embodiment, the printed circuit board holder 974 includes a radially extending base plate 1004, a pair of axially extending side tabs 1006, and a wire routing extension 1008 extending axially and radially away from the base plate 1004. The printed circuit board 968 is preferably secured to the printed circuit board holder 974 via the fasteners 1002 and the side tabs 1006. Alternative holder designs and securement means are permissible according to some aspects of the present invention, however.

In a preferred embodiment, the sensor assembly 966 is radially shiftable so as to ensure radial alignment between the encoder chip 970 and the sensed element (i.e., the reflective code disc) 964. In a preferred embodiment, for instance, the fastener-receiving holes 996 and 998 are oversized relative to the apertures 1000 (see FIG. 39), enabling the relative position of the printed circuit board holder 974 to be shifted prior to insertion and/or tightening of the fasteners 1002. Other means of adjustably positioning the printed circuit board holder are permissible according to some aspects of the present invention, however. For instance, the fastener-receiving holes could be in the form of radially extending slots.

The above-described preferred configuration also enables circumferential adjustability of the sensor assembly 966.

In a preferred embodiment, the printed circuit board 968 includes an FR-4 laminate base with a one (1) oz copper foil. The printed circuit board 968 is preferably single-sided and semi-circular in shape, with a radial width of about eight-tenths (0.8) inch and a length of about one and five tenths (1.5) inches. Other configurations and sizes are permissible according to some aspects of the present invention, however. For instance, the board could use an alternative glass-reinforced epoxy laminate backbone, a different amount of copper, and/or have different dimensions.

In a preferred embodiment, the wheel 16 is supported on a wheel hub 1009. The encoder hub 962 at least substantially circumscribes the wheel hub 1009. Rotation of rotor 810, the output shaft 956, and, in turn, the corresponding wheel 16, preferably causes corresponding equivalent rotation of the encoder hub 962 and the sensed element 964. Such rotation is detected by the encoder chip 970 on the printed circuit board 968.

Although the above-described direct transfer of rotation from the output shaft 956 to the sensed element 964 is preferred, it is permissible according to some aspects of the present invention for an indirect system to be provided. Furthermore, the rotation might be non-equivalent (e.g., proportional), in which case the output would require additional calibration.

In a preferred embodiment, the dust cover 868 protects the encoder assembly 960 from ingress of external contaminants (e.g., dirt flung by the corresponding wheel 16). For instance, as noted previously, the dust cover 868 preferably engages the gearbox case 862 along a dust cover-gearbox case interface 869*b* to thereby at least substantially prevent contaminants passing across the dust cover-gearbox case interface 869*b*. More particularly, in a preferred embodiment and as best shown in FIGS. 33 and 34, the output holder 872 presents a pair of annular shoulders 1010 and 1012 and a circumferential face 1014 extending between and interconnecting the shoulders 1010 and 1012. The dust cover 868 preferably defines corresponding first and second annular shoulders 1016 and 1018 and a circumferential face 1020 extending between and interconnecting the shoulders 1016 and 1018. The shoulder 1010 preferably engages the shoulder 1016, while the circumferential face 1014 engages the circumferential face 1020.

Thus, the dust cover-gearbox case interface 869*b* preferably has a generally labyrinthine form, including a generally axially extending first section 869*c* along the interface between faces 1014, 1020 and a generally radially extending second section 869*d* along the interface between shoulders 1010, 1016. Thus, the second section 869*d* is preferably oriented generally orthogonally relative to the first section 869*c*.

In a preferred embodiment, the housing 833 preferably defines a seal face 1022. Most preferably, the dust cover 868 defines the seal face 1022. An annular seal 1024 is preferably positioned between the encoder hub 962 and the seal face 1022.

The seal 1024 is preferably configured to statically engage the seal face 1022 of the dust cover 868 along a generally arcuate housing-seal interface 1026 to thereby at least substantially prevent contaminants passing across the housing-seal interface 1026. Furthermore, the seal 1024 is configured to dynamically engage the sidewall 978 of the encoder hub 962 along a generally arcuate hub-seal interface 1028, to thereby at least substantially prevent contaminants passing across the hub-seal interface 1028. The encoder hub 962 thereby preferably both supports the sensed element 964 and forms a dynamic seal.

The seal 1024 preferably comprises a compressible material suitable for sealing purposes (e.g., nitrile or a fluoroelastomer such as Viton®).

Thus, in a preferred embodiment, multiple sealing mechanisms are provided. For instance, the aforementioned flange 874 and O-ring 884 cooperatively seal the shell-dust cover interface 869. The dust cover-gearbox case interface 869b defines an internal labyrinth between the output holder 872 of the gearbox case 862 and the dust cover 868. The sidewall 978 of the encoder hub 962, the seal face 1022 of the dust cover 868, and the seal 1024 provide direct seals (along the housing-seal interface 1026 and the hub-seal interface 1028) against the environment adjacent the corresponding wheel 16.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and access the reasonably fair scope of the present invention as pertains to any apparatus not materially departing from but outside the literal scope of the invention set forth in the following claims.

What is claimed is:

1. A stator comprising:
   a generally toroidal core presenting axially opposed upper and lower core faces;
   an electrically insulative upper end cap fitted to the core; and
   an electrically insulative lower end cap fitted to the core,
   said upper and lower end caps extending toward each other and between the upper and lower core faces,
   said upper end cap including upper interengaging structure,
   said lower end cap including lower interengaging structure,
   said upper and lower interengaging structures engaging one another at a juncture, such that said upper and lower end caps cooperatively encompass at least part of the core,
   said core including a generally radially extending tooth,
   said tooth presenting axially opposed upper and lower tooth faces at least in part defining respective ones of the upper and lower core faces,
   said tooth further presenting a pair of side faces each extending between and interconnecting the upper and lower tooth faces,
   said upper end cap fitted to the tooth to at least in part extend along the upper tooth face and down each of the side faces toward the lower end cap,
   said lower end cap fitted to the tooth to at least in part extend along the lower tooth face and up each of the side faces toward the upper end cap,
   said upper and lower end caps cooperatively encompassing at least part of the tooth,
   said tooth including a generally radially extending arm at least in part defining each of said side faces,
   said upper end cap including an upper arm portion corresponding to said arm,
   said lower end cap including a lower arm portion corresponding to said arm,
   said upper and lower arm portions cooperatively fully and continuously encircling said arm.

2. The stator of claim 1,
   said upper and lower interengaging structures overlapping one another along the juncture.

3. The stator of claim 1,
   a first one of said upper and lower interengaging structures including a projection,
   a second one of said upper and lower interengaging structures including a receiver,
   said projection being received by the receiver along the juncture.

4. The stator of claim 3,
   said projection comprising an axially projecting tab,
   said receiver comprising an axially extending recess,
   said tab being received in said recess at said juncture.

5. The stator of claim 1,
   said upper end cap at least in part extending along the upper core face,
   said lower end cap at least in part extending along the lower core face.

6. The stator of claim 1,
   said juncture being disposed axially between said upper and lower core faces.

7. The stator of claim 1,
   said stator further comprising wiring,
   said upper and lower end caps at least in part restricting movement of said wiring.

8. The stator of claim 1,
   said stator further comprising wiring,
   said upper and lower end caps being at least in part disposed between said wiring and said core.

9. The stator of claim 1,
   said stator including a plurality of said upper end caps and a plurality of said lower end caps,
   said stator being devoid of additional insulative structure in engagement with the core.

10. The stator of claim 1,
    said tooth further including a generally circumferentially extending yoke and a generally circumferentially extending crown,
    said arm extending between and interconnecting said yoke and said crown,
    said arm, said crown, and said yoke cooperatively presenting each of said side faces,
    said upper end cap including an upper yoke portion corresponding to the yoke and an upper crown portion corresponding to the crown,
    said lower end cap including a lower yoke portion corresponding to the yoke and a lower crown portion corresponding to the crown,
    said upper and lower arm portions, said upper and lower yoke portions, and said upper and lower crown portions cooperatively overlying the entireties of each of the tooth side faces.

11. The stator of claim 10,
    said upper and lower crown portions cooperatively fully and continuously encircling said crown.

12. The stator of claim 10,
    said juncture extending continuously along said arm, said yoke, and said crown.

13. The stator of claim 1,
    said juncture extending along each of said side faces.

14. The stator of claim 1,
    said stator further comprising wiring,
    said upper and lower end caps being at least in part disposed between said wiring and said core.

15. The stator of claim 14,
    said tooth including a generally radially extending arm and a yoke extending generally circumferentially from the arm, said upper end cap including an upper yoke portion corresponding to said yoke,
said lower end cap including a lower yoke portion corresponding to said yoke,
said upper and lower yoke portions each including an axially projecting retaining wall portion configured to restrict radial movement of the wiring.

16. The stator of claim 15,
said tooth further including a crown extending generally circumferentially from the arm,
said upper end cap including an upper crown portion corresponding to said crown,
said lower end cap including a lower crown portion corresponding to said crown,
said upper and lower crown portions each including a wire retention portion configured to restrict radial movement of the wiring.

17. The stator of claim 1,
said core comprising a plurality of said generally radially extending teeth,
said stator comprising a plurality of said upper end caps and a plurality of said lower end caps,
each of said upper and lower end caps corresponding to one of said teeth.

18. The stator of claim 1,
said upper and lower end caps being identical to each other.

* * * * *